United States Patent
Anthony et al.

(10) Patent No.: US 12,213,617 B2
(45) Date of Patent: Feb. 4, 2025

(54) FLAVORED BEVERAGE CARBONATION PROCESS

(71) Applicant: SharkNinja Operating LLC, Needham, MA (US)

(72) Inventors: Joshua David Anthony, Billerica, MA (US); John Kevin Clay, Milford, CT (US); Gregory Allan Fish, Boston, MA (US); Thomas James Launders, London (GB); Stuart Mark Leslie, Larchmont, NY (US); Luis Ramiro Gutierrez Montenegro, Stamford, CT (US); Joyce Chien Tu, Melrose, MA (US); Evan James White, Westwood, MA (US); Carl Robert Wrigglesworth, London (GB); Andrew David Zdeblick, Reading, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 17/744,468

(22) Filed: May 13, 2022

(65) Prior Publication Data
US 2023/0363575 A1    Nov. 16, 2023

(51) Int. Cl.
*A47J 31/40*    (2006.01)
*A47J 31/41*    (2006.01)
(Continued)

(52) U.S. Cl.
CPC .......... *A47J 31/407* (2013.01); *A47J 31/402* (2013.01); *A47J 31/41* (2013.01); *A47J 31/461* (2018.08);
(Continued)

(58) Field of Classification Search
CPC ... A47J 31/402; B01F 23/236; B01F 23/2361; B01F 23/2362; B01F 23/23761; B01F 23/23762
(Continued)

(56) References Cited

U.S. PATENT DOCUMENTS

| 236,478 A | 1/1881 | Ball et al. |
| 1,242,493 A | 10/1917 | Stringham |

(Continued)

FOREIGN PATENT DOCUMENTS

| AU | 2013284311 B2 | 12/2016 |
| AU | 2014241782 B2 | 9/2017 |

(Continued)

OTHER PUBLICATIONS

U.S. Appl. No. 17/744,459, filed May 13, 2022, Flavored Beverage Carbonation System.

(Continued)

*Primary Examiner* — Reginald Alexander
(74) *Attorney, Agent, or Firm* — Mintz, Levin, Cohn, Ferris, Glovsky and Popeo, P.C.

(57) ABSTRACT

A beverage system and methods for preparing flavored beverages are provided. In one embodiment, the beverage system includes a housing, a flavorant system, and a processor. The housing includes a mixing chamber configured to operably couple to a fluid reservoir and pressurized gas source. The processor is disposed in the housing and can be configured to cause, in response to at least one input, the separate dispensing of a fluid and a flavorant into a receptacle. The processor can also cause the delivery of gas from the pressurized gas source to the mixing chamber, where it can be used to form a carbonated fluid.

22 Claims, 37 Drawing Sheets

(51) Int. Cl.
*A47J 31/46* (2006.01)
*B01F 23/236* (2022.01)
*B01F 101/14* (2022.01)

(52) U.S. Cl.
CPC ........ *B01F 23/2362* (2022.01); *B01F 23/236* (2022.01); *B01F 2101/14* (2022.01)

(58) Field of Classification Search
USPC .......................................... 99/323.1; 222/399
See application file for complete search history.

(56) References Cited

U.S. PATENT DOCUMENTS

| | | | |
|---|---|---|---|
| 1,420,773 A | 6/1922 | Stainbrook | |
| 2,400,955 A | 5/1946 | Leo | |
| 3,419,193 A | 12/1968 | Stewart et al. | |
| 3,596,809 A | 8/1971 | Taubenheim | |
| 3,752,362 A | 8/1973 | Risener | |
| 3,923,183 A | 12/1975 | Choksi et al. | |
| 4,062,466 A | 12/1977 | Conti | |
| 4,103,803 A | 8/1978 | Irvine | |
| 4,190,169 A | 2/1980 | Pehr | |
| 4,212,414 A | 7/1980 | Beyens | |
| 4,251,473 A | 2/1981 | Gilbey | |
| 4,408,701 A | 10/1983 | Jeans | |
| 4,411,369 A | 10/1983 | Borows | |
| 4,436,227 A | 3/1984 | Johnson et al. | |
| 4,518,541 A | 5/1985 | Harris | |
| 4,533,068 A | 8/1985 | Meierhoefer | |
| 4,555,371 A | 11/1985 | Jeans | |
| 4,558,484 A | 12/1985 | Groth | |
| 4,567,993 A | 2/1986 | Albrecht et al. | |
| 4,676,287 A | 6/1987 | Fitzwater | |
| 4,706,847 A | 11/1987 | Sankey et al. | |
| 4,726,494 A | 2/1988 | Scott | |
| 4,752,138 A | 6/1988 | Rufer | |
| 4,836,414 A | 6/1989 | Credle et al. | |
| 4,866,324 A | 9/1989 | Yuzawa et al. | |
| 5,038,976 A | 8/1991 | Mcmillin | |
| 5,045,077 A | 9/1991 | Blake, III | |
| 5,102,010 A | 4/1992 | Osgar et al. | |
| 5,128,574 A | 7/1992 | Koizumi et al. | |
| 5,156,871 A | 10/1992 | Goulet et al. | |
| 5,170,912 A | 12/1992 | Du | |
| 5,199,609 A | 4/1993 | Ash, Jr. | |
| 5,205,440 A | 4/1993 | Matsushita | |
| 5,299,608 A | 4/1994 | Bosyj | |
| 5,330,154 A | 7/1994 | Mashburn et al. | |
| 5,415,329 A | 5/1995 | Westlund | |
| 5,425,404 A | 6/1995 | Dyer | |
| 5,507,436 A | 4/1996 | Ruttenberg | |
| 5,526,853 A | 6/1996 | Mcphee et al. | |
| 5,549,228 A | 8/1996 | Brown | |
| 5,573,046 A | 11/1996 | Venooker et al. | |
| 5,642,761 A | 7/1997 | Holbrook | |
| 5,697,115 A | 12/1997 | Sciarra et al. | |
| 5,816,448 A | 10/1998 | Kobold | |
| 5,836,483 A | 11/1998 | Disel | |
| 5,842,682 A | 12/1998 | Schennum et al. | |
| 5,862,948 A | 1/1999 | Duchon et al. | |
| 5,870,944 A | 2/1999 | Vander et al. | |
| 5,884,679 A | 3/1999 | Hansen et al. | |
| 5,897,033 A | 4/1999 | Okawa et al. | |
| 5,924,606 A | 7/1999 | Huizing | |
| 5,947,171 A | 9/1999 | Woodruff | |
| 5,971,179 A | 10/1999 | Christmas et al. | |
| 5,975,164 A | 11/1999 | Whaley et al. | |
| 6,012,596 A | 1/2000 | Oglesbee et al. | |
| 6,014,970 A | 1/2000 | Ivri et al. | |
| 6,081,962 A | 7/2000 | Kasen et al. | |
| 6,082,586 A | 7/2000 | Banks | |
| 6,092,569 A | 7/2000 | Simmel et al. | |
| 6,095,677 A | 8/2000 | Karkos et al. | |
| 6,142,750 A | 11/2000 | Benecke | |
| 6,158,486 A | 12/2000 | Olson et al. | |
| 6,167,586 B1 | 1/2001 | Reed et al. | |
| 6,170,543 B1 | 1/2001 | Simmel et al. | |
| 6,179,167 B1 | 1/2001 | Boot et al. | |
| 6,223,791 B1 | 5/2001 | Arsenault et al. | |
| 6,257,453 B1 | 7/2001 | Graham | |
| 6,269,837 B1 | 8/2001 | Arent et al. | |
| 6,276,560 B1 | 8/2001 | Belcastro | |
| 6,283,330 B1 | 9/2001 | Gillespie et al. | |
| 6,321,941 B1 | 11/2001 | Argentieri et al. | |
| 6,325,115 B1 | 12/2001 | Cowland et al. | |
| 6,336,603 B1 | 1/2002 | Karkos et al. | |
| 6,363,235 B1 | 3/2002 | Chiesa et al. | |
| 6,386,392 B1 | 5/2002 | Argentieri et al. | |
| 6,390,335 B1 | 5/2002 | Lawson et al. | |
| 6,427,730 B2 | 8/2002 | Nagel et al. | |
| 6,450,214 B1 | 9/2002 | Dyer et al. | |
| 6,488,058 B1 | 12/2002 | Dyer et al. | |
| 6,601,734 B1 | 8/2003 | Smith | |
| 6,672,481 B2 | 1/2004 | Ziesel | |
| 6,685,056 B1 | 2/2004 | Argentieri et al. | |
| 6,688,499 B2 | 2/2004 | Zhang | |
| 6,712,497 B2 | 3/2004 | Jersey et al. | |
| 6,735,811 B2 | 5/2004 | Field et al. | |
| 6,758,372 B2 | 7/2004 | Studer et al. | |
| 6,771,925 B2 | 8/2004 | Satoh | |
| 6,820,763 B2 | 11/2004 | Bilskie et al. | |
| 6,832,706 B2 | 12/2004 | Hearld et al. | |
| 6,866,164 B2 | 3/2005 | Branson et al. | |
| 6,893,180 B2 | 5/2005 | Hall et al. | |
| 6,923,345 B1 | 8/2005 | Laible | |
| 6,951,295 B1 | 10/2005 | Gaus et al. | |
| 6,971,549 B2 | 12/2005 | Leifheit et al. | |
| 6,973,945 B2 | 12/2005 | Haimi | |
| 7,051,399 B2 | 5/2006 | Field et al. | |
| 7,051,888 B2 | 5/2006 | Antier et al. | |
| 7,083,071 B1 * | 8/2006 | Crisp, III | B67D 1/0021 |
| | | | 222/129.3 |
| 7,097,074 B2 | 8/2006 | Halliday et al. | |
| 7,104,531 B2 | 9/2006 | Page et al. | |
| 7,108,156 B2 | 9/2006 | Fox | |
| 7,114,707 B2 | 10/2006 | Rona et al. | |
| 7,121,437 B2 | 10/2006 | Kasting | |
| 7,121,438 B2 | 10/2006 | Hoepner et al. | |
| 7,134,575 B2 | 11/2006 | Vogel et al. | |
| 7,140,519 B1 | 11/2006 | Kiser | |
| 7,156,247 B2 | 1/2007 | Laburu | |
| 7,156,324 B2 | 1/2007 | Birrenkott et al. | |
| 7,163,127 B2 | 1/2007 | Seelhofer | |
| 7,165,568 B2 | 1/2007 | Kessell et al. | |
| 7,165,695 B2 | 1/2007 | Choi | |
| 7,178,743 B2 | 2/2007 | Clarke et al. | |
| 7,213,506 B2 | 5/2007 | Halliday et al. | |
| 7,219,598 B2 | 5/2007 | Halliday et al. | |
| 7,231,869 B2 | 6/2007 | Halliday et al. | |
| 7,246,724 B2 | 7/2007 | Dave | |
| 7,255,039 B2 | 8/2007 | Halliday et al. | |
| 7,287,461 B2 | 10/2007 | Halliday et al. | |
| 7,288,276 B2 | 10/2007 | Rona et al. | |
| 7,305,986 B1 | 12/2007 | Steiner et al. | |
| 7,316,178 B2 | 1/2008 | Halliday et al. | |
| 7,322,277 B2 | 1/2008 | Halliday et al. | |
| 7,328,815 B2 | 2/2008 | Lowe | |
| 7,364,702 B2 | 4/2008 | Hoffman et al. | |
| 7,407,117 B2 | 8/2008 | Dodd | |
| 7,418,899 B2 | 9/2008 | Halliday et al. | |
| 7,445,133 B2 | 11/2008 | Ludovissie et al. | |
| 7,458,486 B2 | 12/2008 | Weist et al. | |
| 7,510,095 B2 | 3/2009 | Comeau et al. | |
| 7,513,192 B2 | 4/2009 | Sullivan et al. | |
| 7,533,439 B2 | 5/2009 | Theiss et al. | |
| 7,533,603 B2 | 5/2009 | Halliday et al. | |
| 7,533,604 B2 | 5/2009 | Halliday et al. | |
| 7,544,289 B2 | 6/2009 | Straka et al. | |
| 7,578,415 B2 | 8/2009 | Ziesel et al. | |
| 7,592,027 B2 | 9/2009 | Halliday et al. | |
| 7,607,385 B2 | 10/2009 | Halliday et al. | |
| 7,607,591 B2 | 10/2009 | Barch et al. | |
| 7,617,954 B2 | 11/2009 | Skillin | |
| 7,621,426 B2 | 11/2009 | Reynolds et al. | |

(56) References Cited

U.S. PATENT DOCUMENTS

| | | |
|---|---|---|
| 7,644,843 B1 | 1/2010 | Bush et al. |
| 7,648,049 B1 | 1/2010 | Lassota |
| 7,651,002 B2 | 1/2010 | Hennemann et al. |
| 7,669,737 B2 | 3/2010 | Bethuy et al. |
| 7,673,558 B2 | 3/2010 | Panesar et al. |
| 7,681,492 B2 | 3/2010 | Suggi et al. |
| 7,686,441 B2 | 3/2010 | Hashii et al. |
| 7,703,381 B2 | 4/2010 | Liverani et al. |
| 7,731,066 B2 | 6/2010 | Norris et al. |
| 7,731,161 B2 | 6/2010 | Seiwert et al. |
| 7,735,665 B2 | 6/2010 | Robinson |
| 7,762,438 B2 | 7/2010 | Skillin |
| 7,770,758 B2 | 8/2010 | Le |
| 7,780,043 B2 | 8/2010 | Jourdin et al. |
| 7,784,311 B2 | 8/2010 | Santoemma et al. |
| 7,789,273 B2 | 9/2010 | Kadyk et al. |
| 7,806,294 B2 | 10/2010 | Gatipon et al. |
| 7,819,381 B2 | 10/2010 | Abe |
| 7,823,756 B2 | 11/2010 | Alley |
| 7,832,593 B2 | 11/2010 | Raterman et al. |
| 7,837,132 B2 | 11/2010 | Mazooji et al. |
| 7,841,491 B2 | 11/2010 | Contiero |
| 7,849,872 B2 | 12/2010 | Phillips et al. |
| 7,854,354 B2 | 12/2010 | Laible |
| 7,857,910 B2 | 12/2010 | Carhuff et al. |
| 7,896,203 B2 | 3/2011 | Myron |
| 7,975,881 B1 | 7/2011 | Glucksman et al. |
| 7,975,883 B2 | 7/2011 | Laib et al. |
| 7,975,988 B2 | 7/2011 | Thomson et al. |
| 7,980,421 B2 | 7/2011 | Ophardt et al. |
| 8,006,853 B2 | 8/2011 | Delage |
| 8,006,866 B2 | 8/2011 | Minard et al. |
| 8,020,733 B2 | 9/2011 | Snodgrass |
| 8,052,257 B2 | 11/2011 | Gonzales |
| 8,083,100 B2 | 12/2011 | Minard et al. |
| 8,087,347 B2 | 1/2012 | Halliday et al. |
| 8,087,545 B2 | 1/2012 | Ciavarella et al. |
| 8,113,384 B2 | 2/2012 | Bethuy et al. |
| 8,172,453 B2 | 5/2012 | Boussemart et al. |
| 8,210,736 B2 | 7/2012 | Raber |
| 8,282,268 B2 | 10/2012 | Karkos et al. |
| 8,292,101 B1 | 10/2012 | Bragg et al. |
| 8,317,050 B2 | 11/2012 | Hollis et al. |
| 8,376,173 B2 | 2/2013 | Britto et al. |
| 8,376,182 B2 | 2/2013 | Lepage |
| 8,381,925 B2 | 2/2013 | Skillin et al. |
| 8,403,179 B1 | 3/2013 | Gerber |
| 8,430,134 B2 | 4/2013 | Gill |
| 8,434,639 B2 | 5/2013 | Markert |
| 8,448,804 B2 | 5/2013 | Luburic |
| 8,479,950 B2 | 7/2013 | Ophardt et al. |
| 8,517,212 B2 | 8/2013 | Antal, Sr. |
| 8,523,025 B2 | 9/2013 | Skillin et al. |
| 8,544,692 B2 | 10/2013 | Rusch et al. |
| 8,555,774 B2 | 10/2013 | Patera et al. |
| 8,584,578 B2 | 11/2013 | Koopman et al. |
| 8,590,746 B2 | 11/2013 | Bethuy et al. |
| 8,616,412 B2 | 12/2013 | Bethuy et al. |
| 8,621,990 B2 | 1/2014 | Fang et al. |
| 8,651,333 B2 | 2/2014 | Metropulos et al. |
| 8,661,966 B2 | 3/2014 | Stearns et al. |
| 8,668,376 B2 | 3/2014 | Krauchi et al. |
| 8,677,888 B2 | 3/2014 | Santoiemmo |
| 8,685,477 B2 | 4/2014 | Almblad et al. |
| 8,690,026 B2 | 4/2014 | Richards et al. |
| 8,727,515 B2 | 5/2014 | Dowell et al. |
| 8,733,566 B2 | 5/2014 | Druitt et al. |
| 8,746,506 B2 | 6/2014 | Jersey et al. |
| 8,757,227 B2 | 6/2014 | Girard et al. |
| 8,757,452 B2 | 6/2014 | Richards et al. |
| 8,770,094 B2 * | 7/2014 | Rithener ............... A47J 31/00 99/279 |
| 8,794,126 B2 | 8/2014 | Skalski et al. |
| 8,807,392 B2 | 8/2014 | Smeller et al. |
| 8,807,824 B2 | 8/2014 | Bodum |
| 8,820,577 B2 | 9/2014 | Rusch et al. |
| 8,826,688 B2 | 9/2014 | Tachibana et al. |
| 8,833,241 B2 | 9/2014 | Santoiemmo |
| 8,833,584 B2 | 9/2014 | Groubert |
| 8,833,586 B2 | 9/2014 | Meyers et al. |
| 8,840,092 B2 | 9/2014 | Kumar et al. |
| 8,844,555 B2 | 9/2014 | Schneider |
| 8,846,121 B2 | 9/2014 | Hansen et al. |
| 8,863,991 B2 | 10/2014 | Cleary et al. |
| 8,887,958 B2 | 11/2014 | Kadyk et al. |
| 8,887,959 B2 | 11/2014 | Hill et al. |
| 8,889,203 B2 | 11/2014 | York |
| 8,916,215 B2 | 12/2014 | Yoakim et al. |
| 8,919,240 B2 | 12/2014 | Ozanne et al. |
| 8,919,669 B2 | 12/2014 | Sandahl |
| 8,960,500 B2 | 2/2015 | van Opstal et al. |
| 8,960,506 B2 | 2/2015 | Beilke et al. |
| 8,985,395 B2 * | 3/2015 | Tansey ............... G06Q 30/0269 222/146.6 |
| 8,985,396 B2 | 3/2015 | Jersey et al. |
| 8,985,561 B2 | 3/2015 | Hatherell |
| 8,993,018 B2 | 3/2015 | Bucher et al. |
| 8,998,035 B2 | 4/2015 | Ford |
| 9,010,237 B2 | 4/2015 | Ozanne et al. |
| 9,026,245 B2 | 5/2015 | Tilton et al. |
| 9,027,466 B2 | 5/2015 | Bucher et al. |
| 9,044,718 B2 | 6/2015 | Ludwig et al. |
| 9,045,722 B2 | 6/2015 | Reif et al. |
| 9,051,162 B2 | 6/2015 | Peters et al. |
| 9,051,167 B2 | 6/2015 | Burge et al. |
| 9,056,287 B2 | 6/2015 | Peltola et al. |
| 9,060,650 B2 | 6/2015 | De |
| 9,073,673 B2 | 7/2015 | Mazurkiewicz et al. |
| 9,084,510 B2 | 7/2015 | Scorrano et al. |
| 9,107,448 B2 | 8/2015 | Giardino et al. |
| 9,107,449 B2 | 8/2015 | Njaastad et al. |
| 9,107,533 B2 | 8/2015 | Volz et al. |
| 9,114,368 B2 | 8/2015 | Njaastad et al. |
| 9,155,330 B1 | 10/2015 | Shtivelman |
| 9,155,418 B2 | 10/2015 | Lai et al. |
| 9,156,670 B2 | 10/2015 | Hill et al. |
| 9,161,654 B2 | 10/2015 | Belmont |
| 9,166,448 B2 | 10/2015 | Lam et al. |
| 9,167,935 B2 | 10/2015 | Scholvinck et al. |
| 9,169,048 B2 | 10/2015 | Ludewigs et al. |
| 9,193,506 B2 | 11/2015 | Madison et al. |
| 9,233,824 B2 | 1/2016 | Alan et al. |
| 9,290,317 B2 | 3/2016 | Quinn et al. |
| 9,295,278 B2 | 3/2016 | Nowak |
| 9,320,382 B2 | 4/2016 | Lo Faro et al. |
| 9,320,385 B2 | 4/2016 | Spiegel et al. |
| 9,334,090 B1 | 5/2016 | Maple et al. |
| 9,352,897 B2 | 5/2016 | Hoshino |
| 9,364,018 B1 | 6/2016 | Peterson et al. |
| 9,371,176 B2 | 6/2016 | Kohli et al. |
| 9,375,686 B2 | 6/2016 | Boarman et al. |
| 9,388,033 B2 | 7/2016 | Gates |
| 9,409,680 B2 | 8/2016 | Van Alfen et al. |
| 9,409,757 B2 | 8/2016 | Reddy |
| 9,409,759 B2 | 8/2016 | Wilder et al. |
| 9,433,317 B2 | 9/2016 | Agon et al. |
| 9,433,328 B2 | 9/2016 | Ciavarella et al. |
| 9,434,532 B2 | 9/2016 | Yoakim et al. |
| 9,440,836 B2 | 9/2016 | Quittner et al. |
| 9,445,688 B2 | 9/2016 | Flick |
| 9,469,463 B2 | 10/2016 | Murray et al. |
| 9,481,508 B2 | 11/2016 | Oh |
| 9,486,102 B2 | 11/2016 | Baldo |
| 9,493,298 B2 | 11/2016 | Evans et al. |
| 9,504,348 B2 | 11/2016 | Windler et al. |
| 9,505,510 B2 | 11/2016 | Hatherell |
| 9,516,969 B2 * | 12/2016 | Weflen ............... A47J 31/3633 |
| 9,521,924 B2 | 12/2016 | Priley et al. |
| 9,527,047 B2 | 12/2016 | Ring et al. |
| 9,538,876 B2 | 1/2017 | Ozanne et al. |
| D779,046 S | 2/2017 | Tansey, Jr. |
| 9,580,216 B2 | 2/2017 | Wisniewski |
| 9,582,699 B2 | 2/2017 | Jarisch et al. |
| 9,593,005 B2 | 3/2017 | Jersey et al. |

(56) References Cited

U.S. PATENT DOCUMENTS

| | | |
|---|---|---|
| 9,630,157 B2 | 4/2017 | Li et al. |
| 9,651,188 B2 | 5/2017 | Green et al. |
| 9,661,951 B2 | 5/2017 | Bugnano et al. |
| 9,664,264 B2 | 5/2017 | Kristlbauer |
| 9,668,604 B2 | 6/2017 | Yoakim et al. |
| 9,669,973 B2 | 6/2017 | Hoshino et al. |
| 9,687,796 B2 | 6/2017 | Hoare et al. |
| 9,701,527 B2 | 7/2017 | Tansey, Jr. |
| 9,708,109 B2 | 7/2017 | Marina et al. |
| 9,714,162 B2 | 7/2017 | Hecht et al. |
| 9,717,366 B2 | 8/2017 | Nevin et al. |
| 9,718,035 B2 | 8/2017 | Bandixen et al. |
| 9,723,863 B2 | 8/2017 | Njaastad et al. |
| 9,730,547 B2 | 8/2017 | Tanner et al. |
| 9,743,801 B2 | 8/2017 | Leuzinger et al. |
| 9,745,120 B2 | 8/2017 | Abegglen et al. |
| 9,745,185 B2 | 8/2017 | Klopfenstein et al. |
| 9,751,054 B2 | 9/2017 | Jin et al. |
| 9,754,437 B2 | 9/2017 | Deo et al. |
| 9,770,129 B2 | 9/2017 | Remo et al. |
| 9,783,403 B2 | 10/2017 | Tansey, Jr. |
| 9,783,405 B2 | 10/2017 | Olson et al. |
| 9,788,681 B2 | 10/2017 | Perentes et al. |
| 9,790,076 B2 | 10/2017 | Novak et al. |
| 9,796,506 B2 | 10/2017 | Meager |
| 9,801,500 B2 | 10/2017 | Ven Der Woning |
| 9,809,437 B2 | 11/2017 | Tansey, Jr. |
| 9,811,704 B2 | 11/2017 | Kaeser |
| 9,821,951 B2 | 11/2017 | Estabrook et al. |
| 9,821,992 B2 | 11/2017 | Rudick et al. |
| 9,854,935 B2 | 1/2018 | Danieli et al. |
| 9,889,966 B2 | 2/2018 | Medeiros et al. |
| 9,896,322 B2 | 2/2018 | Hecht |
| 9,897,220 B2 | 2/2018 | Cohen et al. |
| 9,907,432 B2 | 3/2018 | Tanner et al. |
| 9,918,586 B2 | 3/2018 | Smith et al. |
| 9,957,145 B2 | 5/2018 | Cohen et al. |
| 9,974,410 B2 | 5/2018 | Ferrier |
| 9,980,596 B2 | 5/2018 | Rognon et al. |
| 9,981,801 B2 | 5/2018 | Ozanne et al. |
| 9,999,315 B2 | 6/2018 | Crarer et al. |
| 9,999,316 B2 | 6/2018 | Ye et al. |
| 10,000,370 B2 | 6/2018 | Bethuy et al. |
| 10,007,397 B2 | 6/2018 | Besson et al. |
| 10,017,372 B2 | 7/2018 | Bethuy et al. |
| 10,022,011 B2 | 7/2018 | Norton et al. |
| 10,028,614 B2 | 7/2018 | Perentes et al. |
| 10,034,573 B2 | 7/2018 | Flick et al. |
| 10,046,903 B2 | 8/2018 | Evans et al. |
| 10,046,904 B2 | 8/2018 | Evans et al. |
| 10,051,988 B2 | 8/2018 | Gordon et al. |
| 10,058,826 B2 | 8/2018 | Cohen et al. |
| 10,064,513 B2 | 9/2018 | Rehfuss |
| 10,070,751 B2 | 9/2018 | Magniet et al. |
| 10,076,208 B2 | 9/2018 | Castellani et al. |
| 10,080,461 B2 | 9/2018 | Bugnano et al. |
| 10,093,530 B2 | 10/2018 | Mackey et al. |
| 10,099,443 B1 | 10/2018 | Evans et al. |
| 10,106,392 B2 | 10/2018 | Peirsman et al. |
| 10,117,539 B2 | 11/2018 | Rognon et al. |
| 10,117,540 B2 | 11/2018 | De Vreede et al. |
| 10,130,211 B2 | 11/2018 | Bugnano et al. |
| 10,131,528 B2 | 11/2018 | Webster et al. |
| 10,131,529 B2 | 11/2018 | Jersey et al. |
| 10,136,755 B2 | 11/2018 | Talon |
| 10,143,978 B2 | 12/2018 | Tipton |
| 10,149,569 B2 | 12/2018 | Preshel |
| 10,155,647 B2 | 12/2018 | Foster et al. |
| 10,159,376 B2 | 12/2018 | Dovat et al. |
| 10,160,575 B2 | 12/2018 | Ray |
| 10,165,892 B2 | 1/2019 | Lafosse |
| 10,189,614 B2 | 1/2019 | Pruiett |
| 10,193,411 B2 | 1/2019 | Tajima et al. |
| 10,201,171 B2 | 2/2019 | Gordon et al. |
| 10,201,785 B2 | 2/2019 | Cohen et al. |
| 10,206,533 B2 | 2/2019 | Pirone |
| 10,211,438 B2 | 2/2019 | Ohashi et al. |
| 10,213,033 B2 | 2/2019 | Bratsch et al. |
| 10,213,752 B2 | 2/2019 | Shalev |
| 10,214,018 B2 | 2/2019 | Nozawa et al. |
| 10,227,226 B2 | 3/2019 | Jersey et al. |
| 10,229,401 B2 | 3/2019 | Yoakim |
| 10,231,569 B2 | 3/2019 | Perentes et al. |
| 10,233,002 B2 | 3/2019 | Baenninger et al. |
| 10,239,669 B2 | 3/2019 | Ayriss et al. |
| 10,258,186 B2 | 4/2019 | Rivera |
| 10,280,060 B2 | 5/2019 | van Opstal et al. |
| 10,294,020 B2 | 5/2019 | Nordqvist et al. |
| 10,307,718 B2 | 6/2019 | Waisman |
| 10,329,134 B2 | 6/2019 | Olson et al. |
| 10,334,871 B2 | 7/2019 | Van De Sluis et al. |
| 10,336,597 B2 | 7/2019 | Griscik et al. |
| 10,343,885 B2 | 7/2019 | Novak et al. |
| 10,349,773 B2 | 7/2019 | Segiet et al. |
| 10,350,561 B1 | 7/2019 | Dushine et al. |
| 10,358,269 B2 | 7/2019 | Cerveny |
| 10,364,089 B2 | 7/2019 | Daniels et al. |
| 10,365,141 B2 | 7/2019 | Freiburger et al. |
| 10,370,235 B2 | 8/2019 | Pellaud |
| 10,377,540 B2 | 8/2019 | Borgardt et al. |
| 10,377,620 B2 | 8/2019 | Makino et al. |
| 10,384,839 B2 | 8/2019 | Yamaguchi |
| 10,398,254 B2 | 9/2019 | Tinkler et al. |
| 10,399,769 B2 | 9/2019 | Talon et al. |
| 10,399,838 B2 | 9/2019 | Green |
| 10,399,839 B2 | 9/2019 | Knoll et al. |
| 10,405,690 B2 | 9/2019 | Tentorio |
| 10,405,691 B2 | 9/2019 | Hesselbrock et al. |
| 10,414,557 B2 | 9/2019 | Skillin et al. |
| 10,414,642 B2 | 9/2019 | Melville, Jr. et al. |
| 10,433,668 B2 | 10/2019 | Merali et al. |
| 10,433,671 B2 | 10/2019 | Surface |
| 10,442,591 B2 | 10/2019 | Rognard et al. |
| 10,455,968 B1 | 10/2019 | Singer |
| 10,455,973 B2 | 10/2019 | Dollner et al. |
| 10,455,974 B2 | 10/2019 | Talon |
| 10,456,539 B2 | 10/2019 | Hearn et al. |
| 10,456,757 B1 | 10/2019 | Blichmann |
| 10,457,450 B2 | 10/2019 | Rios |
| 10,470,605 B2 | 11/2019 | Ergican et al. |
| 10,479,669 B2 | 11/2019 | Kim et al. |
| 10,485,374 B2 | 11/2019 | Lo Faro et al. |
| 10,486,953 B2 | 11/2019 | Pellaud et al. |
| 10,488,097 B2 | 11/2019 | Nachawati et al. |
| 10,494,246 B2 | 12/2019 | Hecht et al. |
| 10,506,896 B2 | 12/2019 | Ven Der Woning |
| 10,507,958 B2 | 12/2019 | Hashimoto et al. |
| 10,513,424 B2 | 12/2019 | Tansey, Jr. |
| 10,518,938 B2 | 12/2019 | Suzuki et al. |
| 10,518,942 B2 | 12/2019 | Seibert et al. |
| 10,519,020 B2 | 12/2019 | Ozawa et al. |
| 10,524,617 B2 | 1/2020 | Perrin et al. |
| 10,526,186 B2 | 1/2020 | Kuboi et al. |
| 10,526,192 B2 | 1/2020 | Holley et al. |
| 10,543,977 B2 | 1/2020 | Brockman et al. |
| 10,548,430 B2 | 2/2020 | Guard et al. |
| 10,555,636 B2 | 2/2020 | Carr et al. |
| 10,562,700 B2 | 2/2020 | Weijers et al. |
| 10,568,452 B2 | 2/2020 | Fin et al. |
| 10,595,549 B2 | 3/2020 | Van De Sluis et al. |
| 10,595,668 B2 | 3/2020 | Tinkler et al. |
| 10,604,310 B2 | 3/2020 | Kutsuzawa et al. |
| 10,604,398 B2 | 3/2020 | Smeller et al. |
| 10,618,705 B1 | 4/2020 | Laible |
| 10,631,686 B2 | 4/2020 | Abdo et al. |
| 10,647,564 B2 | 5/2020 | Showalter |
| 10,654,700 B2 | 5/2020 | Hecht |
| 10,674,857 B2 | 6/2020 | Lyons et al. |
| 10,674,863 B2 | 6/2020 | Sevcik et al. |
| 10,676,336 B2 | 6/2020 | Makino et al. |
| 10,682,007 B2 | 6/2020 | Fischer |
| 10,682,593 B2 | 6/2020 | Baird |
| 10,702,835 B2 | 7/2020 | Tran et al. |
| 10,702,838 B2 | 7/2020 | Chaussin et al. |

(56) References Cited

U.S. PATENT DOCUMENTS

| | | |
|---|---|---|
| 10,703,618 B2 | 7/2020 | Ziesel |
| 10,707,734 B2 | 7/2020 | Holenstein et al. |
| 10,710,864 B2 | 7/2020 | Jangbarwala et al. |
| 10,717,567 B2 | 7/2020 | Sakamoto et al. |
| 10,717,637 B2 | 7/2020 | Pellaud et al. |
| 10,743,707 B2 | 8/2020 | Bugnano et al. |
| 10,759,594 B2 | 9/2020 | Mills et al. |
| 10,765,254 B2 | 9/2020 | Iotti et al. |
| 10,766,756 B2 | 9/2020 | Gatipon et al. |
| 10,772,460 B2 | 9/2020 | Accursi |
| 10,780,408 B2 | 9/2020 | Schöb et al. |
| 10,791,752 B2 | 10/2020 | Siegel et al. |
| 10,793,346 B2 | 10/2020 | Bartoli et al. |
| 10,800,581 B2 | 10/2020 | Berroa Garcia |
| 10,807,049 B2 | 10/2020 | Abdo et al. |
| 10,807,853 B2 | 10/2020 | Balstad et al. |
| 10,813,501 B2 | 10/2020 | Helf et al. |
| 10,820,741 B2 | 11/2020 | Byun et al. |
| 10,820,744 B2 | 11/2020 | Rubin et al. |
| 10,820,745 B2 | 11/2020 | Zwicker et al. |
| 10,820,746 B2 | 11/2020 | Noth |
| 10,827,875 B2 | 11/2020 | Noth |
| 10,828,586 B2 | 11/2020 | Simpson et al. |
| 10,829,359 B2 | 11/2020 | Von Kraus et al. |
| 10,842,313 B2 | 11/2020 | Novak et al. |
| 10,843,142 B2 | 11/2020 | Waggoner et al. |
| 10,843,849 B1 | 11/2020 | Berge |
| 10,843,866 B2 | 11/2020 | Cafaro et al. |
| 10,846,975 B2 | 11/2020 | Tansey et al. |
| 10,849,451 B2 | 12/2020 | Su |
| 10,849,454 B2 | 12/2020 | Gordon et al. |
| 10,869,572 B2 | 12/2020 | Blatt |
| 10,870,566 B2 | 12/2020 | Green et al. |
| 10,882,728 B2 | 1/2021 | Hong et al. |
| 10,883,072 B2 | 1/2021 | Hong et al. |
| 10,893,773 B2 | 1/2021 | Standaar et al. |
| 10,894,639 B2 | 1/2021 | Pruiett |
| 10,894,706 B2 | 1/2021 | Iotti et al. |
| 10,898,026 B2 | 1/2021 | Fin |
| 10,899,600 B2 | 1/2021 | Frieburger et al. |
| 10,905,287 B2 | 2/2021 | Tu et al. |
| 10,906,013 B2 | 2/2021 | Cohen et al. |
| 10,918,239 B2 * | 2/2021 | Hartmann ............ A47J 31/4485 |
| 10,919,752 B2 | 2/2021 | Breault |
| 10,925,433 B2 | 2/2021 | Hansen et al. |
| 10,926,945 B2 | 2/2021 | Kennedy et al. |
| 10,940,494 B2 | 3/2021 | Romanov et al. |
| 10,945,554 B2 | 3/2021 | Lo Faro et al. |
| 10,945,557 B2 | 3/2021 | Nishimura et al. |
| 10,947,485 B2 | 3/2021 | Min et al. |
| 10,952,562 B2 | 3/2021 | Tanner et al. |
| 10,954,043 B2 | 3/2021 | Taruno |
| 10,961,027 B1 | 3/2021 | Laible |
| 10,966,563 B2 | 4/2021 | Dubief et al. |
| 10,966,564 B2 | 4/2021 | Rijskamp et al. |
| 10,973,364 B2 | 4/2021 | Hesselbrock et al. |
| 10,981,700 B2 | 4/2021 | Migas et al. |
| 10,993,575 B2 | 5/2021 | Krug et al. |
| 10,993,576 B2 | 5/2021 | Fedorak et al. |
| 10,994,980 B2 | 5/2021 | Jangbarwala et al. |
| 11,001,490 B2 | 5/2021 | Headley et al. |
| 11,008,206 B2 | 5/2021 | Pappas |
| 11,013,363 B1 | 5/2021 | Alsudairi et al. |
| 11,021,359 B2 | 6/2021 | Bissen et al. |
| 11,026,539 B2 | 6/2021 | Zosimadis et al. |
| 11,033,141 B2 * | 6/2021 | Schlack .................. A23L 33/40 |
| 11,039,712 B2 | 6/2021 | Egli et al. |
| 11,040,806 B2 | 6/2021 | Naumann et al. |
| 11,049,354 B2 | 6/2021 | Yoakim |
| 11,053,053 B2 | 7/2021 | Jordan |
| 11,059,636 B2 | 7/2021 | Maeda |
| 11,064,715 B2 | 7/2021 | Herbert et al. |
| 11,072,521 B2 | 7/2021 | Walker |
| 11,078,066 B2 | 8/2021 | Crackel et al. |
| 11,084,007 B2 | 8/2021 | Adams |
| 11,084,701 B2 | 8/2021 | Kuboi et al. |
| 11,085,435 B2 | 8/2021 | Dobbins et al. |
| 11,097,236 B2 | 8/2021 | Alexander et al. |
| 11,109,708 B2 | 9/2021 | Lecomte et al. |
| 11,110,418 B2 | 9/2021 | Furman et al. |
| 11,124,404 B2 | 9/2021 | Von Kraus et al. |
| 11,129,490 B2 | 9/2021 | Park et al. |
| 11,129,491 B2 | 9/2021 | Park et al. |
| 11,147,410 B2 * | 10/2021 | Hachenberger ........ A47J 31/002 |
| 11,148,927 B2 | 10/2021 | Wing et al. |
| 11,166,593 B2 | 11/2021 | Trakselis |
| 11,167,231 B2 | 11/2021 | Akdim et al. |
| 11,180,293 B2 | 11/2021 | Sahara et al. |
| 11,191,286 B2 | 12/2021 | Cross et al. |
| 11,192,711 B2 | 12/2021 | Jarisch et al. |
| 11,194,443 B2 | 12/2021 | Deo et al. |
| 11,203,515 B2 | 12/2021 | Cook |
| 11,206,941 B2 | 12/2021 | Abdo et al. |
| 11,208,310 B2 | 12/2021 | Tansey et al. |
| 11,208,313 B2 | 12/2021 | Conover et al. |
| 11,208,314 B2 | 12/2021 | Peirsman et al. |
| 11,235,267 B1 | 2/2022 | Santoiemmo |
| 11,242,195 B2 | 2/2022 | Nordqvist et al. |
| 11,246,326 B2 | 2/2022 | Feola |
| 11,247,186 B2 | 2/2022 | Topp-manske |
| 11,247,892 B2 | 2/2022 | Moore et al. |
| 11,250,659 B2 | 2/2022 | Tansey et al. |
| 11,252,976 B2 | 2/2022 | Popov et al. |
| 11,254,491 B2 | 2/2022 | Krüger |
| 11,254,586 B1 | 2/2022 | Santoiemmo |
| 11,274,027 B2 | 3/2022 | Krüger et al. |
| 11,284,734 B2 | 3/2022 | Hilckmann et al. |
| 11,284,736 B2 | 3/2022 | Ochoa et al. |
| 11,292,642 B2 | 4/2022 | Hiltser et al. |
| 11,292,646 B2 | 4/2022 | Bai et al. |
| 11,292,706 B2 | 4/2022 | Showalter |
| 11,292,707 B2 | 4/2022 | Lecomte et al. |
| 11,297,850 B2 | 4/2022 | Popov et al. |
| 11,304,557 B2 | 4/2022 | De Vreede et al. |
| 11,312,604 B2 | 4/2022 | Mehta et al. |
| 11,325,760 B2 | 5/2022 | Alderson et al. |
| 11,325,818 B2 | 5/2022 | Dahlberg et al. |
| 11,337,542 B2 | 5/2022 | Kroos |
| 11,339,045 B2 | 5/2022 | Conway et al. |
| 11,344,151 B2 | 5/2022 | Rolla |
| 11,345,581 B2 | 5/2022 | Cook |
| 11,345,583 B2 | 5/2022 | Aslam et al. |
| 11,370,648 B2 | 6/2022 | Melville, Jr. et al. |
| 11,407,629 B1 | 8/2022 | Siegel |
| 11,407,630 B1 | 8/2022 | Shafir |
| 11,465,892 B1 | 10/2022 | Dos Santos |
| 11,470,994 B2 | 10/2022 | Hashimoto |
| 11,479,457 B2 | 10/2022 | Krüger et al. |
| 11,738,988 B1 | 8/2023 | Anthony et al. |
| 11,745,996 B1 | 9/2023 | Zbedlick |
| 2002/0121531 A1 | 9/2002 | Stillinger et al. |
| 2002/0130140 A1 | 9/2002 | Cote |
| 2002/0158075 A1 | 10/2002 | Caldicott et al. |
| 2003/0012849 A1 | 1/2003 | Berson |
| 2003/0132241 A1 | 7/2003 | Treat |
| 2003/0168455 A1 | 9/2003 | Zettle et al. |
| 2004/0195245 A1 | 10/2004 | Gohil |
| 2005/0000053 A1 | 1/2005 | Kasper et al. |
| 2005/0040131 A1 | 2/2005 | Lin |
| 2005/0092392 A1 | 5/2005 | Abe |
| 2005/0151764 A1 | 7/2005 | Grady et al. |
| 2005/0184075 A1 | 8/2005 | Belcastro |
| 2005/0191759 A1 | 9/2005 | Pedersen-bjergaard et al. |
| 2006/0071040 A1 | 4/2006 | Young |
| 2008/0029541 A1 | 2/2008 | Wallace et al. |
| 2008/0078769 A1 | 4/2008 | Crunkleton et al. |
| 2008/0237271 A1 | 10/2008 | Olechowski |
| 2008/0272144 A1 | 11/2008 | Bonney et al. |
| 2008/0287880 A1 | 11/2008 | Keller |
| 2009/0140006 A1 | 6/2009 | Vitantonio et al. |
| 2009/0214742 A1 * | 8/2009 | Peden ..................... A47J 31/41 |
| | | 222/64 |
| 2009/0236361 A1 * | 9/2009 | Doelman ............. B67D 1/0864 |
| | | 222/335 |

(56) References Cited

U.S. PATENT DOCUMENTS

| | | |
|---|---|---|
| 2010/0089921 A1 | 4/2010 | Ellenkamp-Van et al. |
| 2010/0170841 A1 | 7/2010 | An et al. |
| 2010/0192782 A1* | 8/2010 | Blumenauer ......... A47J 31/402 99/302 R |
| 2011/0011889 A1 | 1/2011 | Bonney et al. |
| 2011/0107545 A1 | 5/2011 | Cagnina et al. |
| 2011/0181417 A1 | 7/2011 | Haskayne et al. |
| 2011/0186535 A1 | 8/2011 | Meager |
| 2011/0290828 A1 | 12/2011 | Lolk |
| 2012/0187153 A1 | 7/2012 | Burge et al. |
| 2012/0193318 A1 | 8/2012 | Meager |
| 2013/0062366 A1 | 3/2013 | Tansey |
| 2013/0098499 A1 | 4/2013 | Bencista et al. |
| 2014/0154368 A1 | 6/2014 | Kolls et al. |
| 2014/0175125 A1 | 6/2014 | Breault |
| 2014/0272019 A1* | 9/2014 | Schuh .................. B67D 1/0078 426/115 |
| 2015/0050392 A1* | 2/2015 | Stonehouse ........... A47J 31/407 426/115 |
| 2015/0125578 A1 | 5/2015 | Hatherell |
| 2015/0125586 A1 | 5/2015 | Ergican |
| 2015/0166252 A1* | 6/2015 | Jones .................... B05B 9/0833 222/399 |
| 2015/0225169 A1 | 8/2015 | Jarisch |
| 2015/0374025 A1 | 12/2015 | Evans et al. |
| 2016/0009539 A1 | 1/2016 | Jersey et al. |
| 2016/0130076 A1 | 5/2016 | Jarisch |
| 2016/0192806 A1 | 7/2016 | Pikkemaat et al. |
| 2016/0242456 A1 | 8/2016 | Evans et al. |
| 2016/0251208 A1 | 9/2016 | Tansey, Jr. |
| 2016/0255991 A1 | 9/2016 | Givens et al. |
| 2016/0318689 A1 | 11/2016 | Rudick et al. |
| 2016/0332124 A1 | 11/2016 | Cohen |
| 2017/0215645 A1 | 8/2017 | Doglioni Majer et al. |
| 2017/0225880 A1 | 8/2017 | Vivier et al. |
| 2017/0334636 A1 | 11/2017 | Park et al. |
| 2017/0341856 A1 | 11/2017 | Aschwanden |
| 2018/0000280 A1 | 1/2018 | Dubief |
| 2018/0057337 A1 | 3/2018 | Babucke et al. |
| 2018/0086621 A1 | 3/2018 | Dubief et al. |
| 2018/0093820 A1 | 4/2018 | Massey et al. |
| 2018/0251358 A1 | 9/2018 | Wing et al. |
| 2018/0251361 A1 | 9/2018 | Wing et al. |
| 2018/0297830 A1 | 10/2018 | Kraenzle |
| 2018/0312386 A1 | 11/2018 | Brun-kestler et al. |
| 2018/0354713 A1 | 12/2018 | Ting et al. |
| 2019/0077586 A1 | 3/2019 | Cafaro et al. |
| 2019/0134583 A1 | 5/2019 | Lautenschläger et al. |
| 2019/0144804 A1 | 5/2019 | Hong et al. |
| 2019/0153368 A1 | 5/2019 | Yoon et al. |
| 2019/0169016 A1 | 6/2019 | Vandekerckhove et al. |
| 2019/0191916 A1 | 6/2019 | Guyon et al. |
| 2019/0241420 A1 | 8/2019 | Peirsman et al. |
| 2019/0269156 A1 | 9/2019 | Van De Sluis et al. |
| 2019/0270630 A1 | 9/2019 | Dahan et al. |
| 2019/0274469 A1 | 9/2019 | Van De Sluis |
| 2019/0274482 A1 | 9/2019 | Abdo et al. |
| 2019/0275478 A1 | 9/2019 | Jersey et al. |
| 2019/0290054 A1 | 9/2019 | Weber et al. |
| 2019/0291062 A1 | 9/2019 | Wood et al. |
| 2019/0291064 A1 | 9/2019 | Conroy et al. |
| 2019/0292034 A1 | 9/2019 | Wood et al. |
| 2019/0292036 A1 | 9/2019 | Rice et al. |
| 2019/0328170 A1* | 10/2019 | Cai ......................... A23F 5/24 |
| 2019/0335952 A1 | 11/2019 | Di Bari |
| 2019/0337713 A1 | 11/2019 | Ergican et al. |
| 2019/0344233 A1 | 11/2019 | Savino |
| 2019/0367350 A1 | 12/2019 | Bhutani et al. |
| 2020/0000272 A1 | 1/2020 | Nabeiro et al. |
| 2020/0010311 A1 | 1/2020 | Moore |
| 2020/0017806 A1 | 1/2020 | Peirsman et al. |
| 2020/0031651 A1 | 1/2020 | Schneidewend et al. |
| 2020/0047137 A1 | 2/2020 | Wilder et al. |
| 2020/0060465 A1 | 2/2020 | Longman et al. |
| 2020/0062476 A1 | 2/2020 | Katayama et al. |
| 2020/0077841 A1 | 3/2020 | Dercar et al. |
| 2020/0079637 A1 | 3/2020 | Kaplita et al. |
| 2020/0100618 A1 | 4/2020 | Guyon et al. |
| 2020/0107671 A1 | 4/2020 | Gordon et al. |
| 2020/0121115 A1 | 4/2020 | Oh |
| 2020/0122100 A1 | 4/2020 | Tumey |
| 2020/0122994 A1 | 4/2020 | Cimatti et al. |
| 2020/0146308 A1 | 5/2020 | Roberts et al. |
| 2020/0146500 A1 | 5/2020 | Cafaro et al. |
| 2020/0146501 A1 | 5/2020 | Mchugh et al. |
| 2020/0156019 A1 | 5/2020 | Sawyer et al. |
| 2020/0170443 A1 | 6/2020 | Chioda et al. |
| 2020/0187718 A1 | 6/2020 | Seidl |
| 2020/0198956 A1 | 6/2020 | Hartsfield et al. |
| 2020/0207603 A1 | 7/2020 | Sevcik |
| 2020/0216786 A1 | 7/2020 | Pintz |
| 2020/0229472 A1 | 7/2020 | Manne |
| 2020/0231372 A1 | 7/2020 | Parise |
| 2020/0253361 A1 | 8/2020 | Davidson |
| 2020/0281396 A1 | 9/2020 | Accursi et al. |
| 2020/0331739 A1 | 10/2020 | Mehta et al. |
| 2020/0345170 A1 | 11/2020 | Jarisch et al. |
| 2020/0359822 A1 | 11/2020 | Dercar et al. |
| 2020/0359841 A1 | 11/2020 | Dercar et al. |
| 2020/0360875 A1 | 11/2020 | Danieli et al. |
| 2020/0361758 A1 | 11/2020 | Fantappièet al. |
| 2020/0367689 A1* | 11/2020 | Illy .......................... A23F 5/26 |
| 2020/0369440 A1 | 11/2020 | Croibier et al. |
| 2020/0369446 A1 | 11/2020 | Mélan-Moutet |
| 2020/0369504 A1 | 11/2020 | Balstad et al. |
| 2020/0369505 A1 | 11/2020 | Mckay |
| 2020/0375221 A1 | 12/2020 | Colvin et al. |
| 2020/0397184 A1 | 12/2020 | Ruggiero et al. |
| 2021/0000289 A1 | 1/2021 | Krüger et al. |
| 2021/0002044 A1 | 1/2021 | Koenigseder |
| 2021/0002046 A1 | 1/2021 | Da Costa et al. |
| 2021/0013785 A1 | 1/2021 | Liang et al. |
| 2021/0015303 A1 | 1/2021 | Byun et al. |
| 2021/0052104 A1 | 2/2021 | Perentes |
| 2021/0100394 A1 | 4/2021 | Affolter et al. |
| 2021/0101722 A1 | 4/2021 | Migas et al. |
| 2021/0106163 A1 | 4/2021 | Van De Sluis et al. |
| 2021/0122540 A1 | 4/2021 | Meager |
| 2021/0127891 A1* | 5/2021 | Wei .................... A47J 31/3623 |
| 2021/0127902 A1 | 5/2021 | Deng et al. |
| 2021/0137304 A1 | 5/2021 | Krger et al. |
| 2021/0137315 A1 | 5/2021 | Byun et al. |
| 2021/0147138 A1 | 5/2021 | Affolter et al. |
| 2021/0171333 A1 | 6/2021 | Amos |
| 2021/0177189 A1 | 6/2021 | Kordich et al. |
| 2021/0179411 A1 | 6/2021 | Dahan et al. |
| 2021/0188530 A1 | 6/2021 | Pellegrini et al. |
| 2021/0196074 A1 | 7/2021 | Guarin et al. |
| 2021/0259472 A1 | 8/2021 | Seidler et al. |
| 2021/0261324 A1 | 8/2021 | Arnold |
| 2021/0275942 A1 | 9/2021 | Stryker et al. |
| 2021/0292152 A1 | 9/2021 | Fedorka et al. |
| 2021/0307564 A1 | 10/2021 | Gort-barten |
| 2021/0309422 A1 | 10/2021 | Hiltser et al. |
| 2021/0316913 A1 | 10/2021 | Woody et al. |
| 2021/0316979 A1 | 10/2021 | Hayes-Pankhurst et al. |
| 2021/0317393 A1 | 10/2021 | Peirsman et al. |
| 2021/0338004 A1 | 11/2021 | Alsayar et al. |
| 2021/0347623 A1 | 11/2021 | Fantappie et al. |
| 2021/0354883 A1 | 11/2021 | Ferrari et al. |
| 2021/0361112 A1 | 11/2021 | Hobden et al. |
| 2021/0362993 A1 | 11/2021 | Shafir et al. |
| 2021/0378267 A1 | 12/2021 | Barak |
| 2021/0380392 A1 | 12/2021 | Glucksman et al. |
| 2022/0002134 A1 | 1/2022 | Pellaud |
| 2022/0022496 A1 | 1/2022 | Monsanto et al. |
| 2022/0024748 A1 | 1/2022 | Fantappie et al. |
| 2022/0031110 A1 | 2/2022 | Sekulic et al. |
| 2022/0031113 A1 | 2/2022 | Smith et al. |
| 2022/0033172 A1 | 2/2022 | Favre |
| 2022/0039587 A1 | 2/2022 | De Freitas |
| 2022/0039602 A1 | 2/2022 | Xiong |
| 2022/0040651 A1 | 2/2022 | Böttcher et al. |
| 2022/0053967 A1 | 2/2022 | Guyon et al. |

(56) References Cited

U.S. PATENT DOCUMENTS

| | | | |
|---|---|---|---|
| 2022/0061581 A1 | 3/2022 | Fernandes De Carvalho et al. |
| 2022/0071435 A1 | 3/2022 | Tseng |
| 2022/0071437 A1 | 3/2022 | Tseng |
| 2022/0071440 A1 | 3/2022 | Tseng et al. |
| 2022/0071441 A1 | 3/2022 | Patil et al. |
| 2022/0073238 A1 | 3/2022 | Naumann et al. |
| 2022/0073336 A1 | 3/2022 | Savioz |
| 2022/0088937 A1 | 3/2022 | Oya |
| 2022/0098020 A1 | 3/2022 | Garcia Tebar |
| 2022/0106180 A1 | 4/2022 | Rue et al. |
| 2022/0135294 A1 | 5/2022 | Peng et al. |
| 2022/0169424 A1 | 6/2022 | Yang |
| 2022/0289548 A1 | 9/2022 | Augsburger |
| 2022/0296015 A1 | 9/2022 | Crane |

FOREIGN PATENT DOCUMENTS

| | | |
|---|---|---|
| BR | 112014032633 B1 | 4/2020 |
| BR | 112021003593 A2 | 5/2021 |
| CA | 2903862 A1 | 9/2014 |
| CA | 2920909 A1 | 2/2015 |
| CA | 2961901 A1 | 4/2016 |
| CA | 2977475 A1 | 9/2016 |
| CA | 2936866 C | 10/2019 |
| CA | 2875899 C | 12/2019 |
| CN | 1016312 B | 4/1992 |
| CN | 201200323 Y | 3/2009 |
| CN | 101432221 B | 8/2012 |
| CN | 103213928 A | 7/2013 |
| CN | 203314745 U | 12/2013 |
| CN | 203576299 U | 5/2014 |
| CN | 104828373 A | 8/2015 |
| CN | 105000258 A | 10/2015 |
| CN | 103720363 B | 11/2015 |
| CN | 103213928 B | 5/2016 |
| CN | 105595868 A | 5/2016 |
| CN | 103430117 B | 5/2017 |
| CN | 105307973 B | 9/2017 |
| CN | 208291834 U | 12/2018 |
| CN | 109171502 A | 1/2019 |
| CN | 109380973 A | 2/2019 |
| CN | 104582509 B | 7/2019 |
| CN | 105849030 B | 9/2019 |
| CN | 110247484 A | 9/2019 |
| CN | 209988362 U | 1/2020 |
| CN | 107438580 B | 3/2020 |
| CN | 105011305 B | 5/2020 |
| CN | 111466793 A | 7/2020 |
| CN | 111589315 A | 8/2020 |
| CN | 112421819 A | 2/2021 |
| CN | 112998522 A | 6/2021 |
| CN | 108768070 B | 9/2021 |
| CN | 214731066 U | 11/2021 |
| CN | 109863112 B | 2/2022 |
| CN | 112313168 B | 10/2022 |
| DE | 202015104155 U1 | 11/2015 |
| EP | 0268451 A2 | 5/1988 |
| EP | 1351758 A1 | 10/2003 |
| EP | 1767262 B1 | 8/2008 |
| EP | 1718403 B1 | 5/2011 |
| EP | 2340754 A1 | 7/2011 |
| EP | 2359260 A1 | 8/2011 |
| EP | 2340754 B1 | 10/2012 |
| EP | 2504270 A1 | 10/2012 |
| EP | 2504271 A1 | 10/2012 |
| EP | 1966065 B2 | 11/2012 |
| EP | 2737834 A1 | 6/2014 |
| EP | 2969899 A2 | 1/2016 |
| EP | 2504270 B1 | 11/2016 |
| EP | 3003542 A4 | 1/2017 |
| EP | 3021686 A4 | 2/2017 |
| EP | 2359260 B1 | 6/2017 |
| EP | 2976975 B1 | 1/2018 |
| EP | 3261981 A1 | 1/2018 |
| EP | 3040114 B1 | 3/2019 |
| EP | 3275345 B1 | 3/2019 |
| EP | 3533937 A3 | 11/2019 |
| EP | 2504271 B1 | 4/2020 |
| EP | 2866593 B1 | 8/2020 |
| EP | 3760795 A1 | 1/2021 |
| EP | 3762331 A1 | 1/2021 |
| EP | 3200610 B1 | 2/2021 |
| EP | 3871994 A1 | 9/2021 |
| EP | 3808230 B1 | 6/2022 |
| EP | 4069626 A1 | 10/2022 |
| ES | 2351796 T3 | 2/2011 |
| FR | 2623488 A1 | 5/1989 |
| FR | 3078531 B1 | 5/2021 |
| GB | 2259653 A | 3/1993 |
| GB | 2486872 A | 7/2012 |
| GB | 2486872 B | 3/2016 |
| RU | 2491875 C2 | 9/2013 |
| WO | 8503853 A1 | 9/1985 |
| WO | 9807122 A1 | 2/1998 |
| WO | 0103817 A1 | 1/2001 |
| WO | 03083431 A2 | 10/2003 |
| WO | 03098776 A1 | 11/2003 |
| WO | 2004063087 A1 | 7/2004 |
| WO | 2008101275 A1 | 8/2008 |
| WO | 2009135758 A1 | 11/2009 |
| WO | 2009136781 A1 | 11/2009 |
| WO | 2012025425 A1 | 3/2012 |
| WO | 2012082712 A1 | 6/2012 |
| WO | 2013019963 A2 | 2/2013 |
| WO | 2013019963 A3 | 5/2013 |
| WO | 2014037456 A1 | 3/2014 |
| WO | 2014201753 A1 | 12/2014 |
| WO | 2016073069 A1 | 5/2016 |
| WO | 2016087474 A1 | 6/2016 |
| WO | 2016202815 A1 | 12/2016 |
| WO | 2017096505 A1 | 6/2017 |
| WO | 2017109718 A1 | 6/2017 |
| WO | 2020092859 A1 | 5/2020 |
| WO | 2020092859 A8 | 6/2020 |
| WO | 2020148294 A1 | 7/2020 |
| WO | 2020148293 A3 | 9/2020 |
| WO | 2020174336 A1 | 9/2020 |
| WO | 2020193376 A1 | 10/2020 |
| WO | 2020198811 A1 | 10/2020 |
| WO | 2020219385 A1 | 10/2020 |
| WO | 2020234060 A1 | 11/2020 |
| WO | 2021016331 A1 | 1/2021 |
| WO | 2021016343 A1 | 1/2021 |
| WO | 2021018760 A1 | 2/2021 |
| WO | 2021019161 A1 | 2/2021 |
| WO | 2021028654 A2 | 2/2021 |
| WO | 2021032892 A1 | 2/2021 |
| WO | 2021055937 A1 | 3/2021 |
| WO | 2021061553 A1 | 4/2021 |
| WO | 2021061614 A1 | 4/2021 |
| WO | 2021090186 A1 | 5/2021 |
| WO | 2021093936 A1 | 5/2021 |
| WO | 2021101990 A1 | 5/2021 |
| WO | 2021115135 A1 | 6/2021 |
| WO | 2021138385 A1 | 7/2021 |
| WO | 2021140254 A1 | 7/2021 |
| WO | 2021168069 A1 | 8/2021 |
| WO | 2021174309 A1 | 9/2021 |
| WO | 2021191774 A1 | 9/2021 |
| WO | 2021198162 A1 | 10/2021 |
| WO | 2021209507 A1 | 10/2021 |
| WO | 2021228877 A1 | 11/2021 |
| WO | 2021233931 A1 | 11/2021 |
| WO | 2021240307 A1 | 12/2021 |
| WO | 2021240308 A1 | 12/2021 |
| WO | 2021240311 A1 | 12/2021 |
| WO | 2022038408 A1 | 2/2022 |
| WO | 2022051389 A1 | 3/2022 |
| WO | 2022126811 A1 | 6/2022 |

(56) References Cited

FOREIGN PATENT DOCUMENTS

WO        2022189622 A1    9/2022
WO        2022189623 A1    9/2022

OTHER PUBLICATIONS

U.S. Appl. No. 17/744,462, filed May 13, 2022, Flavorant For Beverage Carbonation System.
European Search Report received for EP Application No. 23172974.0, mailed on Jan. 30, 2024, 6 pages.
European Search Report received for European Patent Application No. 23209898.8, mailed on Apr. 23, 2024, 4 pages.
International Search Report and Written Opinion received for PCT Application No. PCT/US2023/072475, mailed on Feb. 1, 2024, 14 pages.
International Search Report and Written Opinion received for PCT Application No. PCT/US2023/078826, mailed on Jul. 4, 2024, 23 pages.
International Search Report and Written Opinion Received for PCT Patent Application No. PCT/US2023/066785, mailed on Sep. 25, 2023, 21 pages.
Invitation to Pay Additional Fees received for PCT Application No. PCT/US2023/078826, mailed on Mar. 12, 2024, 10 pages.
Partial European Search Report received for EP Application No. 23172974.0, mailed on Sep. 21, 2023, 13 pages.

\* cited by examiner

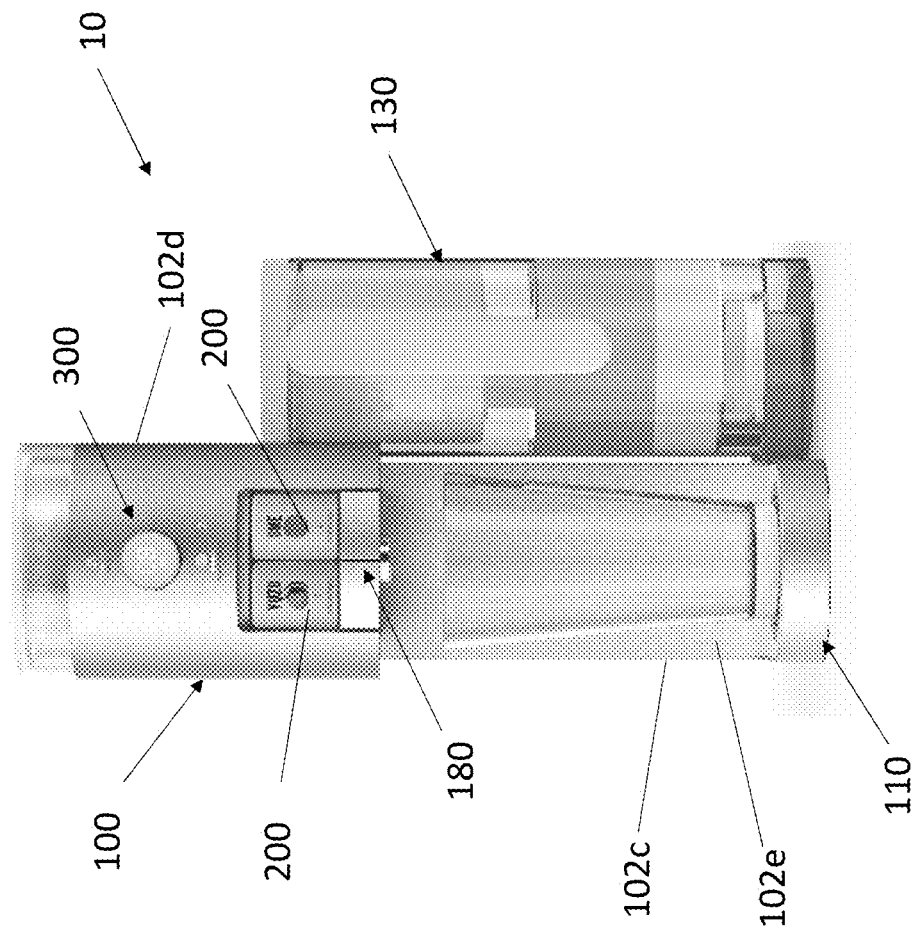

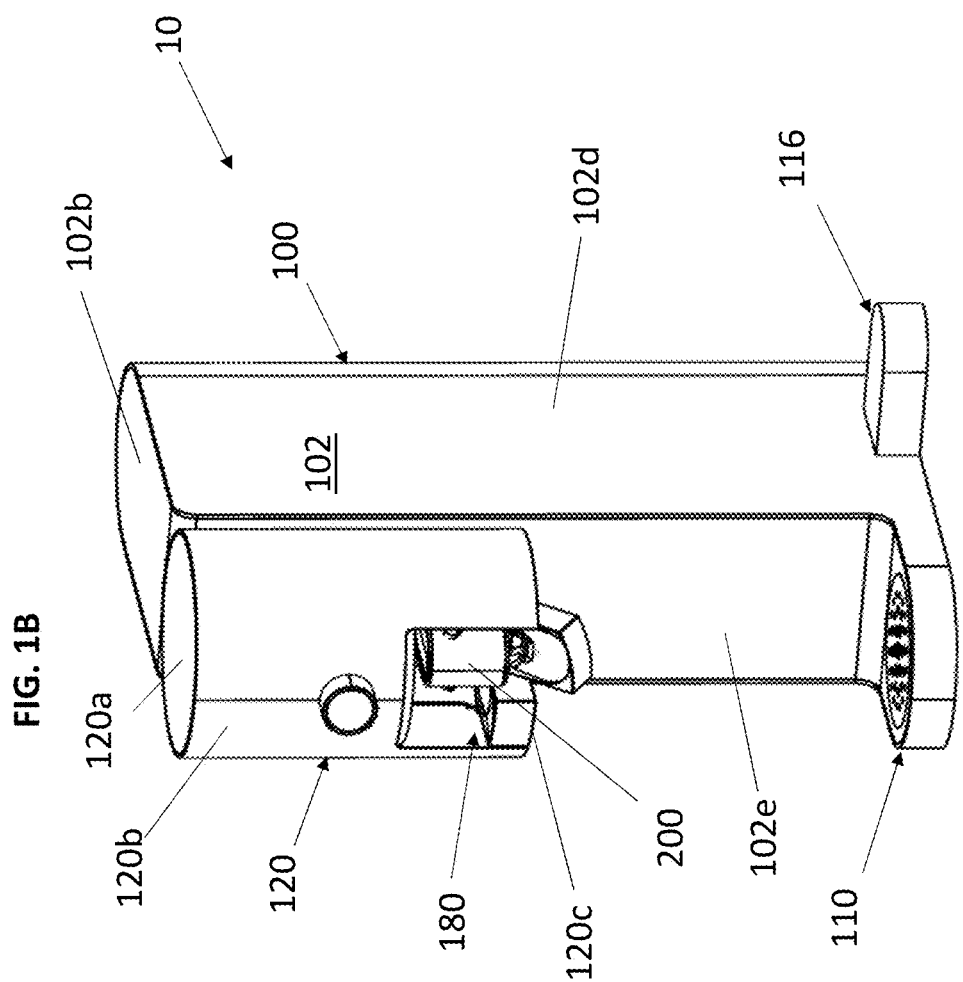

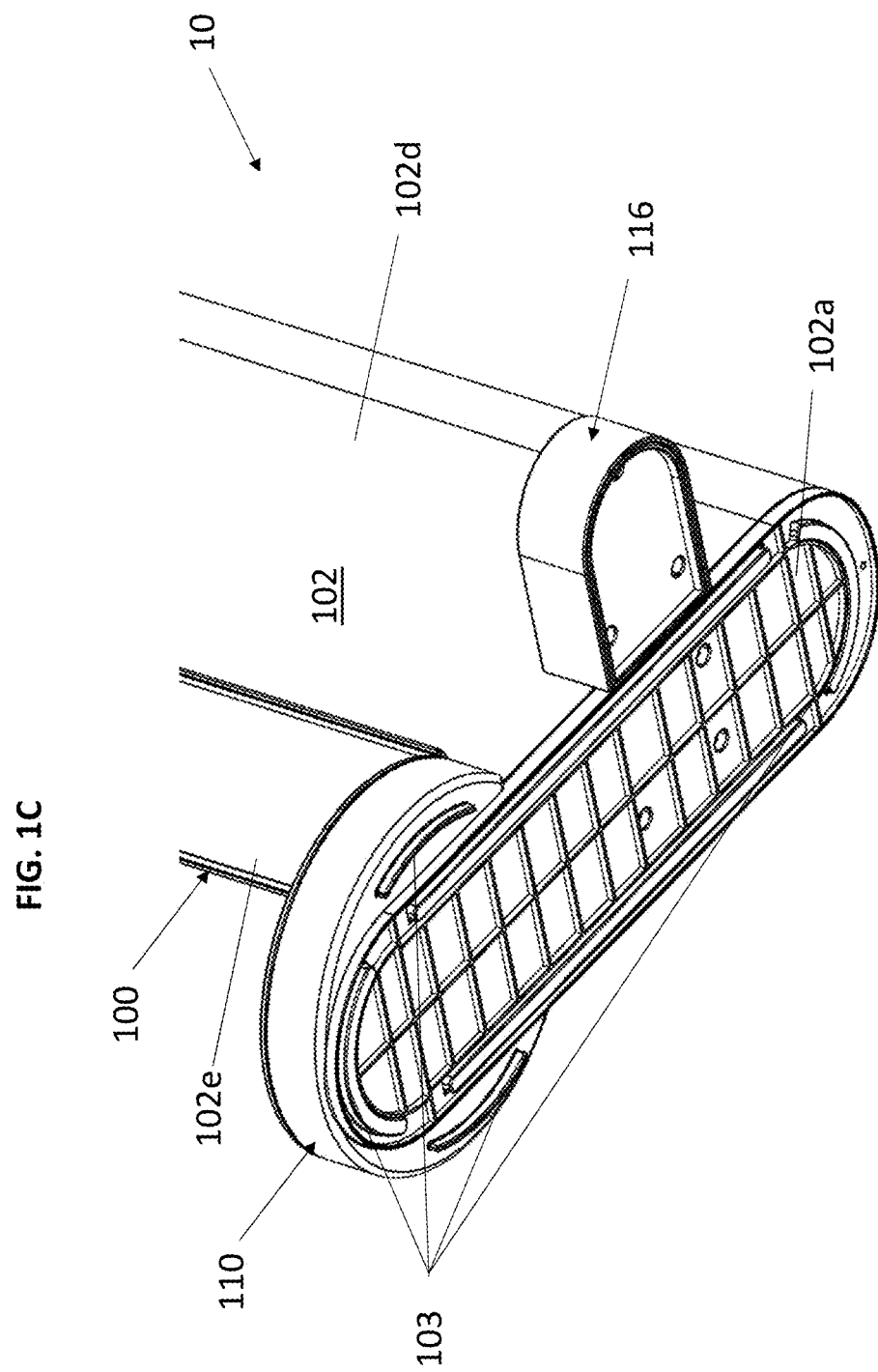

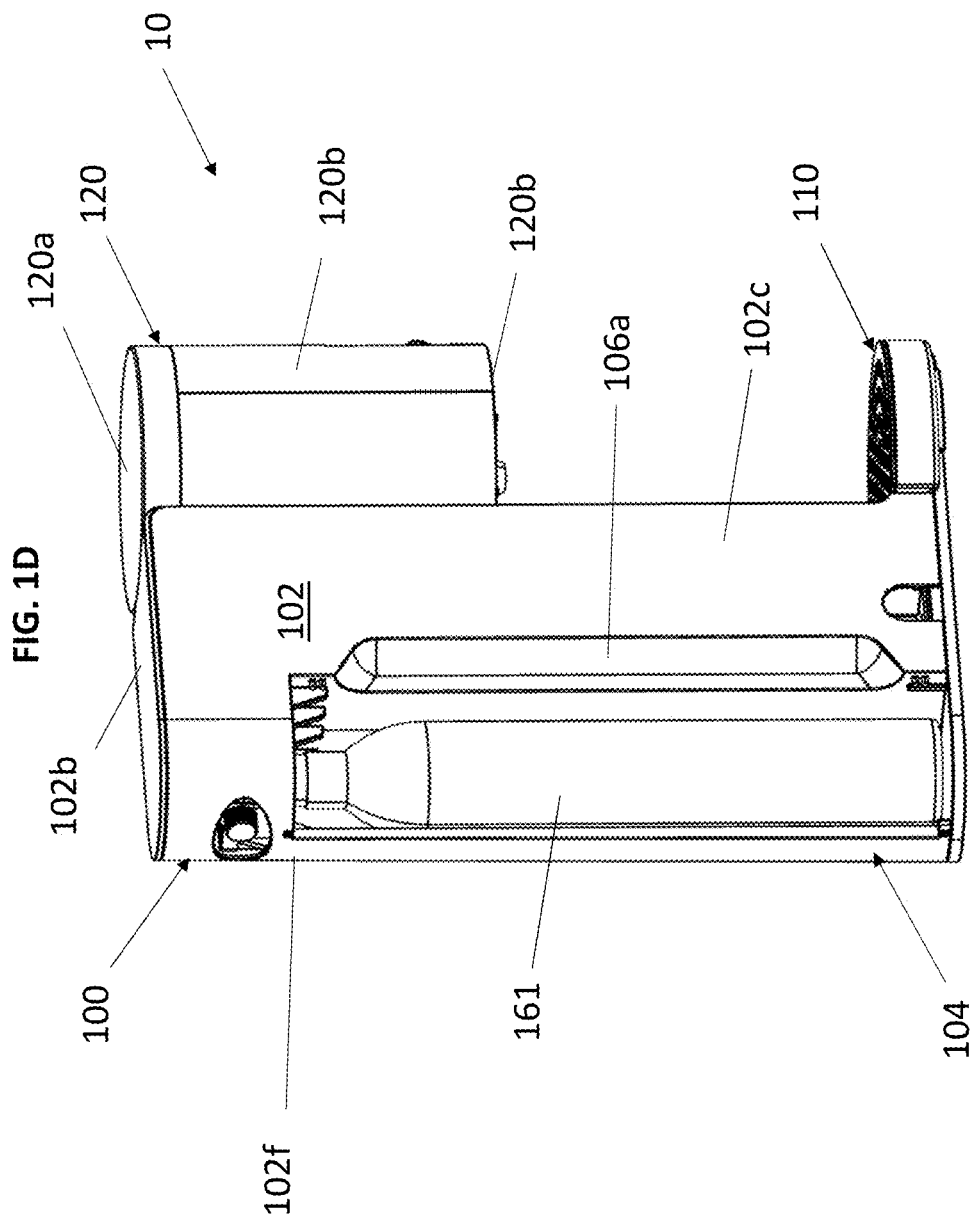

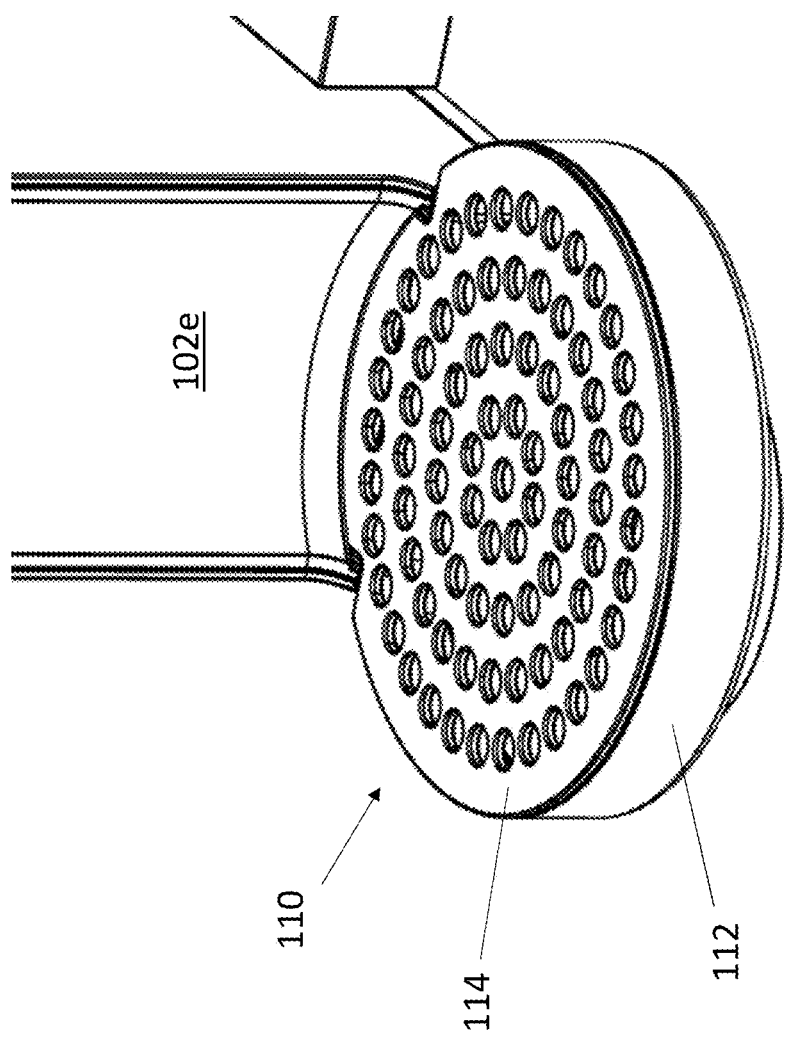

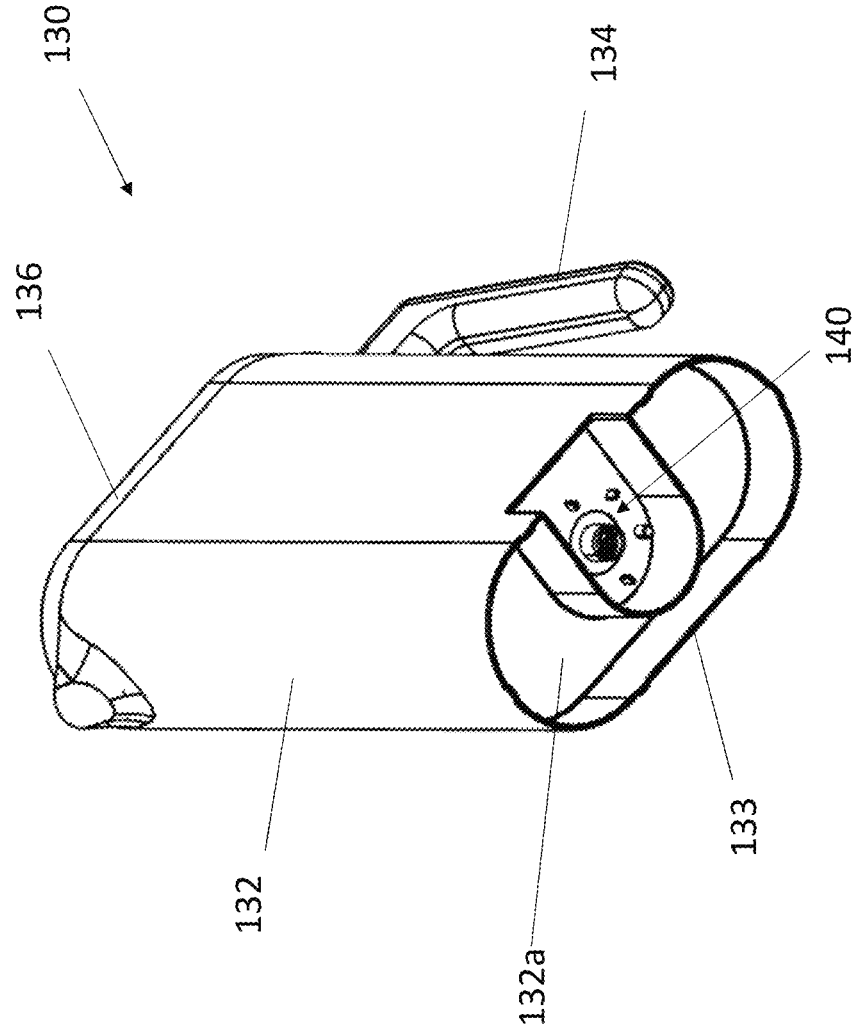

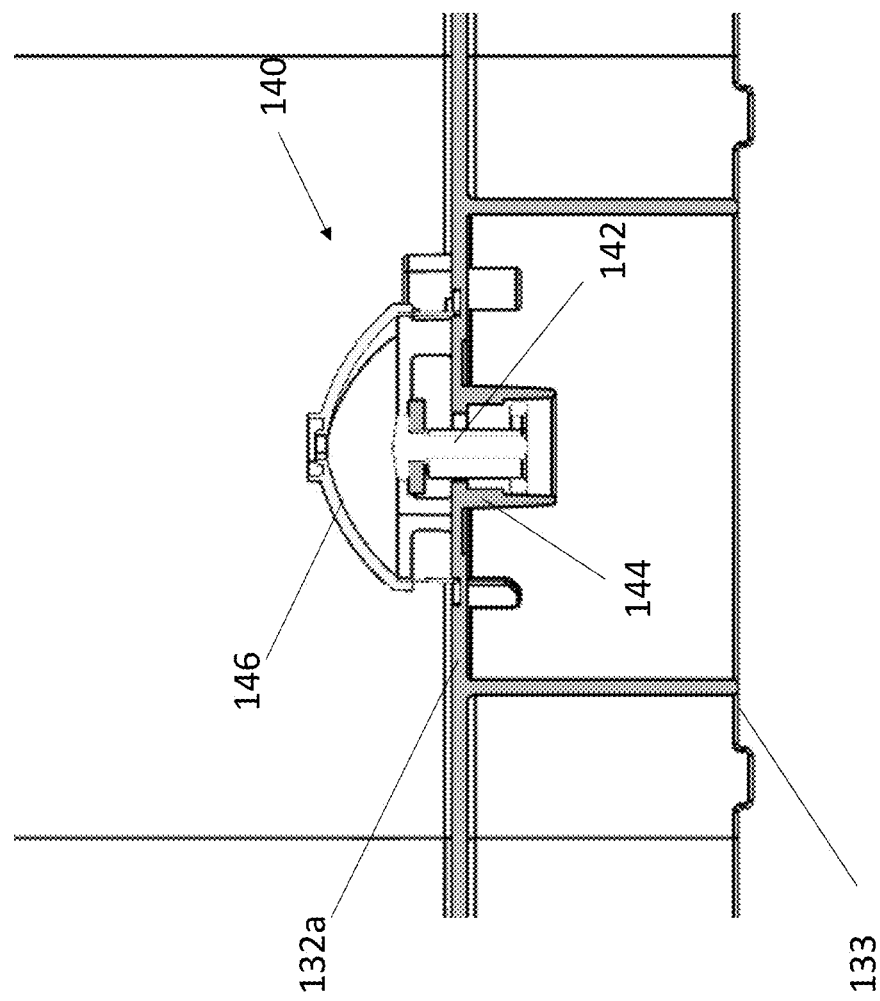

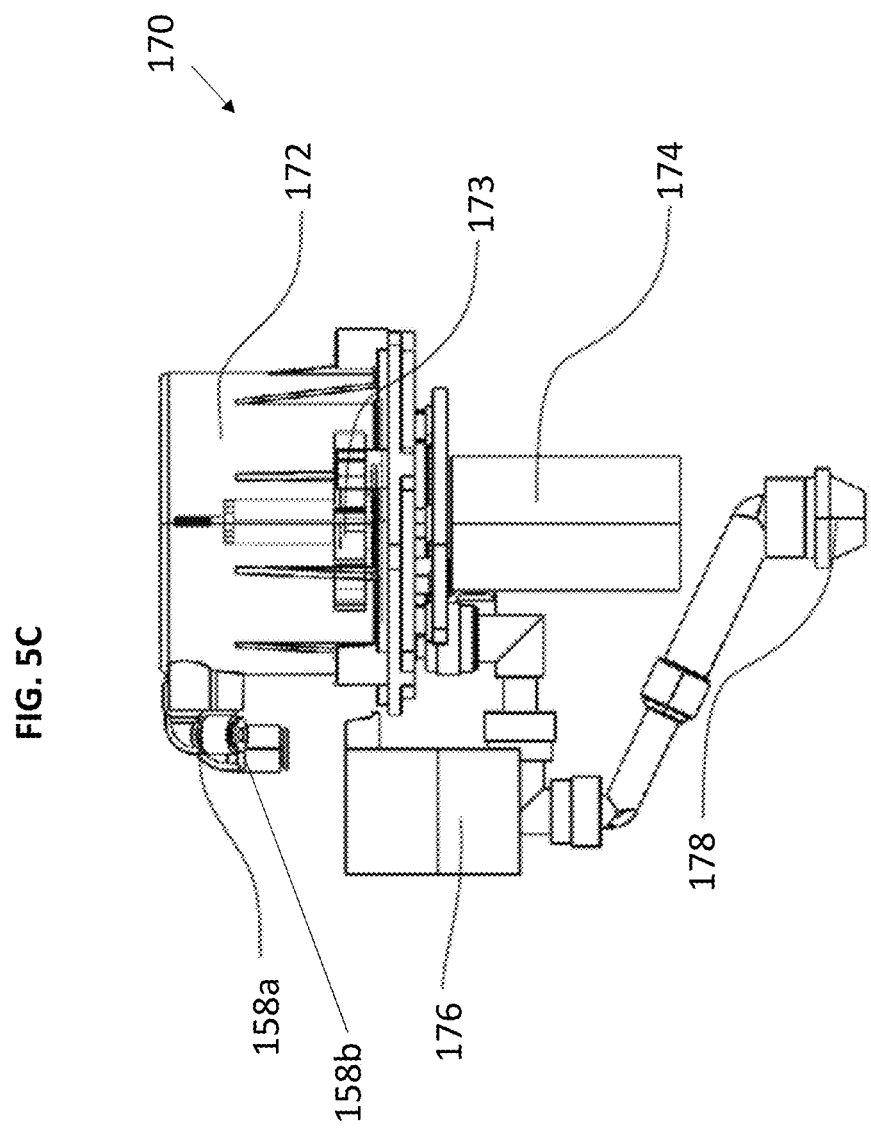

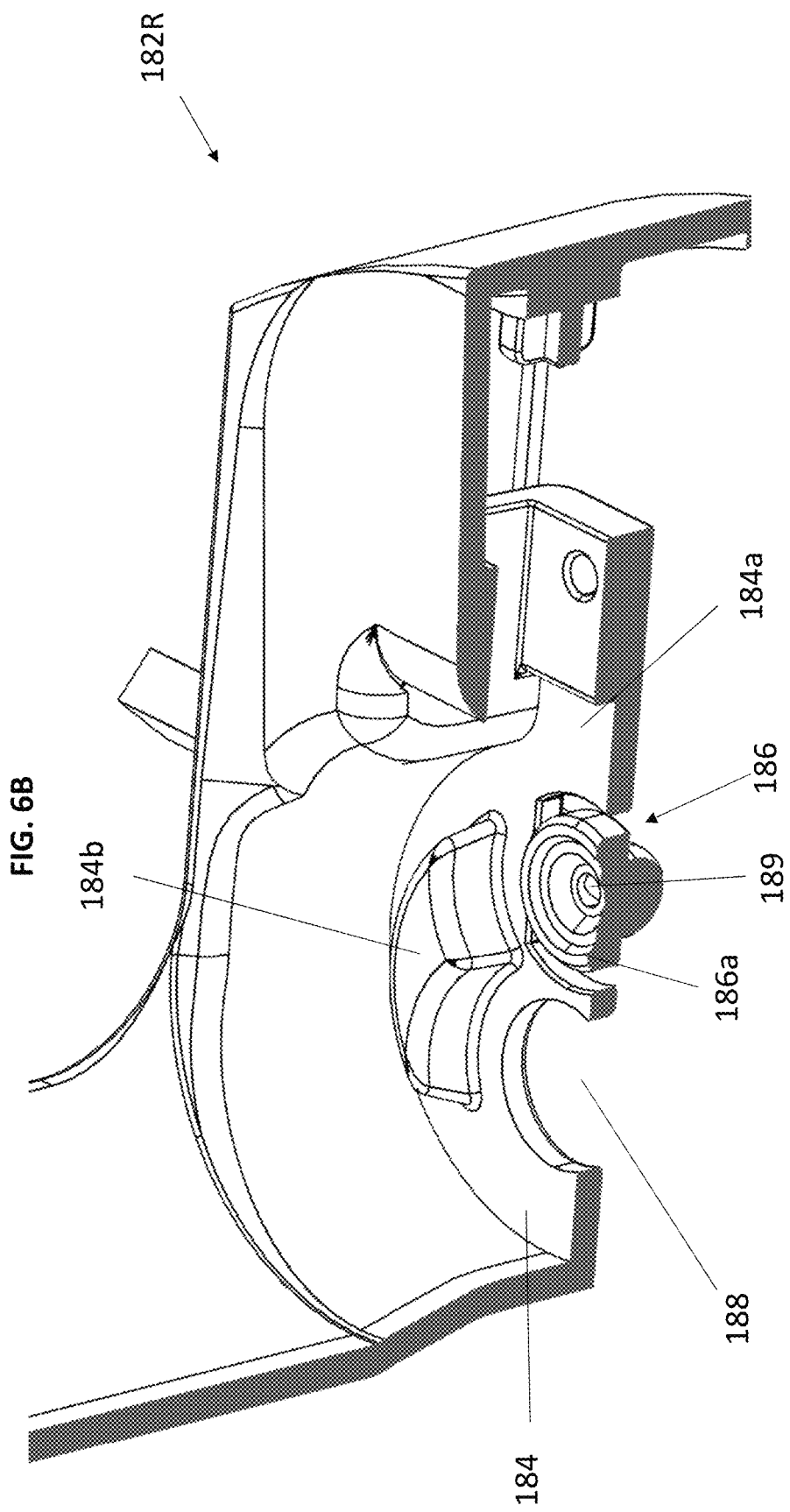

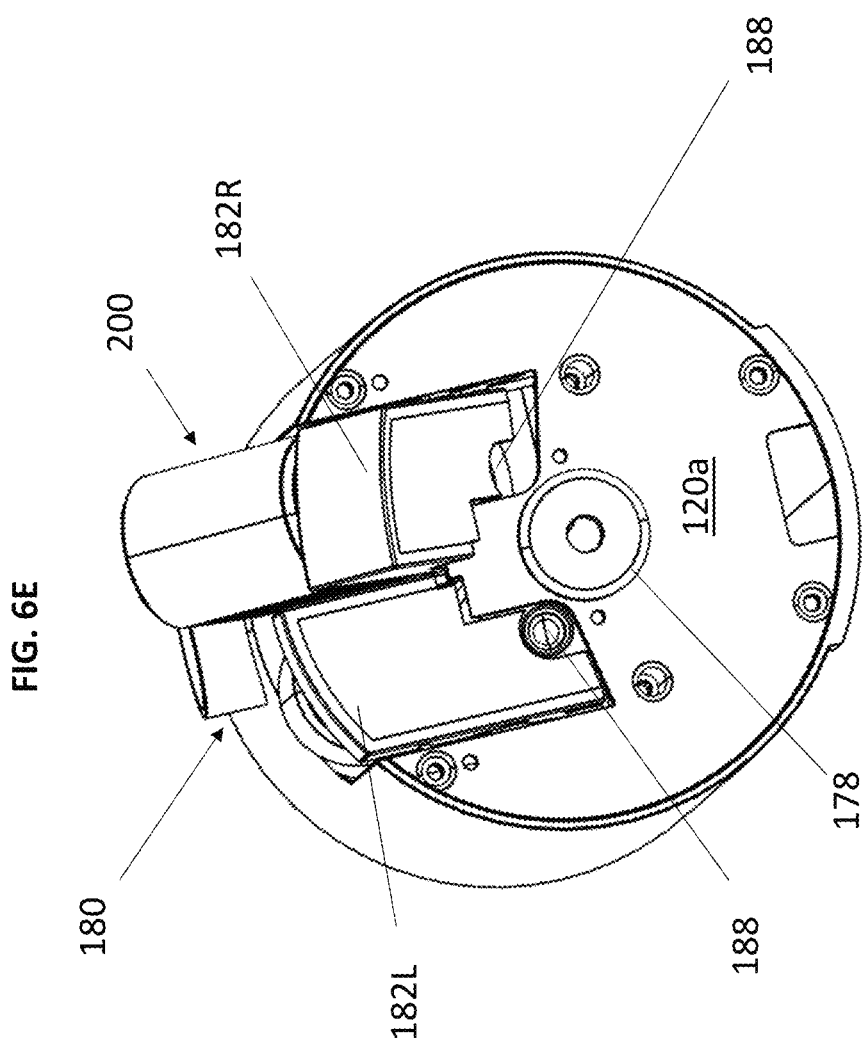

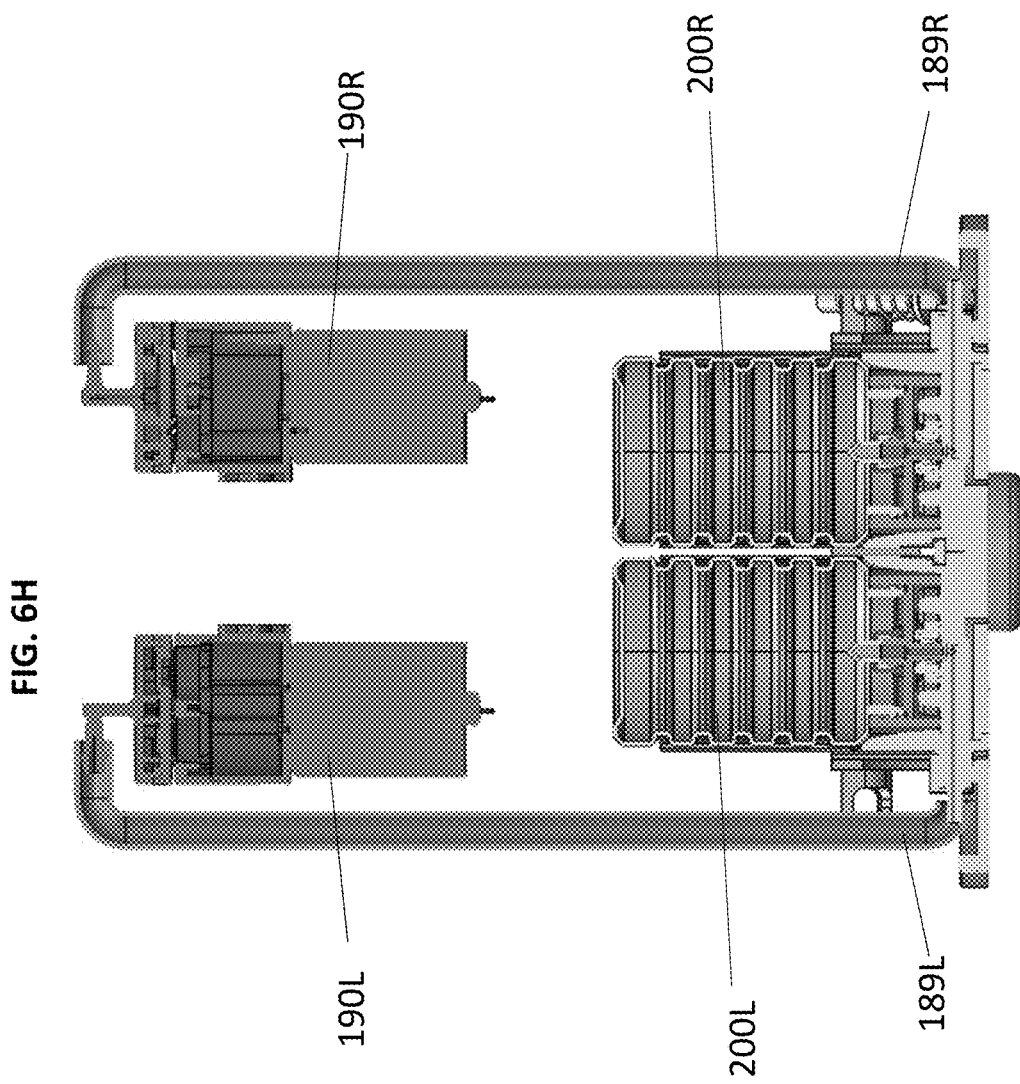

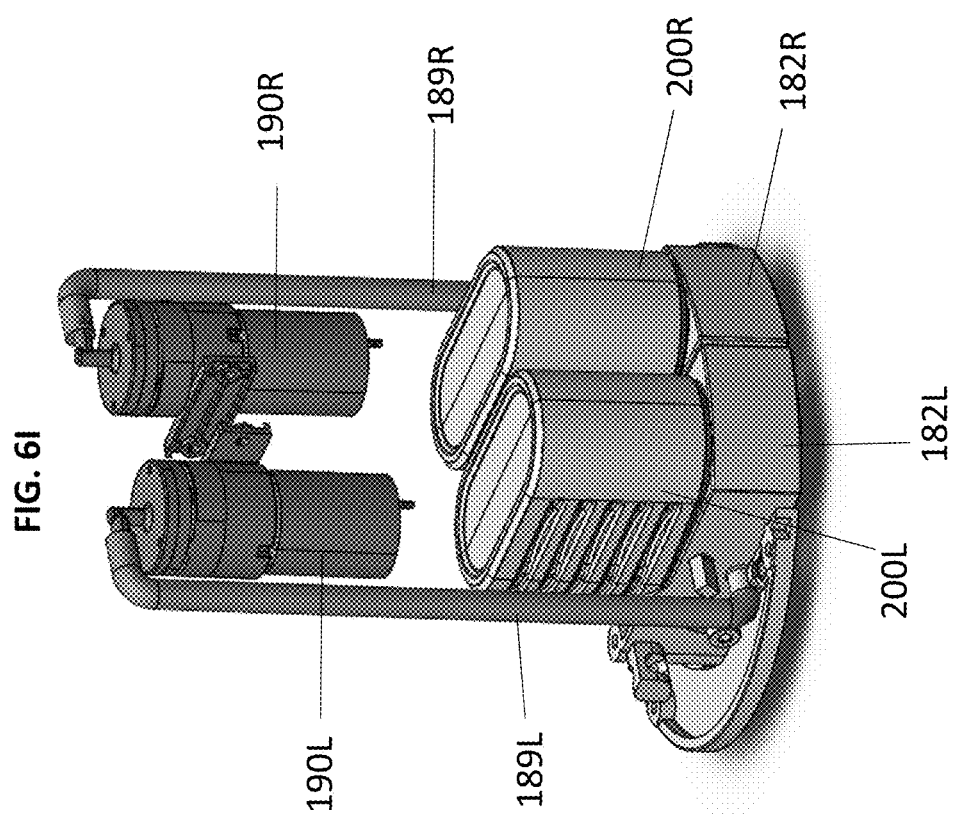

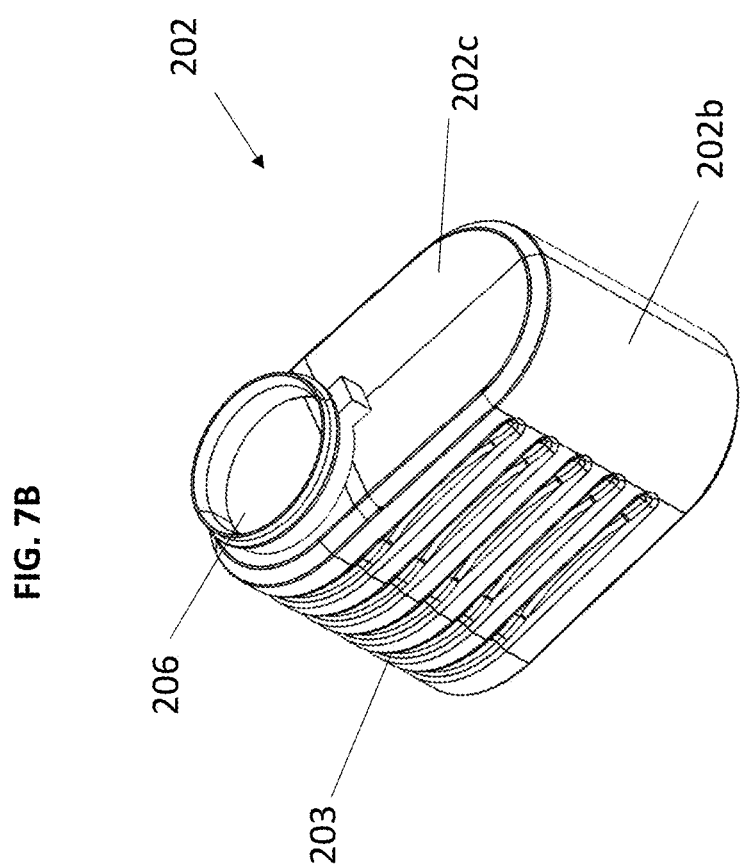

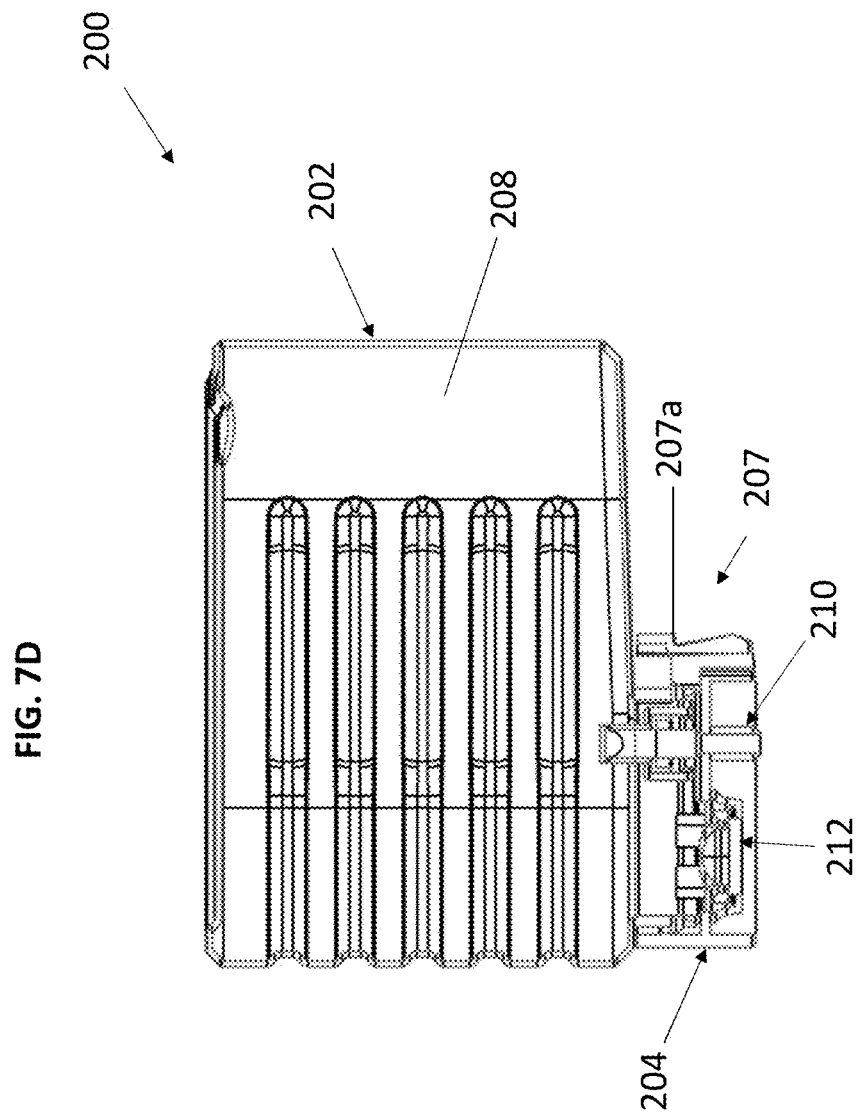

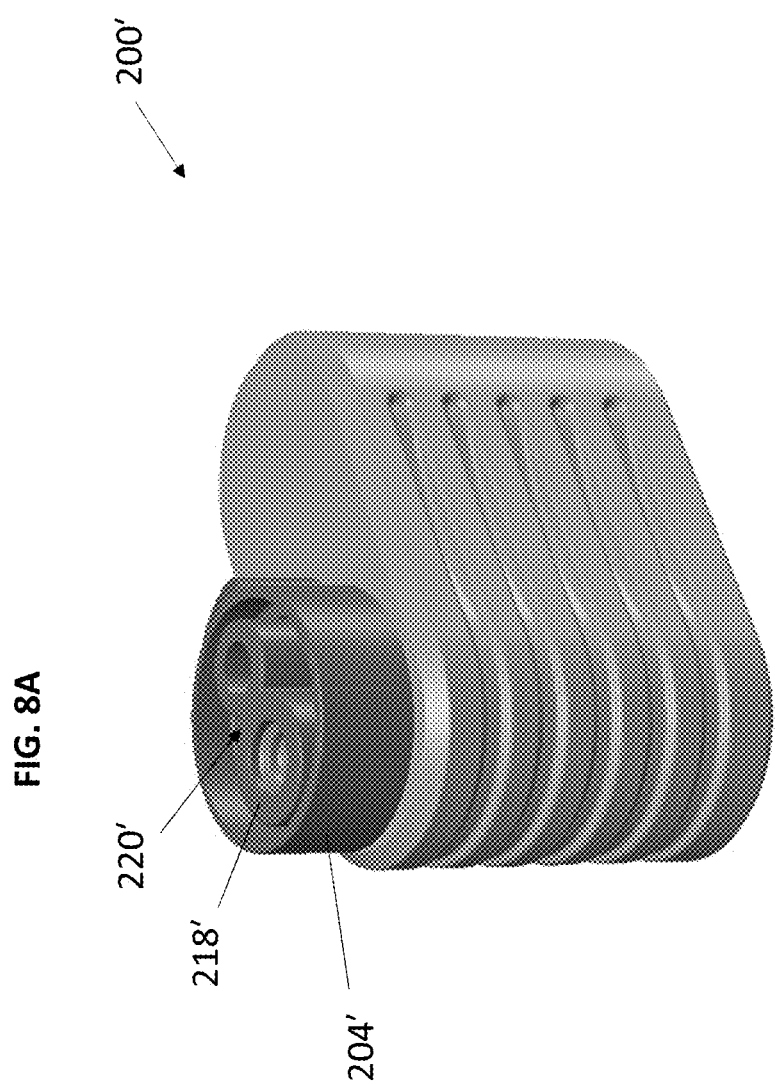

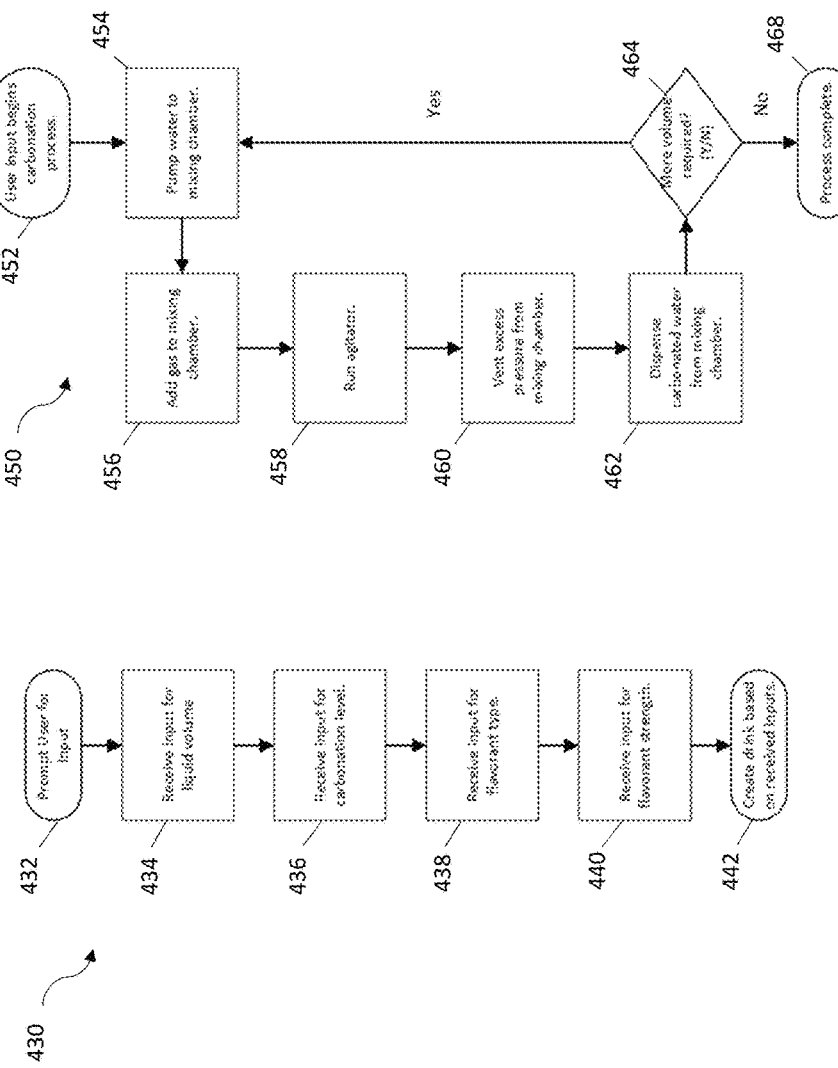

FLAVORED BEVERAGE CARBONATION PROCESS

FIELD

A process for dispensing carbonated and/or flavored beverages is provided.

BACKGROUND

Conventional beverage dispensing devices operate to carbonate and/or flavor water. Some devices may mix carbonated water and a flavoring compound together in a machine and then dispense the resulting mixture into a receptacle. Unless the devices are thoroughly cleaned, this method can result in contamination occurring over time. Other devices rely on crushing, puncturing, and/or generally compromising flavoring containers in order to access the flavoring compounds inside. These methods of breaching flavoring containers can result in splatter and mess, which, if not thoroughly cleaned, can result in similar contamination.

Still other devices rely on carbonating water within a specialized container to be attached to the device, and from which the resulting beverage is served. The container can be pre-filled with water and/or flavoring, and then it can be secured to the devices and pressurized within the container and used to serve the resulting beverage. These devices, however, can create excess plastic waste, as specially adapted bottles must be produced to interface with the device.

Accordingly, there remains a need to provide a better beverage dispensing device to improve on mess creation and waste production.

SUMMARY

A beverage system for preparing a flavored and/or carbonated beverage is provided. Related apparatuses and techniques are also provided.

In one embodiment, a beverage system for preparing a flavored carbonated beverage is provided. The beverage system can have a housing. The housing can include a fluid input configured to receive a first fluid from a fluid source and a fluid output configured to emit a second fluid. A carriage assembly can be movably mounted on the housing. The carriage assembly can include a cavity configured to seat a flavorant container. The cavity can have a port configured to interact with an inlet on the flavorant container to allow a pump in the housing to at least one gas from the port through inlet into the flavorant container.

One or more of the following features can be included in any feasible combination. For example, the at least one gas can include air.

In another example, the first fluid and the second fluid can be the same.

In another example, the first fluid can be water.

In another example, the housing can include a mixing chamber configured to fluidly communicate with the fluid source, and the housing can be configured to coupled to a pressurized gas source to allow a gas to be delivered to the mixing chamber to carbonate the first fluid within the mixing chamber to produce the second fluid.

In another example, the beverage system can include a pump and a conduit coupled to the pump and the port. The pump can be configured to force air along a path. The path can include the conduit, the port, and the inlet into the flavorant container.

In another example, the cavity can include an alignment channel formed in and extending along a sidewall thereof. The cavity can be configured to receive a corresponding projection on a flavorant container to align the flavorant container with the port.

In another example, the cavity can include a hole formed therein and configured to receive a projection on the flavorant container, and the cavity can also include at least one projection extending from a surface thereof and configured to extend into a portion of the flavorant container. In other aspects, the portion can be a cap affixed to a main body of the flavorant container.

In another example, the carriage assembly can be movable between an open configuration to receive a flavorant container, and a closed position in which the carriage assembly prevents removal of the flavorant container. In certain aspects, the carriage assembly can be pivotally coupled to the housing by a hinge and can be movable between the open and closed positions about the hinge.

In another example, the carriage assembly can include first and second independently movable carriages for seating first and second flavorant containers.

In another example, the housing is configured to emit the second fluid in a first stream to emit flavorant in a second stream, and wherein the second fluid and the emitted flavorant form the beverage. In other aspects, the first stream and the second stream are substantially parallel. In still other aspects, the second scream can have a trajectory at an oblique angle from a trajectory of the first stream. The second stream can combine with the first stream in-flight. In further aspects, the housing can include a mixing chamber in fluid communication with the fluid source and coupled to a pressurized gas source to allow a gas to be delivered to the mixing chamber to carbonate the first fluid within the mixing chamber to produce the second fluid.

In another example, the beverage system can include a removable pitcher coupled to the housing and having the water reservoir therein.

In another example, the cavity can include a first cavity, and the carriage assembly can include a second cavity configured to seat a second flavorant container. In certain aspects, the beverage system can include a user interface configured to receive at least one input. The at least one input can characterize a selection between emitting flavorant from the first flavor container and emitting flavorant from the second flavorant container.

In another example, the port can be configured to create a vacuum seal around the inlet when the flavorant container is seated in the cavity.

In another example, the cavity can include at least one projection defining a retention pattern. The retention pattern can be configured to receive a complimentary feature on a flavorant container. In other aspects, the retention pattern can comprise a figure-eight pattern. In further aspects, the complimentary feature on the flavorant container can include two circles of different diameters separated by a space.

In another embodiment, a beverage system for preparing a flavored carbonated beverage is provided. The beverage system can include a fluid dispenser configured to dispense carbonated water and a carriage assembly movably mounted to the fluid dispenser. The carriage assembly can be configured to fixedly seat at least one flavorant container. The fluid dispenser can include an air pump capable of injecting at least one gas into a flavorant container seated in the carriage assembly to cause the at least one flavorant container to dispense flavorant. The carriage assembly can be configured to create a vacuum seal around at least part of the flavorant container before injecting the at least one gas into the flavorant container.

One or more of the following features can be included in any feasible combination. For example, the at least one gas can include air.

In another example, the first fluid can include water.

In another example, the carriage assembly can be configured to seat a plurality of flavorant containers.

In another example, the carriage assembly can have a cavity formed therein and can be configured to receive the flavorant container. The carriage assembly can have a channel extending along a sidewall of the cavity and configured to receive a projection on the flavorant container.

In another example, the carriage assembly can include an outlet port formed therein and can be configured to couple to an inlet port on a flavorant container for allowing air to be injected into the flavorant container.

In another example, the carriage assembly can include an outlet port formed therein and can be configured to couple to an outlet port on a flavorant container to allow the first fluid within the flavorant container to be ejected from the flavorant container. The outlet port in the carriage assembly can be configured to deliver fluid to a receptacle.

In another embodiment, a flavorant container for use in a beverage carbonation system is provided. The flavorant container can include a container defining an interior hollow chamber. The container can have an opening leading to the interior hollow chamber. The flavorant container can also include a cap coupled to the opening of the container. The cap can have an inlet valve that can be sealed to retain fluid within the container and that can be configured to open in response to pressurize air to allow air to be injected into the interior hollow chamber. The cap can also have an outlet valve that can be sealed to retain fluid within the container and that can be configured to open when a pressure within the interior hollow chamber exceeds a predetermine threshold pressure to allow fluid within the container to flow out through the outlet valve.

One or more of the following features can be included in any feasible combination. For example, the inlet valve can define a first flow path and the outlet valve can define a second flow path. The first flow path and the second flow path can be substantially parallel to each other.

In another example, the inlet valve can define a first flow path and the outlet valve can define a second flow path. The first flow path and the second flow path can be angled toward each other.

In another example, the cap can include a first raised collar extending around the inlet valve and a second raised collar extending around the outlet valve. In other aspects, the first raised collar and the second raised collar can at least partially overlap in a figure-eight pattern.

In another example, the cap can include at least one protrusion. The at least one protrusion can be configured to be received by a complimentary retention pattern in a beverage dispensing device.

In another example, the inlet valve can have a first diameter and the outlet valve can have a second diameter. The first diameter can be smaller than the second diameter.

In another example, the cap can include an alignment mechanism configured to orient the cap within a carriage. In certain aspects, the alignment mechanism can comprise a protrusion extending along an exterior surface of the cap.

In another example, the container can be substantially rigid to resist deformation.

In another example, the container can include a plurality of ridges disposed in a sidewall thereof.

In another example, the inlet valve can be a duckbill valve.

In another example, the cap can include an end wall extending across the opening to the interior hollow chamber. The outlet valve can be positioned within the interior hollow chamber inward of the end wall.

In another example, the outlet valve can be recessed within a raised collar.

In another example, the container can have an oblong configuration and the cap is offset from a mid-portion of the container.

In another embodiment, a flavorant container is provided. The flavorant container can include a container defining an interior hollow chamber. The container can have an opening leading to the interior hollow chamber configured to contain a liquid. The flavorant container can also include an exchange assembly fixedly coupled to and projecting from an upper surface of the container and disposed over the opening. The exchange assembly can be configured to seal the interior hollow chamber, and the exchange assembly can include an inlet valve positioned within the interior hollow chamber, an outlet valve, and at least one projection formed thereon. The at least one projection can be configured to aid in alignment of the exchange assembly into a carriage in a beverage carbonation system. The interior hollow chamber can be configured to receive pressurized air through the inlet valve, and the interior hollow chamber can be configured to expel fluid through the outlet valve in response to receiving pressurized air through the inlet valve.

One or more of the following features can be included in any feasible combination. For example, the exchange assembly can include a cap having a hollow cylindrical body with an end wall positioned within the hollow cylindrical body. The inlet and outlet valves can extend across the end wall. In other aspects, the end wall can be positioned across a substantial mid-portion of the exchange assembly.

In another example, the inlet valve can define a first flow path and the outlet valve can define a second flow path. The first flow path and the second flow path can be substantially parallel to each other.

In another example, the container can be substantially rigid to resist deformation.

In another example, the inlet valve can be a duckbill valve.

In another example, the exchange assembly can includes a first collar disposed around the inlet valve and a second collar disposed around the outlet valve. In other aspects, the first collar and the second collar can at least partially overlap in a figure-eight pattern.

In another example, the container can include a plurality of ridges disposed on a sidewall thereof.

In another example, the exchange assembly can be a discrete element. In other aspects, the exchange assembly can be formed by an injection molding process.

In another embodiment, a beverage system for preparing a flavored carbonated beverage is provided. The beverage system can include a housing having a mixing chamber. The housing can be configured to operably couple to a fluid reservoir and a pressurized gas source, and the housing can have a flavorant system configured to operably couple to a flavorant container. The beverage system can also include a processor disposed in the housing and configured to cause, in response to at least one input, a first fluid to be delivered from the fluid source into the mixing chamber and a second fluid to be delivered from the mixing chamber to a receptacle. The processor can also be configured to cause pressurized air to be delivered into the flavorant container to cause a flavorant within the flavorant container to be ejected into the receptacle. Flavorant can be delivered to the container separate from and simultaneously with the carbonated fluid to form a flavored carbonated beverage.

One or more of the following features can be included in any feasible combination. For example, the flavorant can be delivered to the receptacle concurrently to the second fluid being delivered to the receptacle.

In another example, the first fluid and the second fluid can be the same.

In another example, the processor can be configured to cause, in response to the at least one input, gas to be delivered from the pressurized gas source into the mixing chamber to form the second fluid as a carbonated fluid.

In another example, the flavorant can be delivered to the container along a first flow path that is spaced apart from a second flow path of the carbonated fluid being delivered to the container. In other aspects, the first flow path and the second flow path are substantially parallel. In still other aspects, the first flow path is angled toward the second flow path.

In another example, the input can characterize an amount of carbonation to be delivered to the mixing chamber. In other aspects, the amount of carbonation to be delivered is zero.

In another example, the input can characterize an amount of flavorant to be delivered to the receptacle.

In another example, the housing can include a carriage configured to removably seat the flavorant container.

In another example, the flavorant container can include a first flavorant container. The flavorant system can be configured to operably couple to a second flavorant container. In other aspects, the processor can be configured to receive an input indicating a selection of one of the first and second flavorant containers, and the processor can be configured to cause, in response to the input, pressurized air to be delivered into the selected one of the first and second flavorant containers.

In another example, the flavorant container can include an inlet valve and and outlet valve. Pressurized air can be delivered through the inlet valve and the flavorant can be ejected through the outlet valve.

In another embodiment, a carbonated beverage system is provided. The carbonated beverage system can include a housing. The housing can include a mixing chamber fluidly coupled to a fluid reservoir and to a pressurized gas source. The mixing chamber can be configured to receive a first fluid from the mixing chamber and deliver a second fluid to a first fluid outlet on the housing. The housing can also include a flavorant receptacle. The flavorant receptacle can be configured to seat a flavorant container such that the flavorant container is configured to receive pressurized air from a pump in the housing and is configured to deliver flavorant to a second fluid outlet on the housing. The second fluid outlet can be spaced apart from the first fluid outlet, and the first and second fluid outlets can be positioned above a platform configured to support a beverage container.

One or more of the following features can be included in any feasible combination. For example, the second fluid can be the first fluid.

In another example, the first fluid outlet can be configured to deliver the second fluid concurrently with the second fluid outlet delivering flavorant.

In another example, the first and second fluid outlets can define fluid flow paths that are substantially parallel to one another.

In another example, the second fluid outlet can define a fluid flow path that extends transverse to a fluid flow path defined by the first fluid outlet such that flavorant flowing from the second fluid outlet is directed into a path of carbonated fluid flowing from the first outlet.

In another example, the fluid reservoir can be a water pitcher removably coupled to the mixing chamber.

In another example, the housing can include a user interface configured to receive at least one input. The at least one input can control at least one characteristic of the carbonated fluid. In other aspects, the at least one characteristic can be at least one of a fluid volume and a carbonation level.

In another embodiment, a method for preparing a flavored carbonated beverage is provided. The method can include receiving at a processor an input from a user and, in response to the input, causing gas from a pressurized gas source to be delivered into a mixing chamber containing a fluid to thereby form a carbonated fluid. The method can also include causing the carbonated fluid to be delivered into a container, and causing a flavorant to be delivered into the container along a fluid flow path that is spaced apart from and substantially parallel to a fluid flow path of the carbonated fluid being delivered into the container.

One or more of the following features can be included in any feasible combination. For example, the at least one input can characterize at least one of a flavor type, a carbonation level, a volume of carbonated fluid to be delivered into the container, and a volume of flavorant to be delivered into the container.

In another example, the method can include, in response to the input, causing a fluid from a fluid storage tank to be delivered into the mixing chamber. In other aspects, the fluid storage tank can be a water pitcher removably coupled to the mixing chamber.

In another example, the method can include seating a flavorant container containing the flavorant in a carriage assembly.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

These and other features will be more readily understood from the following detailed description taken in conjunction with the accompanying drawings, in which:

FIG. 1A is a front view of one embodiment of a beverage dispensing device having a water reservoir coupled thereto;

FIG. 1B is a front perspective view of the beverage dispensing device of FIG. 1A, having the water reservoir removed;

FIG. 1C is a bottom perspective view of the beverage dispensing device of FIG. 1B;

FIG. 1D is a rear perspective view of the beverage dispensing device of FIG. 1B, having a door open to reveal a $CO_2$ cavity;

FIG. 2A is a front perspective view of a drip tray of the beverage dispensing device of FIG. 1A;

FIG. 4B is a bottom perspective view of the water reservoir of FIG. 1A;

FIG. 4C is a side cross-sectional view of a valve section of the water reservoir of FIG. 1A;

FIG. 5C is a left side view of the mixing assembly of FIG. 5B;

FIG. 6B is a left cross-sectional view of a carriage of the carriage assembly of FIG. 6A;

FIG. 6E is a bottom perspective view of the carriage assembly of FIG. 6A;

FIG. 6H is a cross-sectional view of the carriage assembly of FIG. 6A, having air pumps attached to air lines;

FIG. 6I is a left perspective view of the carriage assembly of FIG. 6H;

FIG. 7B is a perspective view of the flavorant container of FIG. 7A without a cap;

FIG. 7D is a side cross-sectional view of the flavorant container of FIG. 7A;

FIG. 8A is a perspective view of a flavorant container according to another embodiment;

FIG. 10C is a system process diagram for an illustrative user input sub-process for the control process of FIG. 10A;

FIG. 10D is a system process diagram for an illustrative carbonation sub-process for the control process of FIG. 10A;

FIG. 10E is a system process diagram for an illustrative flavoring sub-process for the control process of FIG. 10A;

Figure 1E:
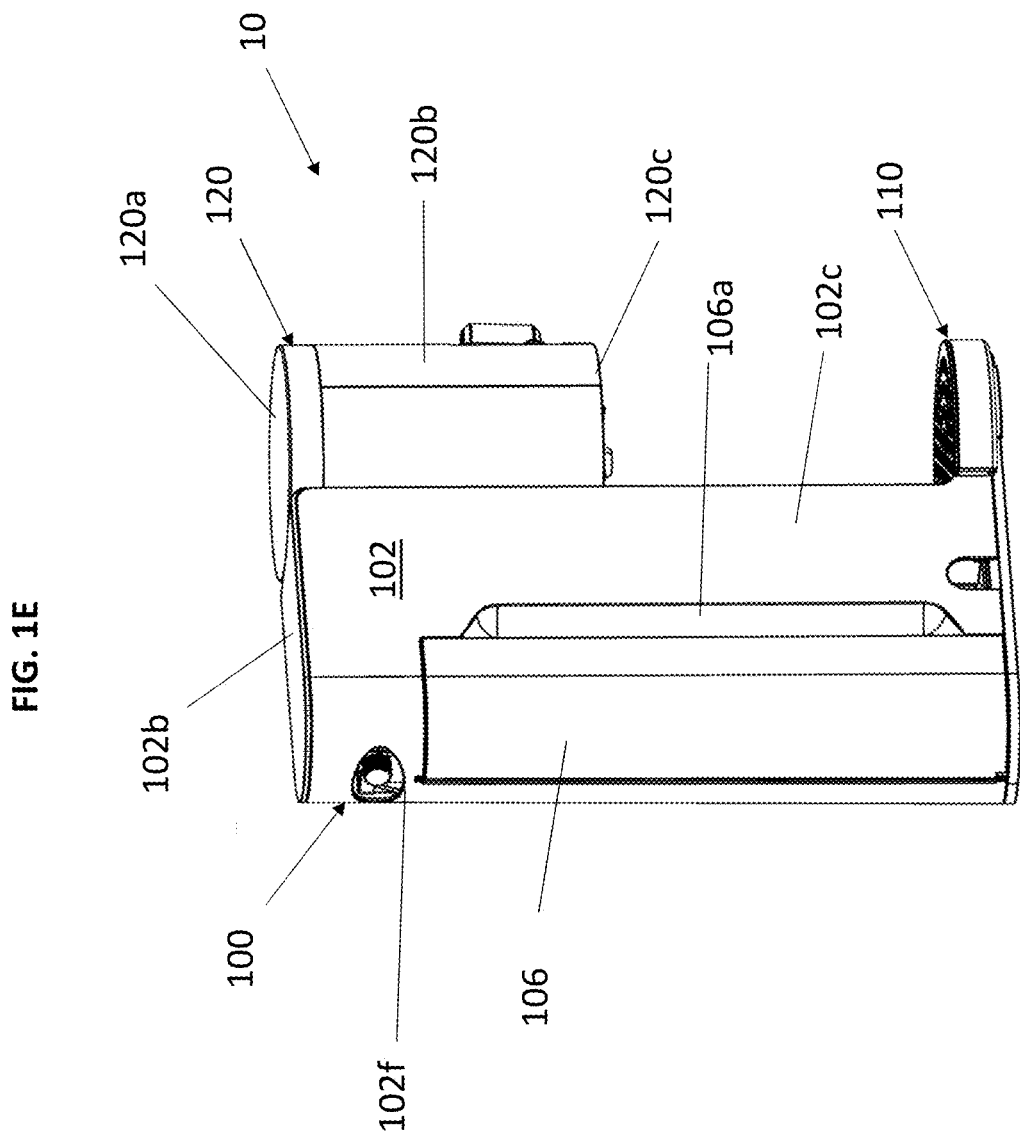
FIG. 1E is a rear perspective view of the beverage dispensing device of FIG. 1B with a door removed to reveal a $CO_2$ canister disposed within a canister cavity.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain illustrative embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting illustrative embodiments and that the scope of the present invention is defined solely by the claims. The features illustrated or described in connection with one illustrative embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

A beverage dispensing device is provided that can carbonate and/or flavor, and dispense beverages. The device can receive user inputs at a user interface, and these inputs can include customization options for creating a beverage, including fluid volume, carbonation level, flavor type, and flavor strength. When the inputs are received, a carbonation system can create carbonated water using water sourced from a water reservoir (or other source) coupled to the device and carbon-dioxide sourced from a carbon-dioxide canister (or other source) coupled to the device. The amounts of water (or other fluid) and carbon-dioxide to be used to create the beverage can be determined based on the received user inputs. The device can also receive one or more flavorant containers at a carriage assembly, each of which can be selected for dispensing by a user in order to flavor the newly-created carbonated water. During a dispensing process, pressurized air can be introduced into a flavorant container via an inlet, and flavorant can be ejected via an outlet. The carbonated water and the flavorant can be ejected from separate nozzles into a drinking glass (or other receiving vessel, e.g., a travel mug) where they are mixed together. In other embodiments, the beverage can contain uncarbonated water and a flavorant to form an uncarbonated flavored beverage. In some embodiments, the flavorant may be dispensed at an angle relative to the flow of the dispensed carbonated water so that the carbonated water and flavorant are combined in flight before reaching the drinking glass.

With reference now to FIGS. 1A-1E, an illustrative embodiment of a beverage dispensing device 10 is shown. The illustrated beverage dispensing device 10 generally includes a housing assembly 100 having a carbonation assembly (not shown) disposed therein, a carriage assembly 180 configured to hold one or more flavorant containers 200, and a controller (also referred to as a processor, not shown) with a user interface (UI) 300 for receiving instructions from a user. A fluid reservoir 130 is coupled to the housing assembly 100 and is configured to contain a fluid to be delivered to the carbonation assembly. The housing assembly 100 can also include a drip tray 110 configured to support a container, such as a glass, for collecting fluid. In operation, a user can provide various inputs to the UI and the beverage dispensing device 10 can dispense a carbonated or uncarbonated water, as may be desired, and optionally a flavorant to flavor the carbonated or uncarbonated fluid.

As shown in FIGS. 1A-1E, the illustrated housing assembly 100 includes a housing 102 having an elongate, upright hollow body with top and bottom ends 102a, 102b, a left side 102c, a right side 102d, a front side 102e, and a back side 102f. In the illustrated embodiment, the housing is oblong, and the shape of the housing 102 is longer from the front side 102e to the back side 102f than it is from the left side 102c to the right side 102d. The front side 102e is shown having a flat façade, and the back side 102f is shown having a rounded convex façade, while each of the left and right sides 102c, 102d, is substantially flat. However, the housing 102 can have any shape, and as such, in various embodiments, the shape of the housing 102 can vary to include additional rounded or flat components, or other forms beyond what is shown. The housing 102 can be sized to fit internal components of the beverage dispensing device 10, discussed in further detail below. The housing 102 can be made of any suitable material or materials, and can include various metals (e.g., stainless steel, aluminum), plastics, glass, or other suitable materials known to those skilled in the art, alone or in combination.

The bottom side of the housing 102 can provide the beverage dispensing device 10 with a flat base, and the bottom side can include supports or feet 103 which can provide additional stability. The feet 103 can be in any form, and in one embodiment, as shown in FIG. 1C, the feet are elongate and are disposed around an outer edge of the bottom side 102a. To prevent the housing 102 from sliding on a surface, the feet 103 can be made from a higher-friction material, such as rubber, or have a portion of a higher-friction As further shown, the housing 102 includes a head assembly 120 located on an upper portion of the front side 102e of the housing 102. The head assembly 120 can be substantially cylindrical in shape, and includes a top side 120a which aligns with the top side 102b of the housing 102, and a bottom side 120c which includes various openings for dispensing fluids used in the creation of drinks. Between the top side 120a and the bottom side 120c is an outer surface 120b, which defines the rounded form of the cylindrical head assembly 120. The head assembly 120 can contain components of a mixing assembly configured to carbonate fluids (e.g., water), which can then be dispensed from the bottom side. Further, the head assembly 120 can be configured to receive one or more flavorant containers 180, which can be utilized in the creation of beverages. The outer surface 120b of the head assembly 120 can include UI 300 for receiving inputs for operating the device. The mixing assembly, dispensing of fluids, and the creation of beverages, including through operation of the UI 300, will be discussed in greater detail below.

FIG. 1D shows a $CO_2$ cavity 104 according to the illustrated embodiment. The $CO_2$ cavity 104 is an opening in the housing, which can receive a $CO_2$ source used in carbonation processes. In the illustrated embodiment, the $CO_2$ cavity 104 is located in the rear left side 102c of the housing 102, although the $CO_2$ cavity 104 can be in other locations. The $CO_2$ cavity 104 can be closed off by a door 106, as seen in FIG. 1E. The door 106 can extend from the bottom side 102a upward and it can follow a contour of the left side 102c and into the back side 102f. The door 106 can be attached to the housing 102 by a means such as via a hinge or by magnets, or it can be mated using other techniques known in the art. In the illustrated embodiment, the door 106 is wholly removable from the housing 102, but it can be secured to the housing in any of a variety of ways, e.g., by several magnets (not shown) disposed in the door 106 and in the housing 102. A cutaway 106a can be formed in the housing 102, which enables a user to grasp and remove the door 106 while maintaining a uniform shape of the overall housing 102.

The door 106 can be moved between a closed position in which the $CO_2$ cavity 104 is closed off, and an open position in which the $CO_2$ cavity 104 is open. When the door 106 is in the open position, the $CO_2$ source is accessible. In the illustrated embodiment, the $CO_2$ source is in the form of a canister 161, which will be described in more detail below.

Figure 2B:
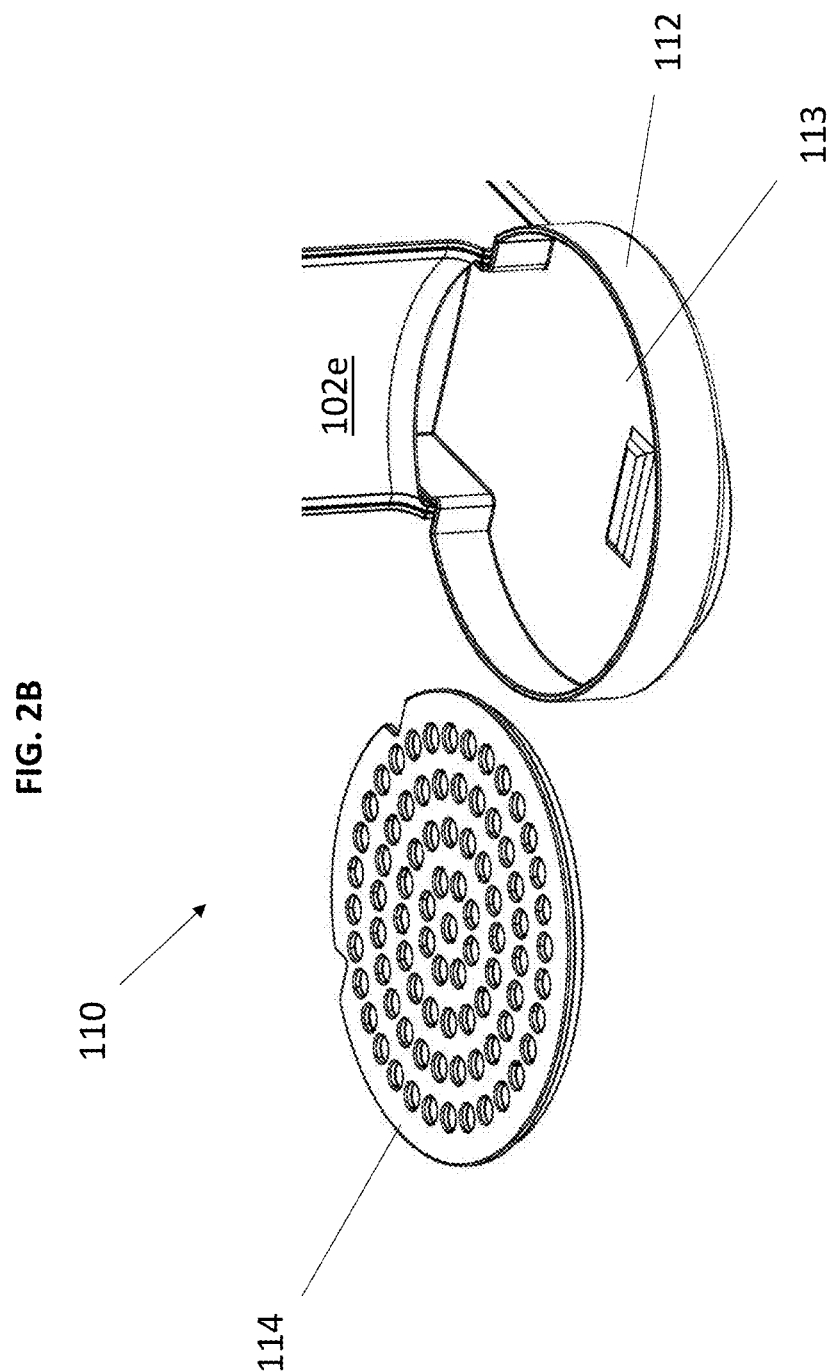
FIG. 2B is a front perspective view of the drip tray of FIG. 2A having a grate removed.

As introduced above, the housing 102 can include a drip tray 110, which can be seen in detail in FIGS. 2A-2B. The drip tray 110 extends from a lower portion of the front side 102e beneath the head assembly 120. The drip tray 110 can have any shape or form, and in the illustrated embodiment, it is flat and round while also corresponding to the size of the head assembly 120. In some embodiments, the drip tray 110 can be integral with the housing 102, while in other embodiments it can be fully removable from the housing 102. Removing the drip tray 110, or not including a drip tray, may allow taller receiving vessels to fit under the head assembly 120. It may also allow for a shorter overall system 10' having a head assembly with a lower bottom, while still accommodating a same vessel height that can be accommodated with the system 10 and the drip tray 110.

The illustrated drip tray 110 includes a trough 112 defining a central cavity 113, and a grate 114 placed atop the trough 112 and covering the central cavity 113. The grate 114 includes a plurality of holes. During operation of the beverage dispensing device 10, the trough 112 can act to catch and retain splashed or dripping fluid, which can pass through the holes in the grate 114 and can be collected within the central cavity 113. The drip tray 110 can be made of any material, similar to the housing 102, and it can be the same material or a different material as the housing. The trough 112 and the grate 114 can also be made from the same material or from different materials. The trough 112 and grate 114 can be removable from the housing to allow a user to discard any collected fluid. In some embodiments, the system 110 may vent fluid into the drip tray 110 for various purposes, so that it can leave the system 10 as needed without resulting in a mess.

Figure 3A:
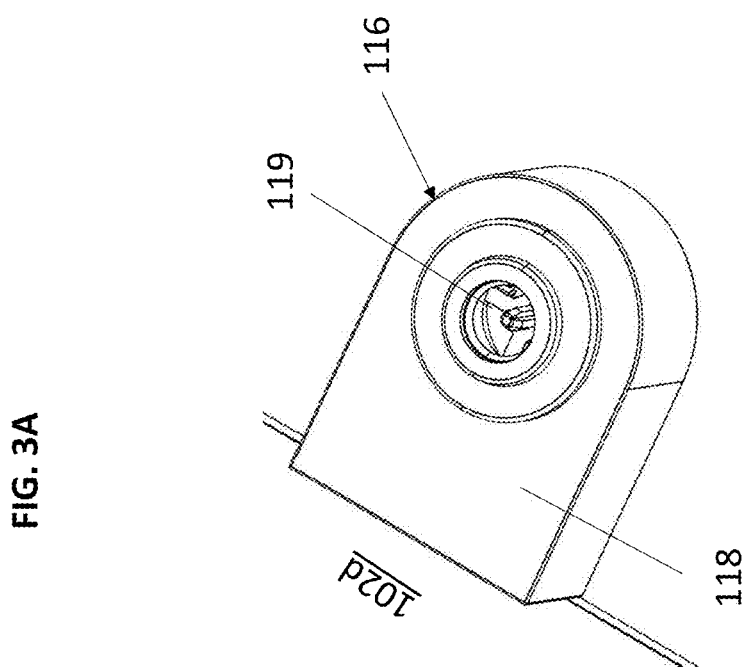
FIG. 3A is a front perspective view of a reservoir valve seat of the beverage dispensing device of FIG. 1A.
Figure 3B:
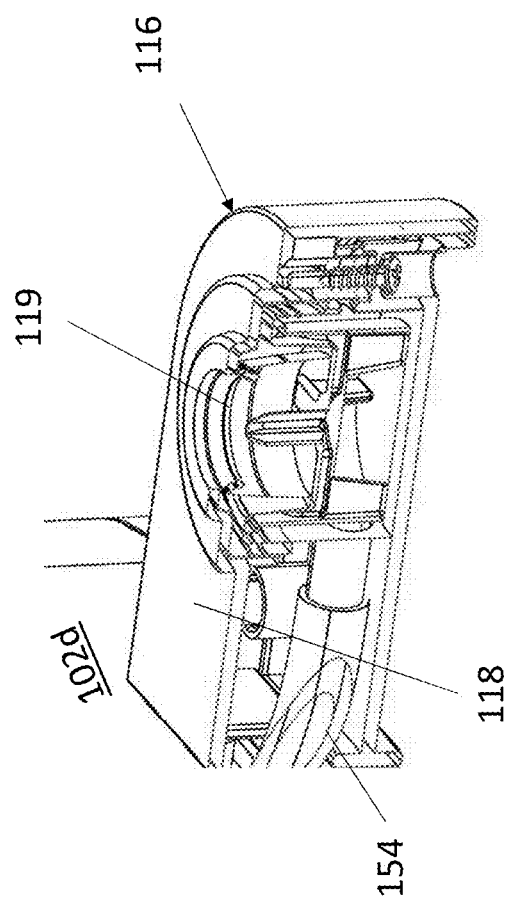
FIG. 3B is a side perspective cross-sectional view of the reservoir valve seat of FIG. 3A.

As indicated above, the fluid reservoir 130 can be coupled to the housing 100 for storing fluid to be delivered into the carbonation system. FIGS. 3A-3B illustrate a reservoir valve seat 116 configured to couple the fluid reservoir 130 to the carbonation system. The illustrate reservoir valve seat 116 extends outward from the right side 102d of the housing 102 at the same level as the bottom side 102a. In this manner, the reservoir valve seat 116 can provide extra support to preventing tipping of the beverage dispensing device 10. In other embodiments, the reservoir valve seat 116 can be located at the back side 102e, left side 102c, or in any other location. The reservoir valve seat 116 can be in the form of a hollow housing 118 having an upward extending valve 119. The upward extending valve 119 can be received by a corresponding valve structure located on the bottom side of a water reservoir. FIG. 3B also shows valve 119 coupled to water tubing 154 inside of the reservoir valve seat 116. This tubing 154 can allow fluid to be delivered to the carbonation assembly 150, which will be discussed later in more detail.

Figure 4A:
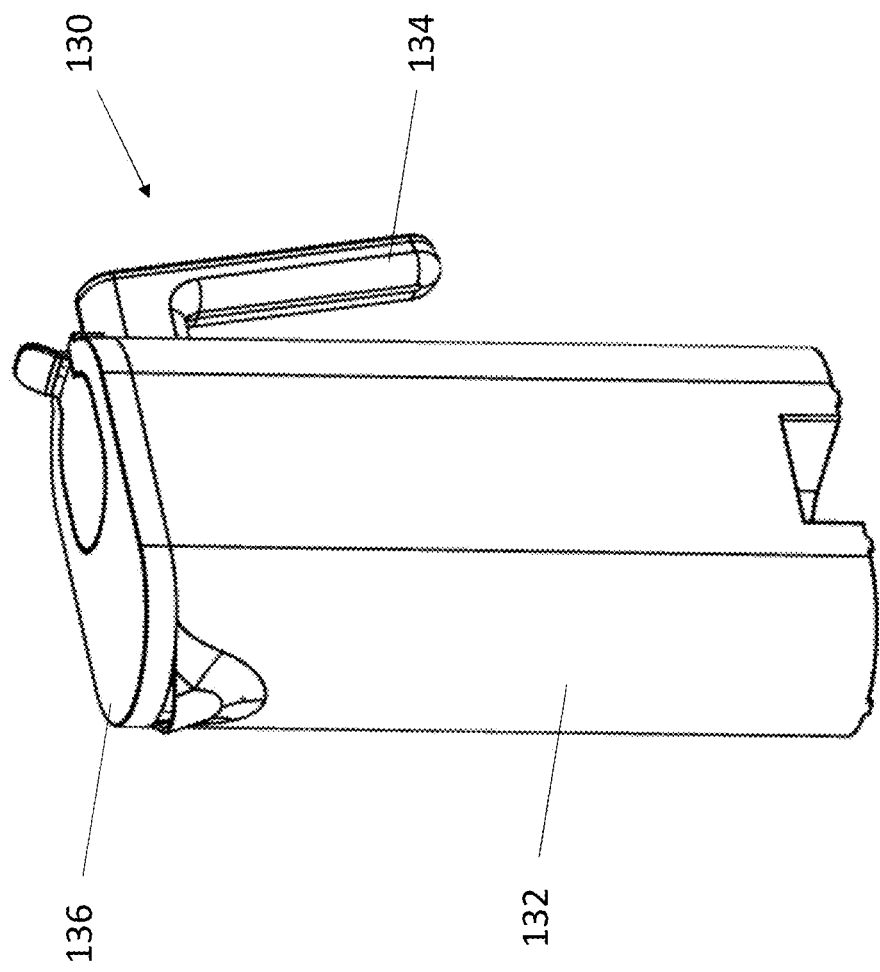
FIG. 4A is a front perspective view of the water reservoir of FIG. 1A.

FIGS. 4A-4B show a water reservoir 130 according to an illustrative embodiment. The water reservoir 130, generally, is a container for holding fluid, such as water, which can interface with the reservoir valve seat 116 to thereby enable fluid communication between the water reservoir 130 and the beverage dispensing device 10 for use in the creation and dispensing of beverages. The water reservoir 130 can have any shape, and it can be designed to complement the shape and size of the housing 102. For example, both the water reservoir 130 and the housing 102 can have flat sides to minimize the overall footprint of the system. In the illustrated embodiment, the water reservoir 130 is shown in the form of a pitcher, and it has a main container 132, a handle 134, and a removable lid 136. A bottom side 132a of the container 130 is recessed, and a support 133 extends around the perimeter of the bottom side 132a.

On the bottom side 132a is a valve structure 140 which can be received by the upward extending valve 119 of the reservoir valve seat 116. The valve structure 140 includes a central plug 142 seated within a central valve silo 144. Surrounding an upper extent of the central plug 142, within the water reservoir 130, is a valve guard 146. The valve guard 146 is mounted to the water reservoir 130 and blocks off direct access to the central plug, while still allowing fluid to flow through the valve structure 140. When not received on the upward extending valve 119, the central plug 142 is biased downward within the central valve silo 144 to a closed position to retain fluid in the water reservoir 130. When the valve structure 140 is received on the upward extending valve 119, the central plug 142 can be moved upward within the central valve silo 144 to an open position to allow fluid to flow from the water reservoir 130 through the valve structure 140 and into the rest of the beverage dispensing device 10.

Figure 5A:
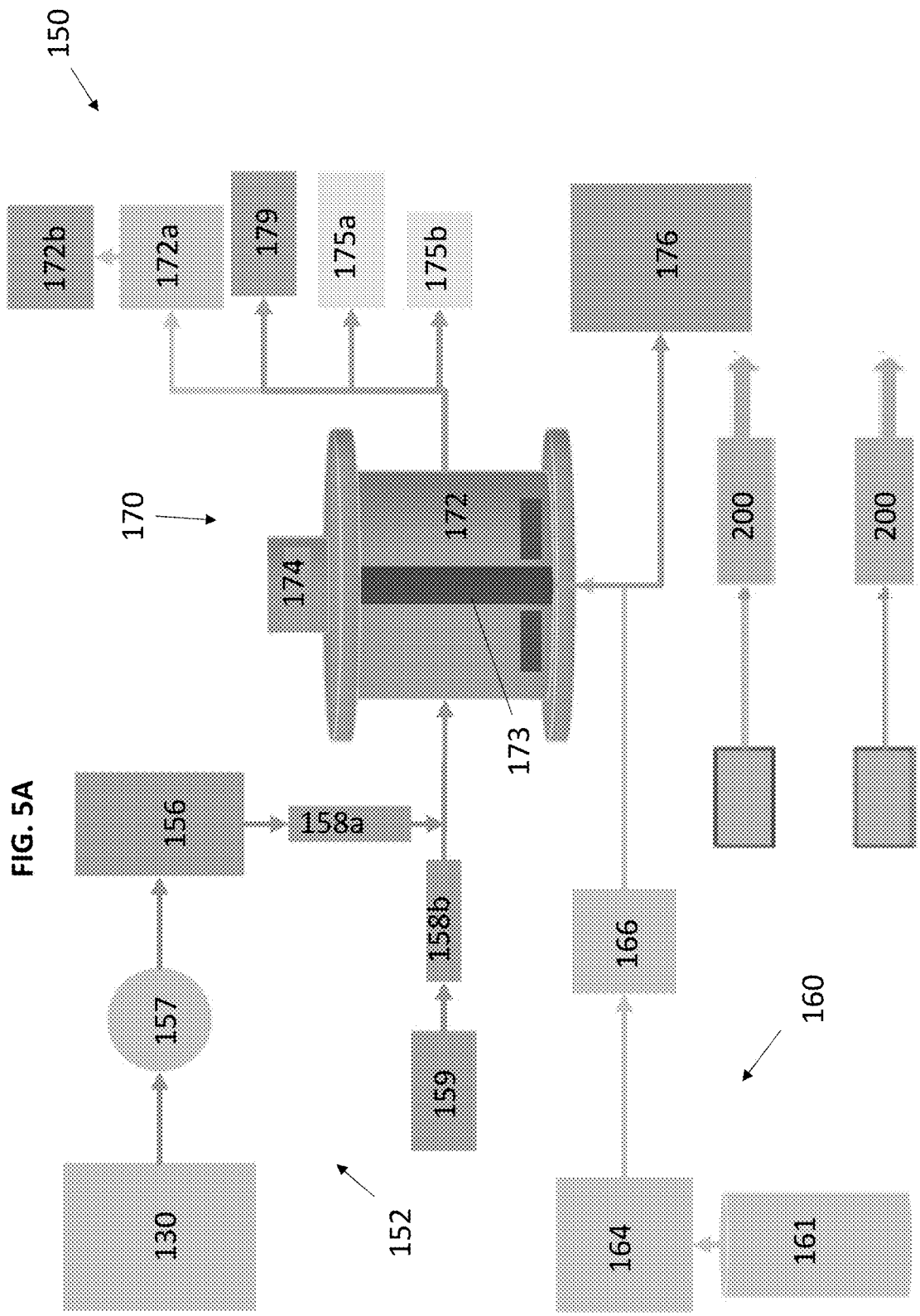
FIG. 5A is a system diagram of the beverage dispensing device of FIG. 1A, having a carbonation assembly.
Figure 5B:
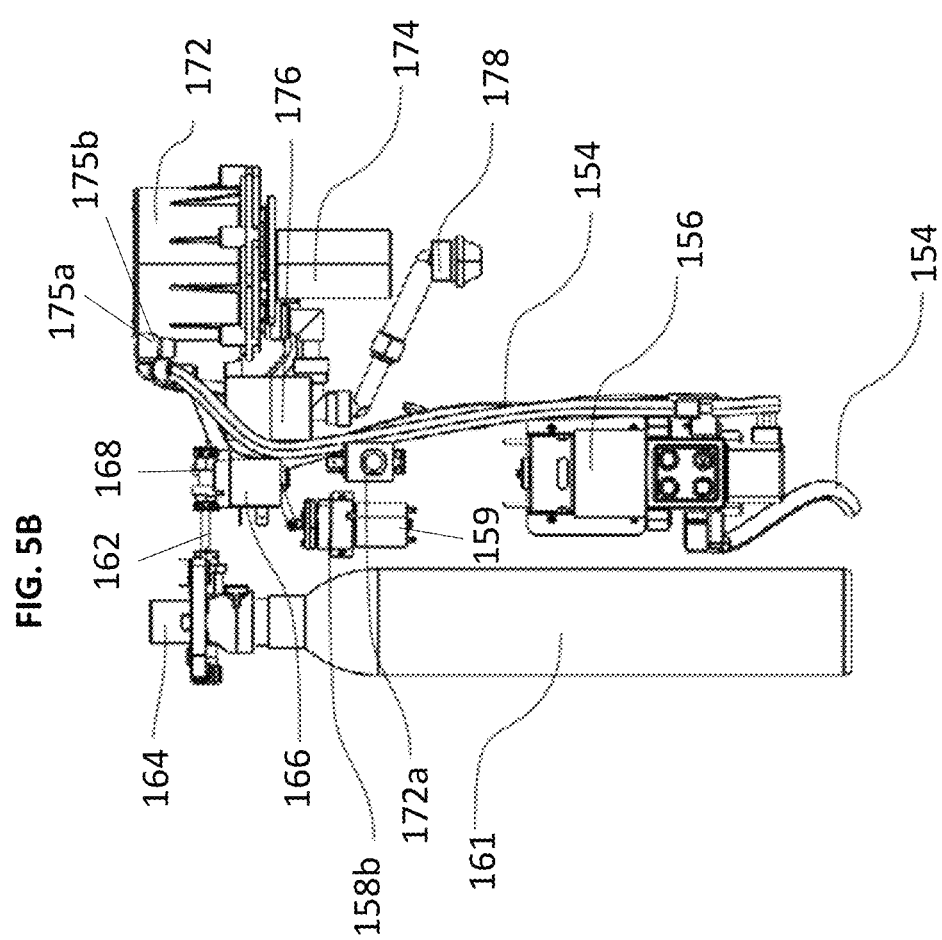
FIG. 5B is a left side view of the carbonation assembly of FIG. 5A, including a mixing assembly, according to some embodiments.

FIGS. 5A-5C illustrate an illustrative carbonation assembly 150. The carbonation assembly 150 can be contained within the housing 102, and it can be used to create carbonated water for use in beverages. The illustrated carbonation assembly 150 generally includes a water line 152, a gas line 160, and a mixing assembly 170. The mixing assembly 170 receives water from the water line 152 and gas (in the form of $CO_2$) from the gas line 160 in order to create carbonated water.

The water line 152 is coupled to the water reservoir 130 and also can include any of: the valve structure 140, the valve seat 116, water tubing 154, a water pump 156, and a flow meter 157. The water tubing 154 runs from the valve seat 116 and through interior of the housing 102 to the mixing assembly 170. Near the point of connection to the mixing assembly, a first check valve 158a and a second check valve 158b can be disposed, which can selectively permit water flow into the mixing assembly 170 and prevent the backflow of water from the mixing assembly 170. Upstream from the second check valve 158b is a purging pump 159, which can be used to send pressurized air into the mixing assembly 170, in order to purge the mixing assembly 170 of still water and carbonated water between uses. A water pump 156 and a flow meter 157 can also be disposed in the water tubing 154 line. The water pump 156 operates to pump water out of the water reservoir 130, through the valve seat 116, through the water tubing 154, and into the mixing assembly 170. The flow meter 157 can measure the amount and/or rate of water passing through the water line 152 and into the mixing assembly 170 in order to accurately measure quantities needed for the creation of drinks. In various embodiments, a flow meter 157 may not be used, and instead a sensor can be placed within the mixing assembly to gauge a total volume of fluid entering the mixing chamber 172. Such a sensor could be a float sensor or other means by which to gauge a volume.

The gas line 160 can include any of: the $CO_2$ canister 161 or equivalent source, a regulator 164, a gas solenoid 166, and gas tubing 162. The gas tubing 162 runs from the $CO_2$ canister 161 to the mixing assembly 170. Similar to the water line 152, the gas line 160 can include a gas check valve 168 at the point of connection with the mixing assembly 170, which can selectively permit gas flow into the mixing assembly 170 and prevent backflow from the assembly 170 into the gas line 160. As mentioned above, the $CO_2$ canister 161 sits within the $CO_2$ cavity 104 and can supply carbon-dioxide to the beverage dispensing device. The $CO_2$ canister 161 can be a replaceable unit containing pressurized carbon-dioxide, and when the canister 161 is empty, the canister 161 can be replaced in order to keep a supply of carbon-dioxide ready for future operation. The canister 161 can be connected to a regulator 164, which can lead to a gas solenoid 166 that is actuatable to open and close the passage of carbon-dioxide along the gas line 160 and into the mixing assembly 170.

Both the water line 152 and the gas line 160 lead to the mixing assembly 170, which can be used to create carbonated water (or other fluid) from water (or other fluid) inputted via the water line 152 and the gas line 160. The mixing assembly 170 in the illustrated embodiment is disposed in the head assembly 120, and it can include a mixing chamber 172, an agitator 173, a motor 174, a dispenser valve 176, and a nozzle 178. The specific arrangement of the mixing assembly 170 can vary, and its relation to other components contained within the housing 102, as well as its relation to the housing 102, can vary as well. In the illustrated embodiment, the agitator 173 is disposed within the mixing chamber 172, and the motor 174 is disposed beneath the mixing chamber 172. The dispenser valve 176 is located on an underside of the mixing chamber 172, which leads to the nozzle 178. The nozzle 178 can sit within the bottom side 120a of the head assembly 120 and can dispense carbonated and/or still water (or another fluid) for drinks.

The mixing chamber 172 can include an emergency pressure relief valve 179, a pressure sensor 175a which can measure an internal pressure of the mixing chamber 172, and a temperature sensor 175b which can measure an internal temperature of the mixing chamber 172. The temperature sensor 175b can be an NTC, a thermistor, a thermocouple, or any other type of sensor capable of measuring temperature. Additionally, the mixing chamber 172 can include a vent solenoid 172a and a back-pressure pressure relief valve 172b, which can each be actuated to regulate an internal pressure of the mixing chamber 172, for example, to release pressure from within the mixing chamber 172 at the end of a carbonation procedure, before dispensing the carbonated fluid. The carbonation procedure will be described in detail below.

With reference now to FIGS. 6A-6I, a carriage assembly 180 and a flavorant container 200 are shown according to one embodiment. The carriage assembly 180 can retain at least one flavorant container 200 including a flavorant, which can be dispensed and combined with carbonated or uncarbonated water (or other fluid) to create flavored beverages.

Figure 6A:
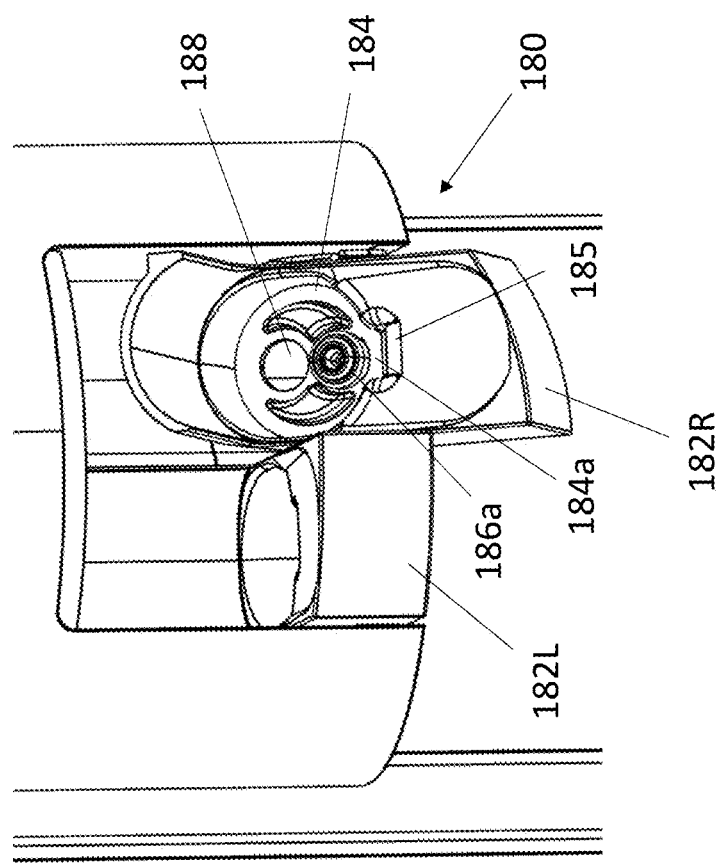
FIG. 6A is a front perspective view of a carriage assembly used with the beverage dispensing device of FIG. 1A, according to some embodiments.
Figure 6C:
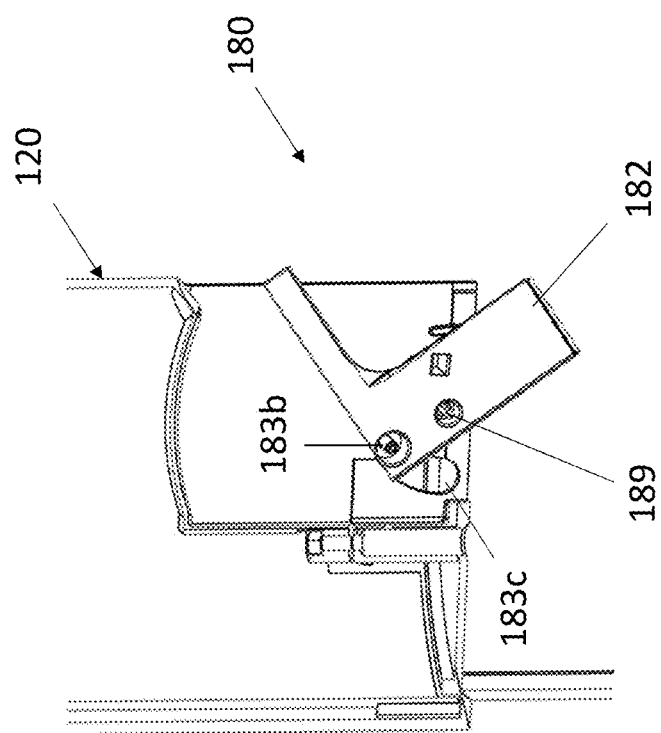
FIG. 6C is a left cross-sectional view of the carriage assembly of FIG. 6A.
Figure 6D:
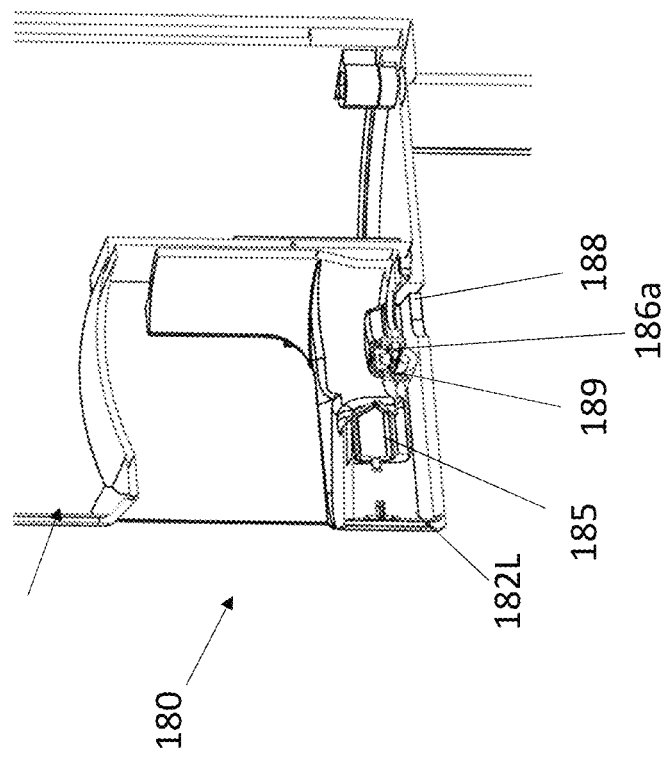
FIG. 6D is a side perspective cross-sectional view of the carriage assembly of FIG. 6A.
Figure 6F:
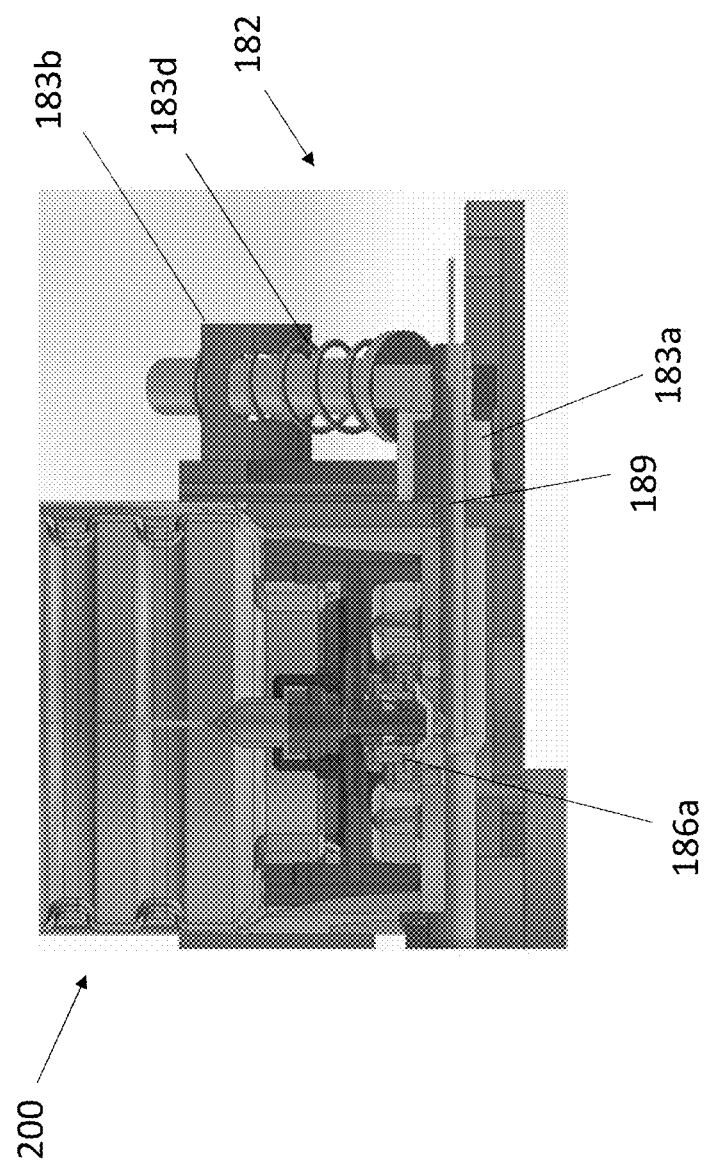
FIG. 6F is a side cross-sectional view of a flavorant container seated on the carriage assembly of FIG. 6A, showing an air line of the carriage assembly.
Figure 6G:
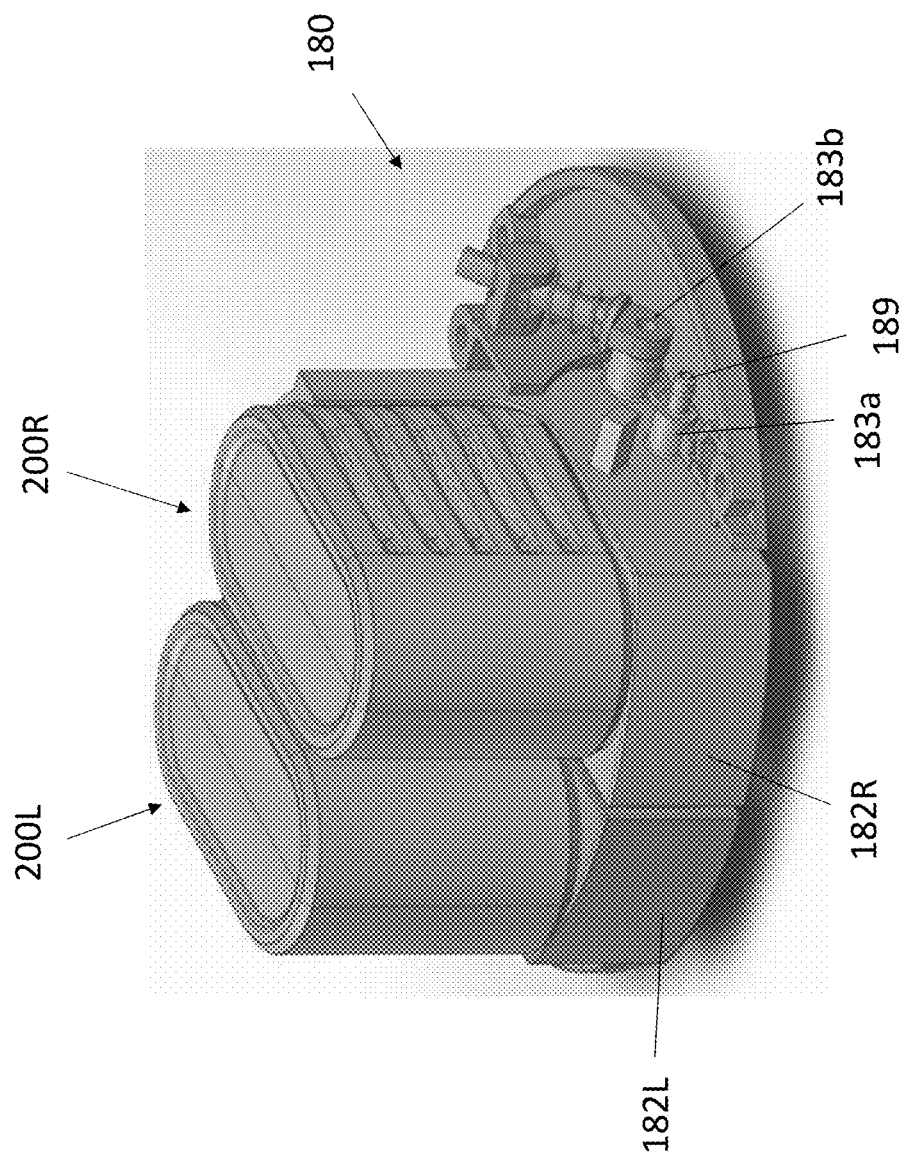
FIG. 6G is a perspective view of the carriage assembly of FIG. 6A, having two flavorant containers seated thereon, according to some embodiments.

The carriage assembly 180 can be located within the head assembly 120, and it is shown having left and right carriages 182L, 182R, which can each retain a flavorant container 200L, 200R. In other embodiments, a different number of carriages can be used to retain a different number of flavorant containers. The left and right carriages 182L, 182R can be structurally the same but mirrored relative to each other, so description will only be provided for one carriage 182R. The carriage 182R can be attached to the head assembly 120 via a pivotal hinge 183a and cam structure 183b arranged in a cam slot 183c, which allows the carriage to move between a raised and a lowered position. For example, as seen in FIG. 6A, the left carriage 182L is in the raised position and the right carriage 182R is in the lowered position. When the carriage 182R is in the lowered position, the flavorant container 200R can be inserted therein. The carriage assembly can further include a biasing element, such as a spring 183d, which can bias the carriage assembly to the raised position.

On the carriage 182R itself is a retention seat 184, which is sized to seat the flavorant container 200R. The retention seat 184 can be in the form of a rounded depression that is shaped to receive a cap of a flavorant container. The retention seat can further include a keyed slot 184a extending from the rounded depression along a sidewall of the seat. The slot 184a can be sized to receive a complementary portion of the flavorant container in order to properly align the flavorant container 200 within the carriage 182R. The keyed slot 184a can also be generally referred to as an alignment channel. Within the keyed slot 184a, there can be a retention catch 185 in the form of a spring-loaded extension configured to receive and retain a complimentary groove on the flavorant container 200. The retention seat 184 can also include retention projections 184b located within the slot, which provide more areas that a flavorant container 200 can frictionally fit when retained in the carriage 182R. In FIGS. 6A and 6B, retention projections 184b are shown in the form of rounded triangular shapes projecting outward from the retention seat 184, however the retention projections 184b can have any shape or form, for example, a form that conforms to a complimentary and compatible portion on a flavorant container (e.g., flavorant container 200 or 200', described below), or more specifically, a cap (e.g., 204, 204', described below) of a flavorant container. The retention-projections 184b can also serve as a means with which certain flavorant containers can be prevented from interfacing with the carriages 182L, 184R. The retention projections 184b can rise out of the retention seat 184 so that a flavorant container (e.g., flavorant container 200, 200') must have features amounting a complimentary and compatible pattern in order to be properly seated within the carriage (e.g., 182L, 182R), and consequently in order to be capable of properly dispensing flavorant. The complimentary and compatible pattern can be located on a cap of a flavorant container, as will be described in more detail below. A flavorant container without a complimentary pattern of retention projections 184b can be obstructed from properly interfacing with the carriage (e.g., 182L, 182R). The projection 184b and complimentary portions on a cap or other portion of a flavorant container may be constructed (e.g., machined) to have varying desired degrees of fit (e.g., tightness) when coupled together, which may take into account a desired tolerance of the parts.

The retention seat 184 can further include an inlet receiver 186 and an outlet receiver 188, which can align with an inlet 210 and an outlet 212 located on the flavorant container 200. The inlet receiver 186 features a circular gasket 186a which can seal around an inlet 210 in order to create an isolated path for air to flow into a seated consumable 200. Set within the carriage 182R and leading away from the inlet receiver 186 is an air line 189R, as seen especially in FIG. 6F. The air line 189R can extend through the hinge 183a of the carriage 182R and can eventually lead to an air pump 190R disposed within the head assembly 120. The air pump 190R can also be located elsewhere in the device 10, such as, for example, within the housing assembly 100. In this way, when the flavorant container is seated on the carriage 182R, the air pump 190R is in fluid communication with the flavorant container 200 via the air line 189R and the inlet receiver 186. The outlet receiver 188 can be in the form of an opening which aligns with the outlet 212 and provides a pathway for the dispensing of a flavorant stored within the flavorant container 200. When fluid is dispensed from a seated flavorant container 200, it can exit through the outlet 212 and pass through the outlet receiver 188, which is a simple opening. From there, the dispensed fluid can be received by a vessel, such as a drinking glass. The seating and dispensing process will be described below in greater detail.

FIGS. 6H and 6I show the carriage assembly 180 with flavorant containers 200L, 200R retained therein. The carriages 182L, 182R are shown with respective air lines 189R, 189L extending upward and coupling with respective air pumps 190R, 190L. In operation, the air pumps 190R, 190L can be used to introduce pressurized air through the air lines 189R, 189L and into seated flavorant containers 200R, 200L, as will be described in greater detail below.

FIGS. 7A-7F show one embodiment of the flavorant container 200. The flavorant container 200 is configured to contain a flavorant, which can be mixed with carbonated or uncarbonated water in order to create a flavored beverage.

The illustrated flavorant container 200 includes a container body 202, a cap 204, and a foil seal (not shown). The container body 202 can have any shape, but in the illustrated embodiment, the container body 202 has the form of an extruded ovular shape. The container body 202 includes a base 202a, a sidewall 202b, and a top 202c. The sidewall 202b is shown with a plurality of ridges 203 formed therein, which can increase grip of the flavorant container 200 and/or provide structural reinforcement. In the top 202c and skewed off to one side is an opening 206, which leads to a hollow interior chamber 208 defined by the container body 202. The top 202c can be angled toward the opening 206 to aid in evacuation of the hollow interior chamber 208 during a dispensing operation. Stored within the hollow interior chamber 208 is the flavorant, which can take on any form, such as a liquid, a syrup, a powder, a solid, or another compound.

The cap 204 can be coupled to the container body 202 over the opening 206 to close off the hollow interior chamber 208. In the illustrated embodiment, the cap 204 is snap-fitted to the container body 202, however any removable or irremovable coupling known in the art can be used, such as threads, welding, adhesives, or the like. The illustrated cap 204 can be round and can have a cylindrical outer wall 205 defining an opening therethrough. An end wall 204a extends across the opening and can be positioned at a mid-portion of the cylindrical outer wall 205. On an external surface of the cap 204 and surrounding the outlet 212 can be a collar 218, which can act to provide the outlet with increased structure, as well as to provide the carriage assembly with an easier point of contact when the flavorant container is retained therein. Disposed on an outer side of the cap 204 can be an alignment tab 207, which can protrude radially outward from the cap 204 and extend along a length of the cap. The alignment tab 207 can enable proper alignment and orientation with the carriage assembly, as explained above. The alignment tab can include a clip detail 207a, which can couple with the retention catch 185 in order to retain the consumable 200 within the carriage assembly 180. The cap 204 can also include an inlet 210 and an outlet 212 positioned in the end wall 204a. The inlet 210 can be in the form of a generally hollow elongate tubular projecting from opposed sides of the end wall 204a, and the inlet 210 can have a diameter that is less than, greater than, or equal to a diameter of the outlet 212. The cap 204, including the inlet 210 and the outlet 212 can be arranged and designed to be accommodated by a carriage (e.g., carriage 182L, 182R), such as by having protruding portions located on the cap 204 which correspond and compliment features on the carriage, such as the retention projections 184b.

Figure 7A:
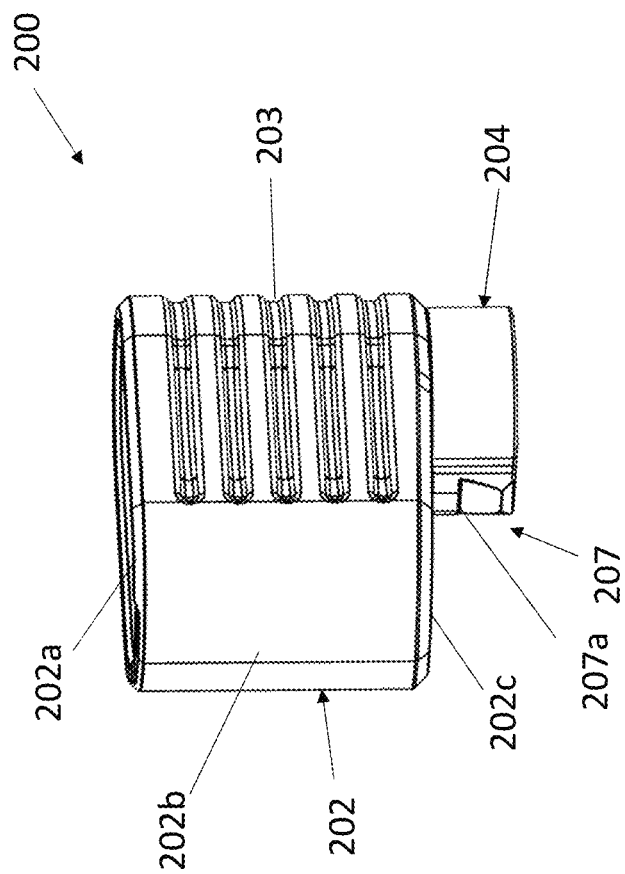
FIG. 7A is a perspective view of one embodiment of a flavorant container.
Figure 7C:
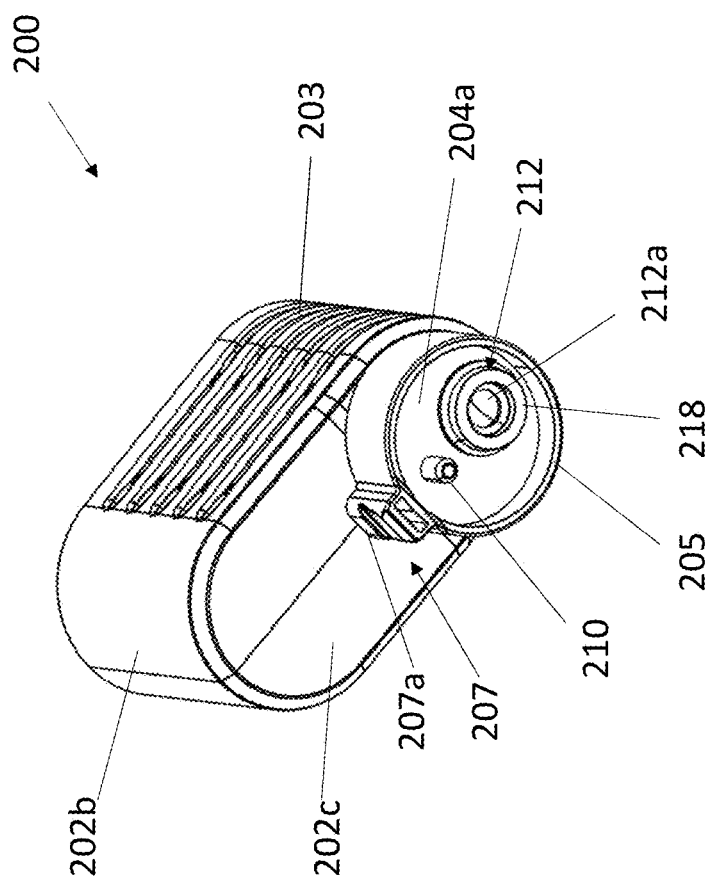
FIG. 7C is a perspective view of the flavorant container of FIG. 7A.
Figure 7E:
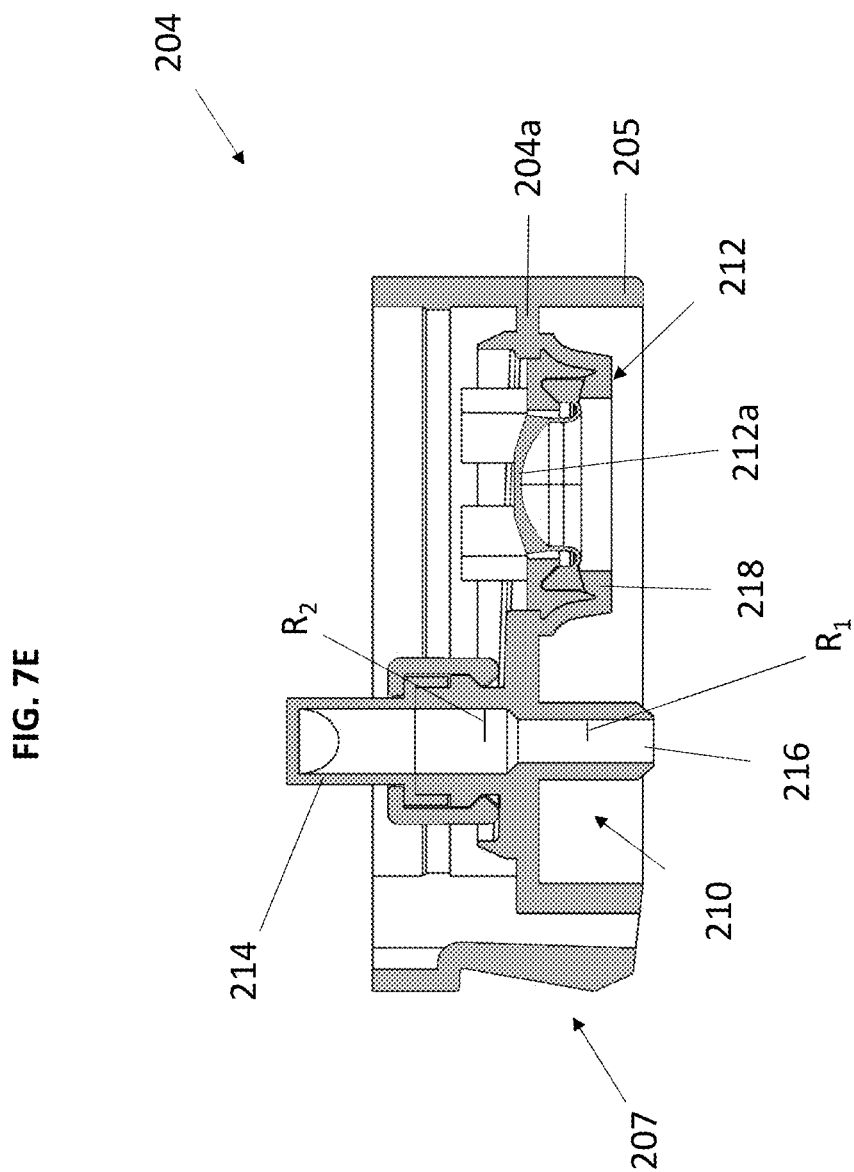
FIG. 7E is a side cross-sectional view of a cap of the flavorant container of FIG. 7A, according to some embodiments.

On an external portion of the cap 204, facing away from the hollow interior chamber 208, the inlet 210 can take the form of a cylindrical extension protruding from the end wall 204a of the cap 204, and on an interior portion of the cap 204 locating within the interior chamber 208, the inlet 210 can include an inlet valve 214 to allow for the inflow of fluid through the cap 204 and into the hollow interior chamber 208. The inlet valve 214 is shown in FIG. 7E in the form of a duckbill valve, but any suitable form of a valve could be used. The inlet 210 therefore can form a cylindrical inlet pathway 216, and, due to the shape and structure of the inlet 210, the cylindrical inlet pathway 216 can have a radius $R_1$ which is smaller in the external portion of the cap 204 than a radius $R_2$ in the internal portion of the cap 204. The outlet 212 likewise can include a hollow tubular structure in the form of a collar 218 that extends outward from the end wall 204a; however the outlet 212 can be significantly shorter and larger than the inlet 210. The outlet 212 can include a valve 212a extending thereacross that is biased to a closed configuration, however the valve can be configured to open when a pressure differential across the outlet 212 exceeds a predetermined pressure. The valve 212a is shown to be positioned slightly inward relative to the end wall 204a when the valve 212a is in a neutral position, but it can be positioned to be even with or slightly outward of the end wall 204a. In the illustrated embodiment, the valve 212a is a cross-slit valve, however any suitable type of valve could be used.

While the inlet valve 214 and the inlet pathway 216 are shown in FIGS. 7D and 7E extending beyond the outer rim 205, they can also have a shorter form so as to be recessed more within the cap 204. This can enable the outer rim 205 to protect the inlet valve 214 and the inlet pathway 216, as well as the inlet 210 generally, during transportation, handling, and use.

The flavorant container 200 can also include a plug seal (not shown), which can be disposed between the container 202 and the cap 204 to aid in sealing the hollow inner chamber 208. The plug seal can be especially useful if the hollow inner chamber 208 has an increased interior pressure, such as during a dispensing operation.

The foil seal (not shown) can adhere to an upper extent of the outer wall 205 to cover the entirety of the cap 204, including the inlet 210 and the outlet 212. In this way, the foil seal can hermetically seal the flavorant to prolong shelf-stability and maintain freshness. The foil seal can also cover only the inlet 210 and/or the outlet 212. The foil seal can be peeled off by a user prior to a first use.

The flavorant container 200 can be made from a variety of materials, including plastics, resins, metals, rubbers, and more. These materials can feature environmentally-friendly materials such as, for example, reclaimed and recycled plastics, fibers, and other materials known in the art, in order to limit waste production resulting from operation of the beverage dispensing device 10.

FIG. 8A-8D depict various embodiments of the flavorant container 200. The illustrative embodiments can include similar features and characteristics as the flavorant container 200, and as such, to avoid being needlessly redundant, descriptions may not be repeated. In the illustrative embodiment of FIG. 8A, a flavorant container 200' including a cap 204'. The cap 204' further includes an alignment pattern 220'. The alignment pattern 220' can take the form of protrusions located on the cap 204', which can include or be separate from the collar 218' or other features described above. The alignment pattern 220', as depicted, takes the form of a figure-eight shape, which is shown as essentially linked collars around both the inlet 210' and the outlet 212'. The carriage (e.g., carriages 182L, 182R) can have a cavity with a complimentary figure-eight shaped depression that receives the alignment pattern 220' on the container. The depression can be defined at least in part by the retention projections 184b, as explained above, such that the depression and the pattern can be complimentary to each other. The inclusion of this alignment pattern 220' can allow for further stability when retaining the flavorant container 200' within the carriage assembly 180. The alignment pattern 220' can also take the form of indentations or any other surface features that aid in aligning the flavorant container with the carriage (e.g., carriages 182L, 182R), while also preventing the alignment and retention of other types of containers which may lack complimentary features.

Figure 8B:
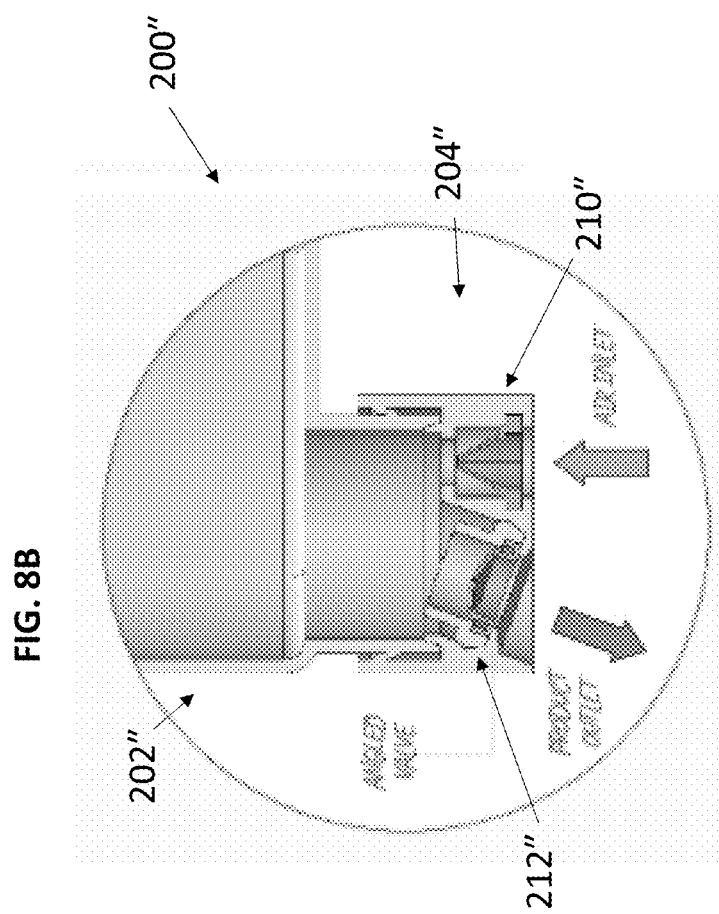
FIG. 8B is a cross-sectional view of a flavorant container according to another embodiment, having an inlet and an outlet angled relative to one another.

FIG. 8B depicts an illustrative embodiment of a flavorant container 200" including a container 202" and a cap 204". The cap 204" can have an inlet 210" and an outlet 212" angled relative to each other. Consequently, when the flavorant container 200" is seated in a carriage (e.g., carriage 182L, 182R), and flavorant is dispensed therefrom, the flavorant can be emitted from the outlet 212" at an angle relative to a dispensing stream of fluid (e.g., carbonated water) from the nozzle 178. In this way, the flavorant and fluid dispensed from the nozzle 178 can mix in-flight, rather than in a disposed receptacle, such as a drinking glass.

Figure 8C:
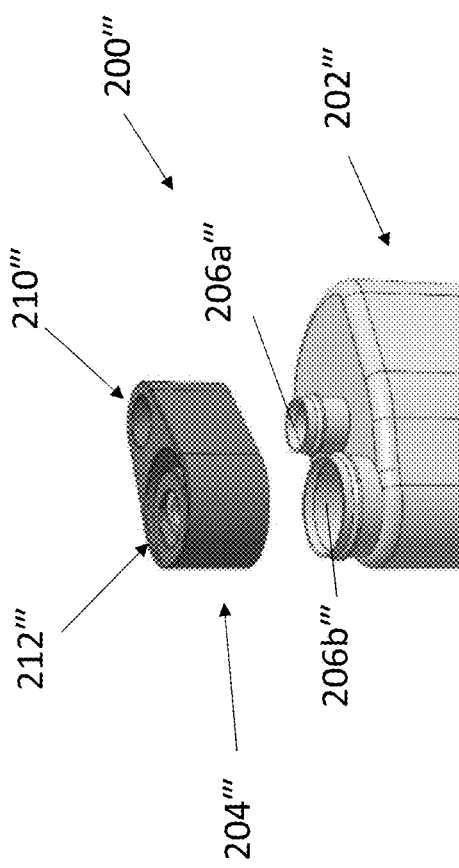
FIG. 8C is an exploded perspective view of a flavorant container having a separate inlet and outlet opening in a container, and a lid configured to cover the inlet and the outlet.
Figure 8D:
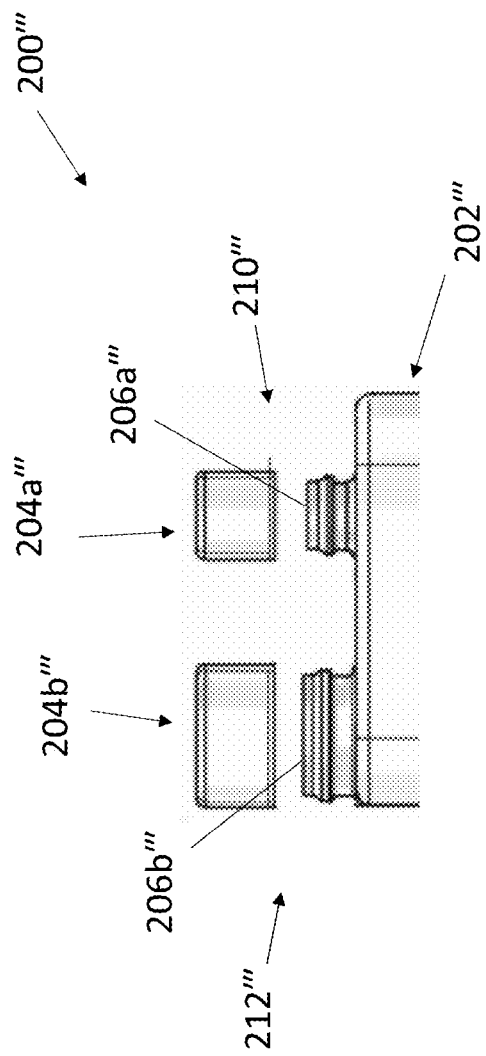
FIG. 8D is an exploded right side view of the flavorant container of FIG. 8C having a separate inlet lid and outlet lid.

FIGS. 8C and 8D depict an illustrative embodiment of a flavorant container 200''' having separate openings for an inlet 210''' and an outlet 212'''. These separate openings are delineated as an inlet opening 206a''' and an outlet opening 206b''', which are each disposed in the container 202'''. The inlet opening 206a''' and the outlet opening 206b''' can be covered by a single cap 204''', as seen in FIG. 8D, or by separate inlet and outlet caps 204a''', 204b''', respectively.

The illustrative embodiments of the flavor containers 200, 200', 200", and 200''' are depicted with specific features and arrangements of features, however the features and arrangements of features described herein can be applicable to and interchangeable with any embodiment.

Figure 9:
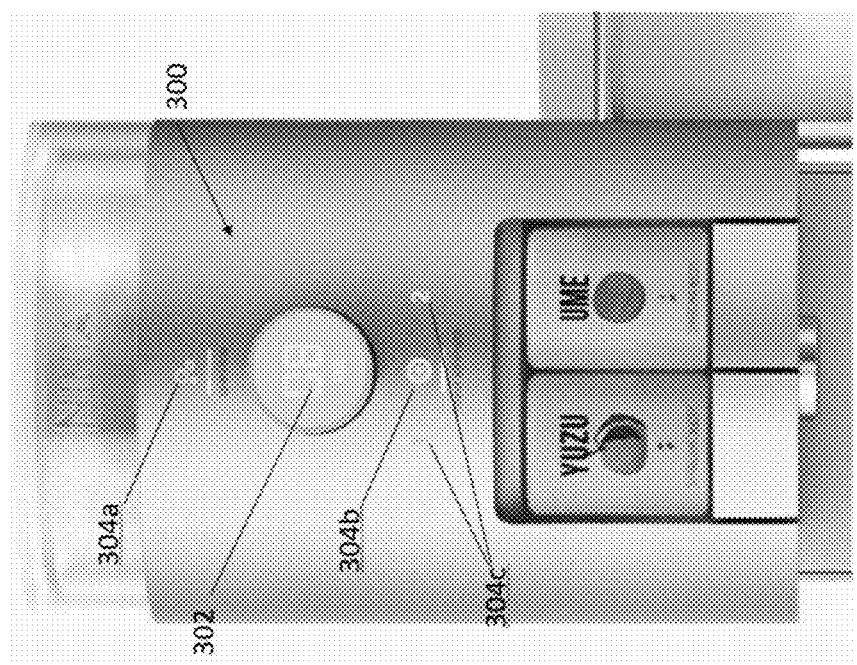
FIG. 9 is a front view of a user interface of a beverage dispensing device according to an embodiment.

With reference now to FIG. 9, a UI 300 is shown which can be used to operate the beverage dispensing device 10. The UI 300 can be used to interface with a controller (not shown). The UI 300 is shown located on the head assembly 120; however, it could be located anywhere on the beverage dispensing device 10, such as on the housing 102. Further, the beverage dispensing device 10 could also be operated remotely, such as through a remote application on a computer, smart phone, or other similar device.

The UI 300 can receive inputs to operate and control aspects of a creation process for a beverage. For example, a user can select and control parameters of the beverage they desire, such as liquid volume, carbonation level, flavor choice, and flavor strength. Liquid volume pertains to the overall size of the drink. Carbonation level pertains to the amount of carbon-dioxide dissolved in the water, which affects how "bubbly" the drink is. Flavor choice pertains to the type of flavorant added to the beverage, e.g., lemon, lime, etc. Flavor strength pertains to the amount of flavorant added to the beverage.

The UI 300 is shown having a central display 302 in the form a circular screen. The central display 302 can also operate as a dial to move between options. Above and below the central display 302 are indicators 304, which can light up and correspond to what a user selects at the central display. For example, depicted in FIG. 9 above the central display 302 is an indicator 304a pertaining to carbonation level. The indicator 304a is labeled "sparkling" and features an image of bubbles. The indicator 304a also includes a meter, which is lit up according to the carbonation level selected by the user. If the user selects the maximum carbonation level, the meter will be entirely filled up, whereas if the user selects a carbonation level equal to half of what is possible, the meter will be half-filled. Separate indicators 304b, 304c are also shown for "flavor strength" and flavor type. Flavor strength is associated with indicator 304b, the words "flavor strength," and an image of a slice of citrus fruit. Flavor type is shown with indicator 304c as being either a "1" or a "2," which correspond to a selection between a left flavorant container and a right flavorant container.

The previously described components of the beverage dispensing device 10 can operate together to create and dispense custom beverages. In an illustrative process, preparing a beverage with the beverage dispensing device 10 can involve several processes, including water preparation, gas preparation, flavorant container preparation, and customization at the UI 300. With these preparations and customizations complete, the beverage dispensing device 10 can then operate to mix and dispense carbonated water and flavorant as desired.

Water preparation can include filling the water reservoir 130 with water and then seating the water reservoir 130 onto the valve seat 116. This ensures that the water within the water reservoir 130 is now ready to be drawn upon during a carbonation procedure. Gas preparation can involve adding or replacing the $CO_2$ canister 161 within the $CO_2$ cavity 104 when the canister has run out. This can require the door 106 to be opened and a new canister 161 to be hooked up to the gas regulator in order to enable carbon-dioxide within the canister 161 to be used during a carbonation procedure.

Loading a flavorant container 200 into the carriage assembly 180 will allow for a flavorant stored within the flavorant container 200 to be added to the beverage in order to provide flavor. The carriage 182 can be moved to the lowered position by applying a force to the carriage 182 to overcome the spring-biased maintaining the carriage assembly in the raised position, and the flavorant container 200 can be oriented so that all features of the cap 204 align within the retention seat 184. The alignment tab 207 can be slid down into the keyed slot 184a, such that the retention catch 185 clicks into place and secures the flavorant container 200. The inlet 210 can be received by the inlet receiver, which creates an air-tight seal around the inlet 210. The outlet 212 can be aligned with the outlet receiver, which positions the outlet 212 over the opening in preparation for the dispensing of a flavorant. Once the flavorant container 200 is secured in the carriage 182, the carriage 182 can be moved to the raised position. A second flavorant can likewise be added to the other carriage assembly.

If the cap 204 includes an alignment pattern 220', like the figure-8 pattern shown on the cap 204' in FIG. 7, the alignment pattern 220' can be further relied upon to guide the flavorant container 200' into position within the carriage assembly 180d.

When the above preparation steps are complete as needed, a vessel (not shown), such as a drinking glass, can be placed upon the drip tray 110 beneath the nozzle 178 and the outlet receiver 188 of the carriage assembly 180. At the UI 300, aspects of the beverage can be selected, including fluid volume, carbonation level, flavor type, and flavor strength. Fluid volume can be selected by a user in preset sizes, such as, for example, 8 fluid ounces, 10 fluid ounces, 12 fluid ounces, and the like. Fluid volume can also be precisely selected by a user to even include fractional fluid ounces, or can be selected to operate in another unit, such as milliliters and the like. When a desired volume is selected, the UI 300 can prompt the user for the next input. Carbonation level can be selected by a user in preset sizes, which can be presented as levels to the user, such as 0-5, where a "0" can refer to no carbonation and a "5" refers to the maximum amount of carbonation dissolvable in the water. Other levels of carbonation can be assigned to the numbers presented, or the numbers presented can vary, i.e., a user is presented with a 1-10 instead of a 0-5. Flavor type can be selected to offer a choice between a flavorant container stored in the left carriage 182L and a flavorant container stored in the right carriage 182R. A choice can also be made by a user to skip flavor selection if an unflavored beverage is desired, or the user may be able to select both the left and right flavorant containers 200L, 200R. Flavor strength can be selected by a user to customize the amount of flavorant dispensed from the flavorant container 200. More flavorant will lead to a stronger drink. In some embodiments, if both the left and right flavorant containers 200L, 200R are selected to dispense a flavorant, the flavor strength can be individually selected for each of the flavorant containers 200L, 200R, resulting in potentially the same amount of each flavorant or a different amount of each flavorant. The beverage dispensing device 10 can determine a default amount of flavorant to be added based on a selected fluid volume and/or a selected carbonation level. The user can accept the default amount of flavorant, or they can also change the default amount of flavorant to a custom amount.

Once any or all of the above selections have been made, a user can select a "start" button to begin the dispensing process. In some embodiments, the central display 302 can act as a start button, and in other embodiments, the start button can be located elsewhere on the beverage dispensing device 10, or on a remote application. Although the inputs are presented here in a certain order, a user may be able to input them in any order desired, or may also be able to select only some of the inputs before initiating the dispensing process. For example, a user can select options to dispense a drink omitting one or all of the selections, or even can omit carbonation and/or flavoring altogether.

When a user has initiated the dispensing process, the beverage dispensing device 10 will coordinate several processes together in order to properly create and dispense the desired beverage. These processes can include a mixing process and/or a flavoring process, for example, depending on user selection.

The mixing process generally involves the mixing assembly 170 receiving water through the water line 152 and carbon-dioxide through the gas line 160, mixing the received water and carbon-dioxide under pressure to create carbonated water, and dispensing carbonated water through the nozzle 178. In an illustrative embodiment, based on the user-selected fluid volume and carbonation level, corresponding amounts water and carbon-dioxide will be pumped and/or vented into the mixing chamber 172. The mixing chamber 172 has a finite volume, which can limit the amount of carbonated water that can be made in a single batch, and so if a user selected fluid-volume exceeds the volume of the mixing chamber 172, more than one batch can be made to reach the total desired volume. In one embodiment, the mixing chamber 172 can produce six fluid-ounces of carbonated water in a single batch.

FIGS. 10A-10E depict an illustrative control process 400, as well as sub-processes 410, 430, 450, and 470, which can be followed to create and dispense a carbonated flavored beverage. The process 400 and sub-processes 410, 430, 450, and 470 can vary, and, for example, may include additional sub-processes or omit sub-processes. Additionally, any and all of the sub-processes 410, 430, 450, and 470 can vary to add or omit individual steps.

Figure 10B:
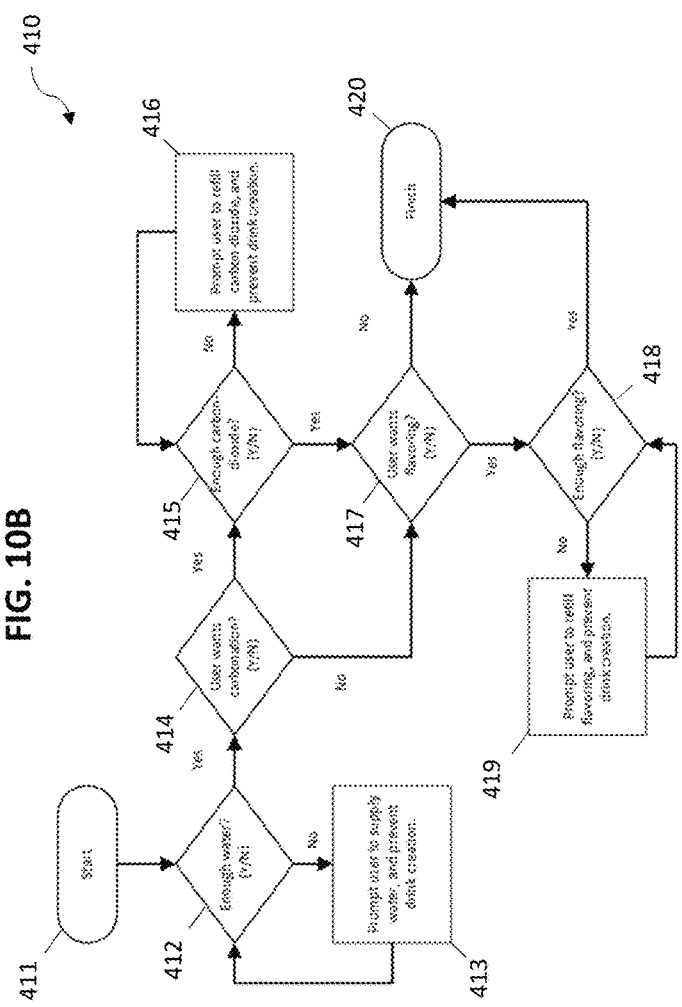
FIG. 10B is a system process diagram for an illustrative initialization sub-process for the control process of FIG. 10A.
Figure 10A:
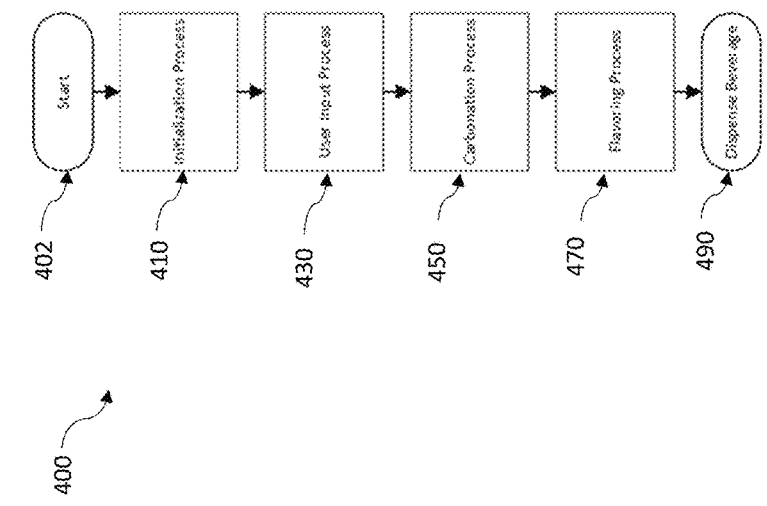
FIG. 10A is a system process diagram for an illustrative control process.

The illustrative beverage-making process 400 starts at starting point 402 and proceeds through several sub-processes as shown in FIG. 10A. These sub-processes can include an illustrative initialization process 410, an illustrative user input process 430, an illustrative carbonation process 450, and an illustrative flavoring process 470. A beverage can be dispensed at 490.

FIG. 10B depicts an illustrative initialization sub-process 410, which can be used to prepare the beverage dispensing system 10. The sub-process can run separately from, or concurrently with, other sub-processes or processes. The sub-process 410 can begin at block 411 and proceed to block 412. At block 412, the system 10 can determine whether there is enough water present in the water reservoir 130. If the system 10 determines that there is not enough water present in the water reservoir 130, the sub-process 410 can continue to block 413, where the system 10 can prompt a user to supply water to the water reservoir 130. The system 10 can also prevent drink creation until the system 10 determines that water has been supplied. If, at block 412, the system 10 detects that enough water is present, the sub-process 410 can continue to block 414. At block 414, the system 10 can run a check to determine whether a user desires carbonation in a beverage. As explained above, the system 10 via UI 300 can receive a user input determining a carbonation level. If the user has indicated that they want carbonation in a beverage, a check can be performed at block 414 before the sub-process 410 proceeds to block 415. At block 15, the system 10 can check to see if there is enough carbon-dioxide in the gas source, for example, in canister 162, before allowing a beverage dispensing process to proceed. If, at block 415, the system 10 detects that there is not enough carbon-dioxide available, the system 10 can prompt a user to refill the carbon-dioxide source. If, at block 415, the system 10 detects that there is enough carbon-dioxide available, the sub-process 410 can continue to block 417. Referring again to block 414, if a user has indicated that they do not want carbonation in a beverage, the sub-process 410 can proceed directly to block 417 and skip the check at block 415. At block 417, the system 10 can run a check to determine whether a user desires flavor. This check can be based on a user input received at UI 300, for example. If, at block 417, the system 10 determines a user does not want flavoring, the sub-process 410 can finish. If, at block 417, the system 10 determines a user does want flavoring, the system can run a check at block 418 to see if enough flavoring is available to flavor a beverage. If the system 10 determines that there is not enough flavoring available, the system 10 can prompt a user to refill flavoring and, until flavoring is refilled, prevent drink creation which attempts to use flavoring. If the system 10 determines that there is enough flavoring, the system can 10 finish the initialization sub-process 410.

After some or all of initialization sub-process 410 has finished, process 400 can proceed to user input process 430. As explained above, some of sub-process 410 can be informed by inputs received at a UI 300, which can occur during user input process 430. Accordingly, sub-process 410 may not necessarily finish before user input process 430 begins.

FIG. 10C depicts an illustrative user input sub-process 430. At block 432, a user can be prompted for an input or inputs, which can result in a customized beverage dispensed from beverage dispensing device 10 based at least partially on the received input or inputs. The inputs can be received in any order, and some inputs may be added in addition to what is described. Further, inputs may be skipped. At block 434, an input can be received for a liquid volume of a dispensed drink. The received input could be representative of several options, such as, for example, 6 oz., 8 oz., 10 oz., etc., or the received input could be representative of sizes, such as small, medium, or large. At block 436, an input can be received for a carbonation level of a dispensed drink. As explained previously, this user could be prompted to enter a carbonation level between 0-5, where "0" represents no carbonation and "5" represents maximum carbonation. A received input at block 436 can be informative of other processes and checks run by the system, such as the check performed at 414 of sub-process 410, for example. At block 436, an input can be received representing a type of flavor. The system 10 can hold at least one flavorant container 200, as explained above, and in some embodiments, it can hold at least two flavorant containers 200. A user input can be received at 438, which selects between a first or a second flavorant container held in the system 10. A user input can also be received that selects both the first and second flavorant container 200, or no flavorant container 200. Similar to the operation at block 436 for a carbonation level, if a user input at 438 is received that indicates no flavor is desired, flavoring protocols and operations can be skipped. At block 440, a user input can be received indicating a flavorant strength. Depending on the input received, the system 10 can dispense more or less flavorant from a flavorant container 200. If a user input is received at block 438 that flavorant is not desired, block 440 can be skipped.

FIG. 10D depicts an illustrative carbonation sub-process 450, which can occur if a user has indicated that they would like some level of carbonation in their beverage, as shown in block 452. The sub-process 450 can continue to block 454. At block 454, water can be pumped into the mixing chamber 172 by the water pump 156 via the water line 152, based on a user-selected fluid volume, as explained previously. The flow meter 157 can measure the amount of water flowing through the water line 152, and water volume can be determined by pumping for a set amount of time and measuring a flow rate with the flow meter 157. The vent solenoid 172a then can close. At block 456, gas (e.g., carbon-dioxide) can be added via the gas line 160, according to the desired carbonation level. The gas solenoid 166 can be actuated and regulated carbon-dioxide can be allowed to flow into the mixing chamber 172. At block 458, the agitator 173 can be powered on to begin to churn the water and the carbon-dioxide within the mixing chamber 172. The agitator 173 can run longer than the time that carbon-dioxide flows into the mixing chamber 173, for example, for between five and ten seconds after. Mixing can occur within the mixing chamber 172, and then, at block 460, the pressure relief valve 179 can open to release excess pressure in the mixing chamber 172. At block 462, the dispensing valve 177 can be opened to allow the newly created carbonated water to exit the mixing chamber 172 and be dispensed by the nozzle 178. If, at block 464, more carbonated water is needed, the carbonation sub-process 450 can proceed back to block 454, and carbonation can occur again until the total volume desired has been dispensed. If no more carbonated water is required, the sub-process 450 can proceed to block 468, indicating that the sub-process 450 is complete.

If, during a mixing process, such as at block 458, an internal pressure is measured by the pressure sensor 175a that exceeds a safe threshold (e.g., 100 psi), the mixing chamber can be ventilated through actuation of a pressure release valve 179. If an internal temperature is measured by the temperature sensor 175b that exceeds a safe threshold, the mixing chamber can be ventilated as well.

After a dispensing operation, a purging pump 159 coupled to the mixing assembly 170 can introduce pressurized air into the mixing chamber 172 to clear it out of excess fluid. The pressurized air can be introduced through a check valve 158b, permitting one-way flow into the mixing chamber 172.

FIG. 10E depicts an illustrative flavoring sub-process 470, which can occur if a user has indicated that they would like flavoring in their beverage, as shown in block 472. The flavoring process generally involves introducing pressurized air into a flavorant container (e.g., flavorant container 200) to force a flavorant to dispense from the flavorant container. Based on a user selection, a flavorant can be selectively dispensed by the system 10. At block 747 of sub-process 470, this can be presented as a choice between a flavorant container 200 seated in the left carriage 182L and a flavorant container seated in the right carriage 182R. When the flavorant container 200 is properly seated on the carriage 182, the air pump 190 can be in fluid communication with the inlet 210. The air pump 190 will send pressurized air down the air line 189 and into the inlet 210. The introduction of pressurized air will force the duckbill valve to open, and, as a result, an internal pressure of the hollow interior chamber 208 will increase. In an attempt to eliminate the pressure differential, the outlet 212 will open and a flavorant will be forced out of the outlet 212, out of the head assembly 120, and into a placed vessel (e.g., a drinking glass). The amount of flavorant dispensed depends on the amount of pressurized air forced into the hollow interior chamber 208. This amount of pressurized air is dependent upon the input received at the UI 300 from a user indicating their desired flavor level. This dispensing process can be seen in the remainder of sub-process 470, which includes blocks 476 and 480 if a user selects a left container 200, and which includes blocks 478 and 480 if a user selects a right container 200. When flavorant has been dispensed at 480, the sub-process can be completed at block 482.

The flavoring sub-process 470 can be coordinated with the carbonation sub-process 450, such that carbonated water and a flavorant can be dispensed at the same time. In an illustrative embodiment, the carbonated water and the flavorant are dispensed substantially parallel to each other, such that they mix in a placed drinking glass. In another embodiment, the carbonated water and the flavorant are dispensed such that their flow paths collide in midair, above the drinking glass. In this way, the carbonated water and the flavorant can begin to mix in midair, which can result in a more thoroughly mixed beverage. Note in other embodiments, the flavorant can be dispensed along with uncarbonated water to form an uncarbonated flavor beverage.

The injection of air through the inlet 210 can be accomplished through a single burst of at least one pressurized gas, or through several bursts of at least one pressurized gas. In total, a flavoring sub-process can take a short time, e.g., less than one second. In some embodiments, the process can be less than 250 ms, and in some embodiments, as low as approximately 130 ms.

Figure 11:
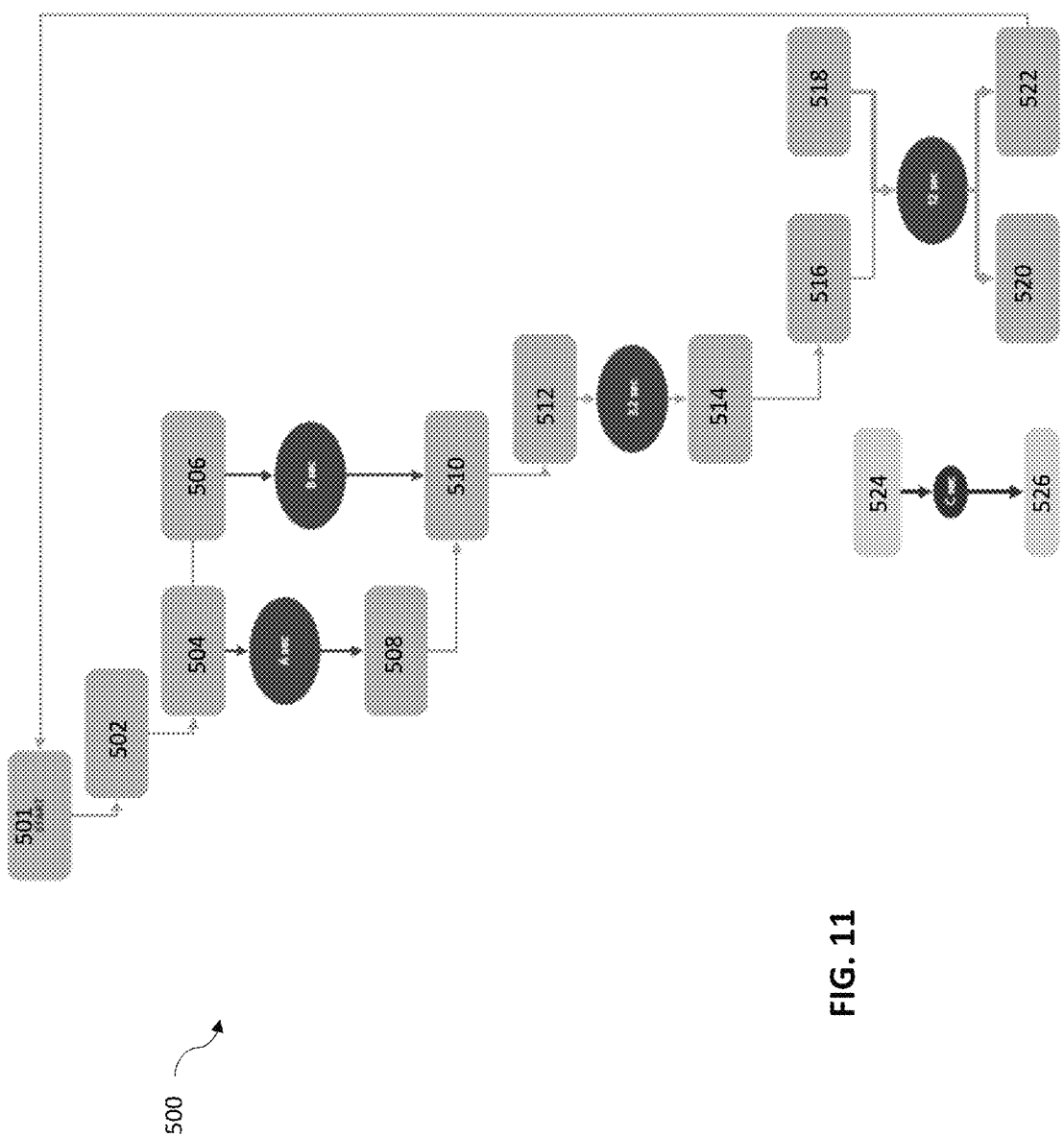
FIG. 11 is a system process diagram for an illustrative carbonation and flavoring sub-process.

FIG. 11 depicts an illustrative dispensing process 500, including an example time sequence for various operations within the dispensing process 500. The process 500 can begin at block 501 and proceed to block 502. At block 502, the mixing chamber 172 can be filled to a specified volume. For example, if the mixing chamber 172 has a maximum capacity of 6 oz. and a user has selected a volume less than 6 oz., the selected volume will be pumped into the mixing chamber 172. If the user has selected a volume greater than 6 oz., then 6 oz. can be pumped into the mixing chamber 172 during a first operation. At block 504, carbon-dioxide can be supplied to the mixing chamber 172, and at block 510, supply of carbon-dioxide can end. At block 506, the motor 174 can be activated to drive the agitator 173 within the mixing chamber 172, and at block 510, the motor 174 can be deactivated. The block 504-508 link can occur for a first period of time, and the 506-510 link can occur for a second period of time that is different than the first period of time. The first period of time and the second period of time may occur in succession, or they may occur in parallel—either fully in parallel or partially in parallel. For example, each of the first and second periods of time can operate at a LOW cycle, a MED cycle, and a HIGH cycle. For the LOW cycle, the first period of time can be three seconds and the second period of time can be 2 seconds. For the MED cycle, the first period of time can be four seconds and the second period of time can be eight seconds. For the HIGH cycle, the first period of time can be six seconds and the second period of time can be ten seconds. The process 500 can continue to block 512. At block 512, the mixing chamber 172 can be ventilated for a time before the mixing chamber 172 is sealed again at block 514. For example, the mixing chamber 172 can be vented for various times as needed to reduce an internal pressure of the mixing chamber 172, and in an illustrative example, the mixing chamber 172 can be vented for approximately 3.2 seconds. At block 516, the mixing chamber 172 can dispense stored fluid via the outlet valve 176. At block 518, the purging pump 159 can be activated to assist in dispensing stored fluid from the mixing chamber 172. This dispensing operation can take time depending on the amount of stored fluid to be ventilated, and in an illustrative example can take approximately twelve seconds. At block 520, the outlet valve 176 can be closed, and at block 522, the purging pump 159 can be deactivated. If a volume of fluid is required which exceeds the maximum capacity of the mixing chamber, the process 500 can begin again at block 501 as is necessary to produce and dispense the desired volume. At block 524, an air pump, e.g., air pump 190L, 190R, etc., can be activated to begin a flavorant dispensing process. At block 526, the air pump can be deactivated to end the flavorant dispensing process. The time the air pump is activated between block 524 and block 526 can vary, depending on an amount of flavorant to be dispensed. For example, if LOW flavor is desired, the time can be approximately one second; if MED flavor is desired, the time can be approximately 1.2 seconds; if HIGH flavor is desired, the time can be approximately 1.4 seconds. The flavorant dispensing process depicted in blocks 524 and 526 can operate in parallel with or in succession with any other portion of the dispensing process 500.

The flavorant container 200 can be made using various manufacturing processes. In an example manufacturing process, the container 202 can be made by a first process and the cap 204 can be made by a second process.

The first process can include manufacturing the container 202 through Extrusion Blow Molding. This could be accomplished with polypropylene (PP) and/or could involve injection molding and blow molding, either separately or in combination. An orientation feature can be used to ensure that a cap 204 is fitted in a desired orientation.

The second process can include manufacturing the cap 204 through injection molding. A first orientation feature can be used to ensure a desired alignment relative to the container 202. A second orientation feature can be used to ensure correct placement during a manufacturing process (e.g., the first process, the second process, or another process). A third orientation feature can be used to provide a correct orientation when the flavorant container 200 is placed within the carriage assembly 180. A latching feature, such as the alignment tab 207, can be included to ensure that the flavorant container 204 can be secured within the carriage assembly 180. The inlet 210 and the outlet 212 can also be included for the reasons stated above. The inlet 210 can include a silicone duckbill valve, an umbrella valve, or other types of valves. The outlet 212 can include a silicone dispense valve, a cross-slit valve, or other types of valves. In some manufacturing processes, the cap 204, including the inlet 210 and the outlet 212, can be a single, discrete element. The valves associated with the inlet 210 and/or 212 can be made from other materials known to those skilled in the art as well, including other molded flexible materials, including various plastics, rubbers, and others.

Certain illustrative implementations have been described to provide an overall understanding of the principles of the structure, function, manufacture, and use of the systems, devices, and methods disclosed herein. One or more examples of these implementations have been illustrated in the accompanying drawings. Those skilled in the art will understand that the systems, devices, and methods specifically described herein and illustrated in the accompanying drawings are non-limiting illustrative implementations and that the scope of the present invention is defined solely by the claims. The features illustrated or described in connection with one illustrative implementation may be combined with the features of other implementations. Such modifications and variations are intended to be included within the scope of the present invention. Further, in the present disclosure, like-named components of the implementations generally have similar features, and thus within a particular implementation each feature of each like-named component is not necessarily fully elaborated upon.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described implementations. Accordingly, the present application is not to be limited by what has been particularly shown and described, except as indicated by the appended claims. All publications and references cited herein are expressly incorporated by reference in their entirety.

What is claimed is:

1. A beverage system for preparing a flavored beverage, comprising:
    a housing having a chamber therein and configured to operably couple to a fluid source and a pressurized gas source, the housing having a flavorant system configured to operably couple to a flavorant container; and
    a processor disposed in the housing and configured to cause, in response to at least one user-selected input received at a user interface located on the housing:
        a first fluid to be dispensed from the fluid source into the chamber and a second fluid to be dispensed from the chamber to a receptacle,
        gas to be delivered from the pressurized gas source into the chamber to form the second fluid as a carbonated fluid, and
        gas to be delivered into the flavorant container to increase a pressure within the flavorant container by an amount sufficient to open a valve and thereby cause a flavorant within the flavorant container to be dispensed from the flavorant container;
    wherein the at least one user-selected input characterizes at least one of a custom amount of the second fluid to be dispensed from the chamber to the receptacle, a custom amount of gas to be delivered into the chamber, and a custom amount of flavorant to be dispensed from the flavorant container.

2. The system of claim 1, wherein the flavorant is dispensed into the receptacle concurrently to the second fluid being dispensed into the receptacle.

3. The system of claim 1, wherein the first fluid and the second fluid are the same.

4. The system of claim 1, wherein the flavorant is delivered to the receptacle along a first flow path that is spaced apart from a second flow path of the second fluid being dispensed into the receptacle.

5. The system of claim 4, wherein the first flow path is substantially parallel to the second flow path.

6. The system of claim 4, wherein the first flow path is angled toward the second flow path.

7. The system of claim 1, wherein the pressurized gas source comprises carbon dioxide, and wherein the input characterizes an amount of carbon dioxide dissolved in the second fluid.

8. The system of claim 7, wherein the amount of carbon dioxide is zero.

9. The system of claim 1, wherein the input characterizes an amount of flavorant to be delivered to the receptacle.

10. The system of claim 1, wherein the housing includes a carriage configured to removably receive the flavorant container.

11. The system of claim 1, wherein the flavorant container comprises a first flavorant container, and the flavorant system is configured to operably couple to a second flavorant container.

12. The system of claim 11, wherein the processor is configured to receive an input indicating a selection of one of the first and second flavorant containers, and the processor is configured to cause, in response to the input, pressurized gas to be delivered into the selected one of the first and second flavorant containers.

13. The system of claim 1, wherein the flavorant container includes an inlet valve and an outlet valve, and wherein pressurized gas is delivered through the inlet valve and the flavorant is dispensed through the outlet valve.

14. A carbonated beverage system, comprising:
a housing having
a chamber fluidly coupled to a fluid source and to a pressurized gas source, the chamber being configured to receive a first fluid from the fluid source and to dispense a second fluid to a single fluid outlet,
a flavorant receptacle configured to receive a flavorant container such that the flavorant container is configured to receive gas from a pump in the housing and the flavorant container is configured to dispense flavorant from a flavorant fluid outlet, the flavorant fluid outlet being spaced apart from the single fluid outlet, and the single fluid outlet and the flavorant outlet being positioned above a platform configured to support a beverage container, and
a user interface configured to receive one or more user-specified inputs;
wherein an amount of the gas received from the pump corresponds to a user-selected amount of flavorant to be dispensed from the flavorant fluid outlet, the user-selected amount of flavorant being received at the user interface.

15. The system of claim 14, wherein the second fluid is the same as the first fluid.

16. The system of claim 14, wherein the single fluid outlet is configured to dispense the second fluid concurrently with the flavorant outlet dispensing the flavorant.

17. The system of claim 14, wherein the single fluid outlet and the flavorant outlet define fluid flow paths that are substantially parallel to one another.

18. The system of claim 14, wherein the flavorant outlet defines a flavorant flow path that extends transverse to a fluid flow path defined by the single fluid outlet such that flavorant flowing from the flavorant outlet is directed into a path of the fluid flowing from the single fluid outlet.

19. The system of claim 14, wherein the fluid source comprises a pitcher removably coupled to the housing.

20. The system of claim 14, wherein the housing includes a user interface configured to receive at least one input, wherein the at least one input controls at least one characteristic of the second fluid.

21. The system of claim 20, wherein the at least one characteristic is at least one of a fluid volume and a carbonation level.

22. A beverage system for preparing a flavored beverage, comprising:
a housing having a chamber therein and configured to operably couple to a fluid source and a pressurized gas source, and the housing having a flavorant system configured to operably couple to a flavorant container that includes an inlet valve and an outlet valve; and
a processor disposed in the housing and configured to cause, in response to at least one user-selected input received at a user interface located on the housing:
a first fluid to be dispensed from the fluid source into the chamber and a second fluid to be dispensed from the chamber to a receptacle, and
gas to be delivered into the flavorant container through the inlet valve to cause a flavorant within the flavorant container to be dispensed through the outlet valve into the receptacle, the flavorant being dispensed into the receptacle separate from the second fluid to form a flavored beverage, an amount of gas corresponding to an amount of the flavorant dispensed through the outlet valve into the receptacle;
wherein the at least one user-selected input characterizes at least one of a custom amount of second fluid to be disposed from the chamber to the receptacle and a custom amount of flavorant dispensed through the outlet valve into the receptacle.

* * * * *